US012479263B2

(12) United States Patent
Hu et al.

(10) Patent No.: US 12,479,263 B2
(45) Date of Patent: Nov. 25, 2025

(54) THERMAL MANAGEMENT SYSTEM AND ELECTRIC VEHICLE

(71) Applicant: SHENZHEN YINWANG INTELLIGENT TECHNOLOGIES CO., LTD., Shenzhen (CN)

(72) Inventors: Haomang Hu, Shanghai (CN); Xiaobing Zhang, Shenzhen (CN); Wen Ye, Shanghai (CN); Yuanyuan Liang, Shenzhen (CN); Lei Wang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/188,069

(22) Filed: Mar. 22, 2023

(65) Prior Publication Data
US 2023/0226877 A1    Jul. 20, 2023

Related U.S. Application Data

(63) Continuation of application No. PCT/CN2021/096175, filed on May 26, 2021.

(30) Foreign Application Priority Data

Sep. 22, 2020    (WO) ............... PCT/CN2020/116918

(51) Int. Cl.
*B60H 1/00* (2006.01)
(52) U.S. Cl.
CPC ..... *B60H 1/00278* (2013.01); *B60H 1/00392* (2013.01); *B60H 2001/00307* (2013.01)

(58) Field of Classification Search
CPC ..... Y02E 60/10; Y02T 10/70; B60H 1/00278; B60H 1/00392; B60H 2001/00307;
(Continued)

(56) References Cited

U.S. PATENT DOCUMENTS 3,527,256 A    9/1970   Colombo
9,731,578 B2 *  8/2017  Johnston ............. H01M 10/663
(Continued)

FOREIGN PATENT DOCUMENTS

CN    106442487 A  *  2/2017
CN    107310344 A     11/2017
(Continued)

OTHER PUBLICATIONS

Enomoto et al., Vehicle Air-Conditioning Device, Jul. 2, 2015, WO 2015097987 A1, Whole Document (Year: 2015).*
(Continued)

*Primary Examiner* — Elizabeth J Martin
*Assistant Examiner* — Adam Dorrel Moore
(74) *Attorney, Agent, or Firm* — Conley Rose, P.C.

(57) ABSTRACT

A thermal management system includes a compressor, a water-cooled condenser, a battery chiller, a valve body assembly, a first water pump, a second water pump, and a third water pump that are disposed in a centralized manner. The thermal management system can separately form a passenger compartment cooling loop, a passenger compartment heating loop, a battery cooling loop, a battery heating loop, and an electrical driver cooling loop, and any one or more of the passenger compartment, the battery, and the electrical driver can be cooled or heated.

20 Claims, 57 Drawing Sheets

(58) Field of Classification Search
CPC ...... B60H 1/00485; B60H 2001/00928; B60H 1/00921; B60H 1/32284; B60H 1/00342; H01M 10/6568; H01M 10/613; H01M 10/625; H01M 10/663; H01M 10/6556; H01M 10/6563; H01M 10/615; B60K 2001/005; B60K 2001/006; B60K 11/02; B60K 1/00; B60K 2001/008; B60L 2240/34; B60L 2240/545; B60L 1/003; B60L 1/02; B60L 58/26; B60L 58/27
See application file for complete search history.

(56) References Cited

U.S. PATENT DOCUMENTS

| | | | |
|---|---|---|---|
| 10,183,548 | B2 * | 1/2019 | Enomoto et al. .. B60H 1/00485 |
| 10,252,599 | B2 | 4/2019 | Kim et al. |
| 10,279,647 | B2 | 5/2019 | Tasiopoulos et al. |
| 2019/0271258 | A1 * | 9/2019 | Mendez Abrego et al. ................. F01P 7/164 |
| 2022/0176774 | A1 | 6/2022 | Tang et al. |
| 2022/0293315 | A1 | 9/2022 | Zhang et al. |
| 2022/0402332 | A1 | 12/2022 | Chen et al. |
| 2023/0226877 | A1 | 7/2023 | Hu et al. |

FOREIGN PATENT DOCUMENTS

| | | | | |
|---|---|---|---|---|
| CN | 107444060 | A | 12/2017 | |
| CN | 107599782 | A | 1/2018 | |
| CN | 108016235 | A | 5/2018 | |
| CN | 108482064 | A | 9/2018 | |
| CN | 108749517 | A | 11/2018 | |
| CN | 109532563 | A | 3/2019 | |
| CN | 110525169 | A | 12/2019 | |
| CN | 110816208 | A | 2/2020 | |
| CN | 111231602 | A | 6/2020 | |
| CN | 111319514 | A | 6/2020 | |
| CN | 111532100 | A | 8/2020 | |
| CN | 112406494 | A | 2/2021 | |
| CN | 112543709 | A | 3/2021 | |
| CN | 115556537 | A | 1/2023 | |
| CN | 115626022 | A | 1/2023 | |
| CN | 116001513 | A | 4/2023 | |
| DE | 102016000316 | A1 | 7/2017 | |
| DE | 102017125170 | A1 | 5/2019 | |
| WO | WO-2015097987 | A1 * | 7/2015 | ......... B60H 1/00278 |

OTHER PUBLICATIONS

Luo J et al., Online ammonia nitrogen monitor, Feb. 22, 2017, CN106442487A, Whole Document (Year: 2017).*

* cited by examiner

THERMAL MANAGEMENT SYSTEM AND ELECTRIC VEHICLE

CROSS-REFERENCE TO RELATED APPLICATIONS

This application is a continuation application of International Patent Application No. PCT/CN2021/096175, filed on May 26, 2021, which claims priority to International Patent Application No. PCT/CN2020/116918, filed on Sep. 22, 2020. The disclosures of the aforementioned applications are hereby incorporated by reference in their entireties.

TECHNICAL FIELD

This application relates to the field of internet of vehicles technologies, furthermore, to a thermal management system and an electric vehicle.

BACKGROUND

Electric vehicles have been applied more extensively in the field of power electronics over recent years. An electric vehicle stores electric energy for endurance and driving, so that a user can directly implement operations such as charging at home. In comparison with a conventional vehicle, the electric vehicle is not only conducive to environmental protection, but also does not require the user to go to a gas station to refuel. Therefore, convenience of the user's life is improved.

When using an electric vehicle, the user prefers to obtain better experience. For example, the user expects that a passenger compartment can have a suitable temperature to improve driving experience of the user, and the user further expects that a temperature of a battery can be maintained within an appropriate range, so that the battery is neither allowed to be in a low temperature state for a long time and cause a meaningless power loss, nor allowed to be in a high temperature state for a long time to avoid an explosion accident and avoid impact on personal safety. However, currently, there are few studies on thermal management of electric vehicles. In a current phase, most electric vehicles use a lot of components to form relatively complex pipeline routes, but electric vehicles can only implement few temperature modes, resulting in high costs, large sizes, and poor flexibility in thermal management. For example, currently, some electric vehicles can heat and cool batteries or electrical drivers, but cannot heat and cool passenger compartments. This is not conducive to improving driving experience of users. Currently, some electric vehicles can only heat various internal components simultaneously, but cannot heat the components separately. However, in some cases, physical fitness of a user may conflict with heating or cooling required by a battery. In this case, if a passenger compartment is still heated, the user's problem cannot be resolved, and the heating makes the user even hotter.

In view of this, further studies are required for thermal management of electric vehicles in the current phase.

SUMMARY

This application provides a thermal management system and an electric vehicle, to implement thermal management on an electric vehicle by using fewer components, and enable an electric vehicle to have more temperature modes.

According to a first aspect, this application provides a thermal management system. The thermal management system may include a compressor, a water-cooled condenser, a battery chiller, a valve body assembly, a first water pump, a second water pump, and a third water pump. The water-cooled condenser includes a first heat exchange pipe and a second heat exchange pipe, and the battery chiller includes a third heat exchange pipe and a fourth heat exchange pipe. An input end of the compressor is separately connected to an output end of an evaporator in an air conditioner box in a passenger compartment and an output end of the third heat exchange pipe, an output end of the compressor is connected to an input end of the second heat exchange pipe, and an output end of the second heat exchange pipe is separately connected to an input end of the evaporator and an input end of the third heat exchange pipe. A first end of the valve body assembly may be connected to a fourth end of the valve body assembly by using a first pipeline, where the first heat exchange pipe, a heater core in the air conditioner box in the passenger compartment, and the first water pump are disposed on the first pipeline. A second end of the valve body assembly may be connected to a third end of the valve body assembly by using a second pipeline, where the third heat exchange pipe is disposed on the second pipeline. A fifth end of the valve body assembly is connected to a sixth end of the valve body assembly by using a third pipeline, where the third water pump and a battery are disposed on the third pipeline. A seventh end of the valve body assembly may be separately connected to an eighth end of the valve body assembly and a ninth end of the valve body assembly by using a fourth pipeline, where the second water pump, an electrical driver, and a cooler in a front-end cooling module are disposed on the fourth pipeline.

In the foregoing design, by connecting the components based on the connection relationship, a passenger compartment refrigerating loop, a passenger compartment heating loop, a battery refrigerating loop, a battery heating loop, and an electrical driver refrigerating loop can be separately formed. Therefore, the solution can also achieve refrigeration or heating of any one or more of the passenger compartment, the battery, and the electrical driver by controlling these components. When the thermal management system is disposed in an electric vehicle, more temperature modes can be implemented in this manner by using fewer components. This can not only reduce costs and reduce process complexity of an electric vehicle, but also help control temperatures at all positions in an electric vehicle flexibly.

In an optional design, the thermal management system may include a first integrated unit and a second integrated unit, where one or more of the valve body assembly, the first water pump, the second water pump, and the third water pump may be integrated in the first integrated unit, and one or more of the compressor, the water-cooled condenser, and the battery chiller are integrated in the second integrated unit; or the thermal management system includes a third integrated unit, where one or more of the compressor, the water-cooled condenser, the battery chiller, the valve body assembly, the first water pump, the second water pump, and the third water pump are integrated in the third integrated unit. In this design, components of the thermal management system are integrated in the integrated unit, so that the thermal management system can be installed in a modular manner. This helps improve flexibility of deployment.

In an optional design, the valve body assembly is a nine-way valve. On the first pipeline, the first end of the nine-way valve is connected to an input end of the first heat exchange pipe, an output end of the first heat exchange pipe is connected to an input end of the heater core, an output end of the heater core is connected to an input end of the first water pump, and an output end of the first water pump is connected to the fourth end of the nine-way valve. On the second pipeline, the second end of the nine-way valve is connected to an output end of the fourth heat exchange pipe, and an input end of the fourth heat exchange pipe is connected to the third end of the nine-way valve. On the third pipeline, the fifth end of the nine-way valve is connected to an output end of the third water pump, an input end of the third water pump is connected to an output end of the battery, and an input end of the battery is connected to the sixth end of the nine-way valve. On the fourth pipeline, the seventh end of the nine-way valve is connected to an output end of the second water pump, an input end of the second water pump is connected to an output end of the electrical driver, an input end of the electrical driver is separately connected to an output end of the cooler and the eighth end of the nine-way valve, and an input end of the cooler is connected to the ninth end of the nine-way valve. In this design, the components of the thermal management system (for example, the compressor, the water-cooled condenser, the battery chiller, the valve body assembly, the first water pump, the second water pump, and the third water pump) are deployed in a centralized manner in a same area. This disposition manner makes various components be installed more compactly, and makes pipeline routes between the components as short as possible. This can also reduce a pressure loss of liquid when the liquid circulates along a pipeline, and improve refrigeration efficiency or heating efficiency of the thermal management system. Further, using the nine-way valve as the valve body assembly can not only simplify the structure of the thermal management system and improve convenience of control of the valve body assembly, but also help reduce space occupied by the thermal management system.

In an optional design, the valve body assembly may include a five-way valve, a four-way valve, and a first three-way valve; and a first end of the five-way valve is connected to a third end of the four-way valve. On the first pipeline, the first end of the five-way valve is connected to an input end of the first heat exchange pipe, an output end of the first heat exchange pipe is connected to an input end of the heater core, an output end of the heater core is connected to an input end of the first water pump, and an output end of the first water pump is connected to a third end of the five-way valve. On the second pipeline, a fifth end of the five-way valve is connected to an output end of the fourth heat exchange pipe, and an input end of the fourth heat exchange pipe is connected to a first end of the four-way valve. On the third pipeline, a second end of the four-way valve is connected to an output end of the battery, an input end of the battery is connected to an output end of the third water pump, and an input end of the third water pump is connected to a fourth end of the five-way valve. On the fourth pipeline, a first end of the first three-way valve is connected to an output end of the second water pump, an input end of the second water pump is connected to a second end of the five-way valve, a third end of the first three-way valve is connected to an input end of the cooler, both an output end of the cooler and a second end of the first three-way valve are connected to an input end of the electrical driver, and an output end of the electrical driver is connected to a fourth end of the four-way valve. The design uses a plurality of valve bodies to implement the valve body assembly. The valve bodies have simpler functions than the nine-way valve, and are relatively inexpensive and easier to obtain.

In an optional design, the thermal management system may further include a second three-way valve, where a first end of the second three-way valve is connected to the input end of the third water pump, a second end of the second three-way valve is connected to the first end of the five-way valve, and a third end of the second three-way valve is connected to the third end of the four-way valve. According to the design, the valve body assembly can further form a battery circulation loop and an operator cabin circulation loop through the second three-way valve, and in a case of refrigerating the battery and an operator cabin simultaneously, or heating the battery and an operator cabin simultaneously, a temperature of the battery and a temperature of the operator cabin can be controlled separately by using the two circulation loops, thereby further improving flexibility of thermal management.

In an optional design, the thermal management system may further include a high pressure pipe and a low pressure pipe that are coaxially disposed, where the high pressure pipe and the low pressure pipe are used to exchange heat. An input end of the high pressure pipe is connected to the output end of the second heat exchange pipe, an output end of the high pressure pipe is separately connected to the input end of the third heat exchange pipe and the input end of the evaporator, an input end of the low pressure pipe is separately connected to the output end of the heater core and the output end of the third heat exchange pipe, and an output end of the low pressure pipe is connected to the input end of the compressor. According to the design, after heat exchange is performed through the first heat exchange pipe and the second heat exchange pipe for the liquid for the first time, heat exchange can be further implemented through the high pressure pipe and the low pressure pipe for the second time. This manner helps further reduce a liquid temperature or further increase a liquid temperature, and helps improve refrigeration efficiency or heating efficiency.

In an optional design, the thermal management system may further include a water heater, where an input end of the water heater is connected to the output end of the first heat exchange pipe, and an output end of the water heater is connected to the input end of the heater core. In this way, when the temperature of the liquid output by the second heat exchange pipe cannot meet a heating requirement of the passenger compartment or the battery, the liquid may be further heated by using the water heater, thereby improving a heating effect.

In an optional design, the thermal management system further includes a first throttle and a second throttle. Both an input end of the first throttle and an input end of the second throttle are connected to the output end of the second heat exchange pipe, an output end of the first throttle is connected to the input end of the third heat exchange pipe, and an output end of the second throttle is connected to the input end of the evaporator. In this design, because the first throttle and the second throttle are located in different refrigerant loops, the thermal management system may further use the first throttle and the second throttle to control an amount of liquid flowing into each of the two refrigerant loops, so that the refrigeration effect in each refrigerant loop can meet a user requirement.

In an optional design, the thermal management system may further include a liquid storage tank, where the liquid storage tank is disposed outside the output end of the second heat exchange pipe, an input end of the liquid storage tank is connected to the output end of the second heat exchange pipe, and an output end of the liquid storage tank is connected to the first end of the valve body assembly. In this way, the liquid storage tank can support an adjustment of the amount of liquid in the refrigerant loop based on the refrigeration effect or the heating effect. For example, when the amount of liquid is reduced, the liquid storage tank can automatically store more liquid.

In an optional design, the thermal management system may further include a gas-liquid separator, where an input end of the gas-liquid separator is separately connected to the output end of the evaporator and the output end of the third heat exchange pipe, and an output end of the gas-liquid separator is connected to the input end of the compressor. The design can not only use the gas-liquid separator to implement a liquid storage function, but also use the gas-liquid separator to retain liquid in a gas-liquid mixture, and only allow gas to flow into the compressor, to improve a compression effect of the compressor.

In an optional design, the thermal management system may further include a first tank and a second tank, where an input end of the first tank is connected to the output end of the heater core, an output end of the first tank is connected to the input end of the first water pump, an input end of the second tank is connected to the output end of the electrical driver, and an output end of the second tank is connected to the seventh end of the valve body assembly. According to the design, the thermal management system can further filter the gas by using the first tank and the second tank, while allowing only the liquid to circulate through the loops, to improve a refrigeration effect or heating effect.

According to a second aspect, this application further provides an electric vehicle. The electric vehicle may include a controller, the thermal management system according to any one of the first aspect, an air conditioner in a passenger compartment, a battery, a driver, and a front-end cooling module. The controller may be connected to each valve in the thermal management system; and the controller can implement any one of the following modes by controlling opening and closing of each valve: a mode of refrigerating the passenger compartment and the battery simultaneously, a mode of cooling only the passenger compartment, a mode of cooling only the battery, a mode of cooling the battery but heating the passenger compartment, a mode of naturally cooling the battery, a mode of automatically cooling the driver, a mode of heating the passenger compartment and the battery simultaneously, a mode of heating the battery and dehumidifying the passenger compartment, a mode of heating only the passenger compartment, a mode of heating only the battery, and a mode of dehumidifying the entire vehicle. According to the design, an electric vehicle can implement free switching of one or more modes of refrigerating or heating the passenger compartment, the battery, and the electrical driver, so that the electric vehicle can meet various user requirements and improve driving experience of a user.

These or other aspects of this application are more concise and easier to understand in descriptions of the following embodiments.

DESCRIPTION OF EMBODIMENTS

A thermal management system in this application is applicable to an electric vehicle. The electric vehicle is a vehicle driven by using an electrical driver. The electrical driver may include, for example, a power distribution unit (PDU), a microcontroller unit (MCU), a mapped diagnostic context (MDC), a motor, and the like. Components of a thermal management system used in an existing electric vehicle are deployed in a scattering manner, resulting in relatively long pipeline routes. Consequently, when liquid circulates in the pipeline routes (also referred to as pipelines), a relatively severe pressure loss is caused, and a refrigeration effect or a heating effect of a loop is affected. In view of this, in this application, all components of the thermal management system are deployed in a centralized manner in the thermal management system, a refrigeration effect and a heating effect of a loop are improved by using relatively short loop routes, and further, any component of a passenger compartment, a battery, and the electrical driver in the electric vehicle is cooled independently, or any two or any three components of the passenger compartment, the battery, and the electrical driver in the electric vehicle are cooled simultaneously.

The following clearly and completely describes the technical solutions in the embodiments of this application with reference to the accompanying drawings in the embodiments of this application. It should be noted that, in the descriptions of this application, "at least one" means one or more, and "a plurality of" means two or more. In view of this, in the embodiments of the present disclosure, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between associated objects. In addition, it should be understood that in the descriptions of this application, terms such as "first" and "second" are merely used for differentiation and description, but should not be understood as an indication or implication of relative importance or an indication or implication of an order.

It should be noted that, in this application, all "connections" are pipeline connections, that is, all "connections" in the following descriptions may be replaced with "pipeline connections". In addition, a "battery" in the following descriptions may be understood as a pipeline in which the battery is located.

Embodiment 1

Figure 1A:
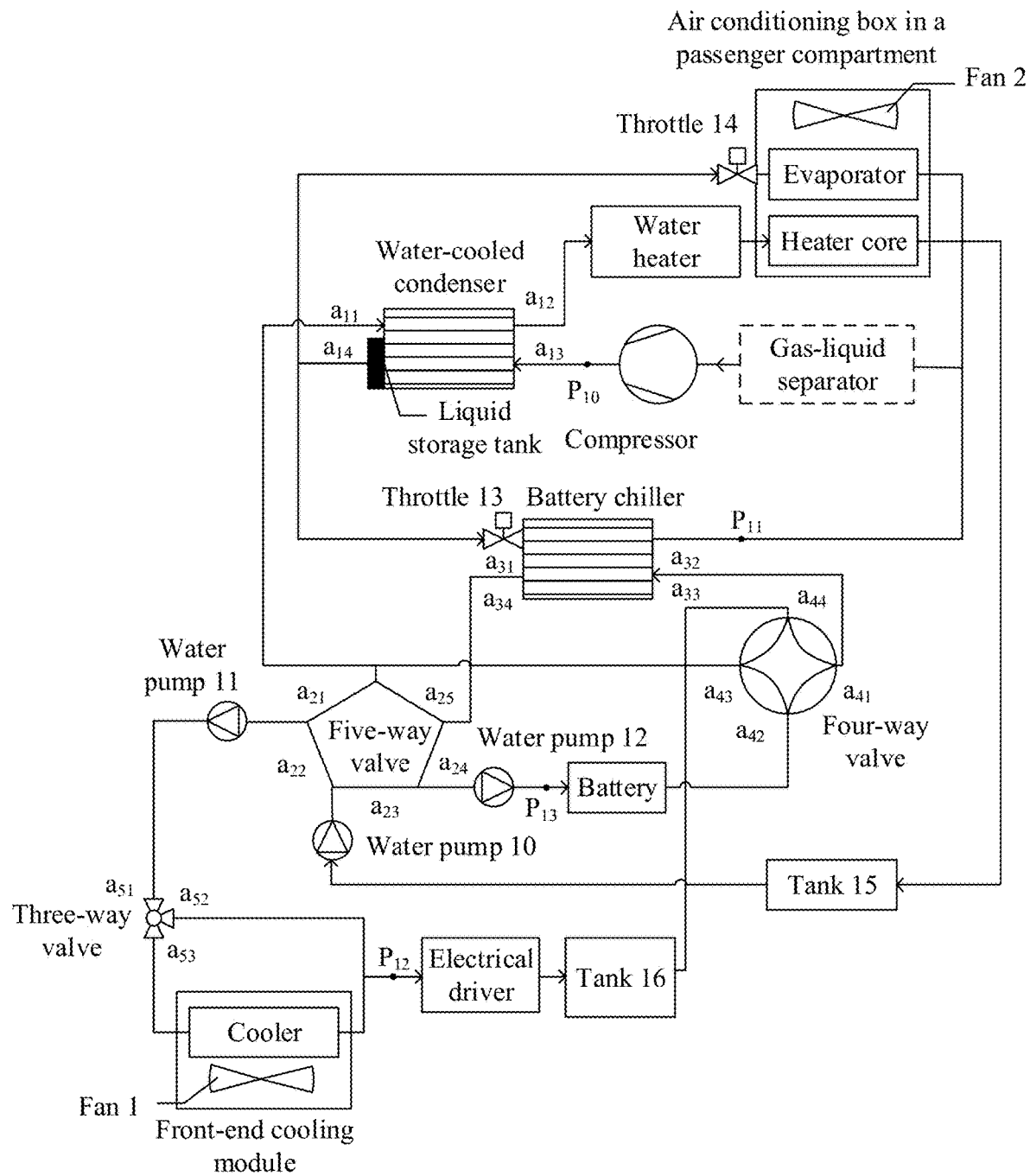
FIG. 1A is a schematic diagram illustrating a structure of a thermal management system according to embodiment 1 of this application.

FIG. 1A is a schematic diagram illustrating a structure of a thermal management system according to embodiment 1 of this application. As shown in FIG. 1A, the thermal management system may include a compressor, a water-cooled condenser, a battery chiller, a five-way valve, a four-way valve, a three-way valve, a first water pump (11), a second water pump (12), and a third water pump (13). The water-cooled condenser may include a first heat exchange pipe and a second heat exchange pipe. The battery chiller may include a third heat exchange pipe and a fourth heat exchange pipe. An input end ($a_{11}$) of the first heat exchange pipe is separately connected to a first end ($a_{21}$) of the five-way valve and a third end ($a_{43}$) of the four-way valve, an output end ($a_{12}$) of the first heat exchange pipe is connected to an input end of a heater core in an air conditioner box in a passenger compartment, an output end of the heater core is connected to an input end of a water pump 10, and an output end of the water pump 10 is connected to a third end ($a_{23}$) of the five-way valve. An input end ($a_{13}$) of the second heat exchange pipe is connected to an output end of the compressor. An output end ($a_{14}$) of the second heat exchange pipe is divided into two branches, where one branch is connected to an input end ($a_{31}$) of the third heat exchange pipe, and then to an input end of the compressor through an output end ($a_{32}$) of the third heat exchange pipeline, and the other branch is connected to an input end of an evaporator in the air conditioner box in the passenger compartment, and then to the input end of the compressor through an output end of the evaporator. An input end ($a_{33}$) of the fourth heat exchange pipe is connected to a first end ($a_{41}$) of the four-way valve, and an output end ($a_{34}$) of the fourth heat exchange pipe is connected to a fifth end ($a_{25}$) of the five-way valve. A second end ($a_{22}$) of the five-way valve is connected to an input end of the water pump 11, and an output end of the water pump 11 is connected to a first end ($a_{51}$) of the three-way valve. A second end ($a_{52}$) of the three-way valve is connected to an input end of an electrical driver. A third end ($a_{53}$) of the three-way valve is connected to an input end of a cooler in a front-end cooling module, and an output end of the cooler is also connected to the input end of the electrical driver. In this way, a fourth end ($a_{44}$) of the four-way valve is connected through an output end of the electrical driver. A fourth end ($a_{24}$) of the five-way valve is connected to an input end of the water pump 12, an output end of the water pump 12 is connected to an input end of a battery, and an output end of the battery is connected to a second end ($a_{42}$) of the four-way valve.

Figure 1B:
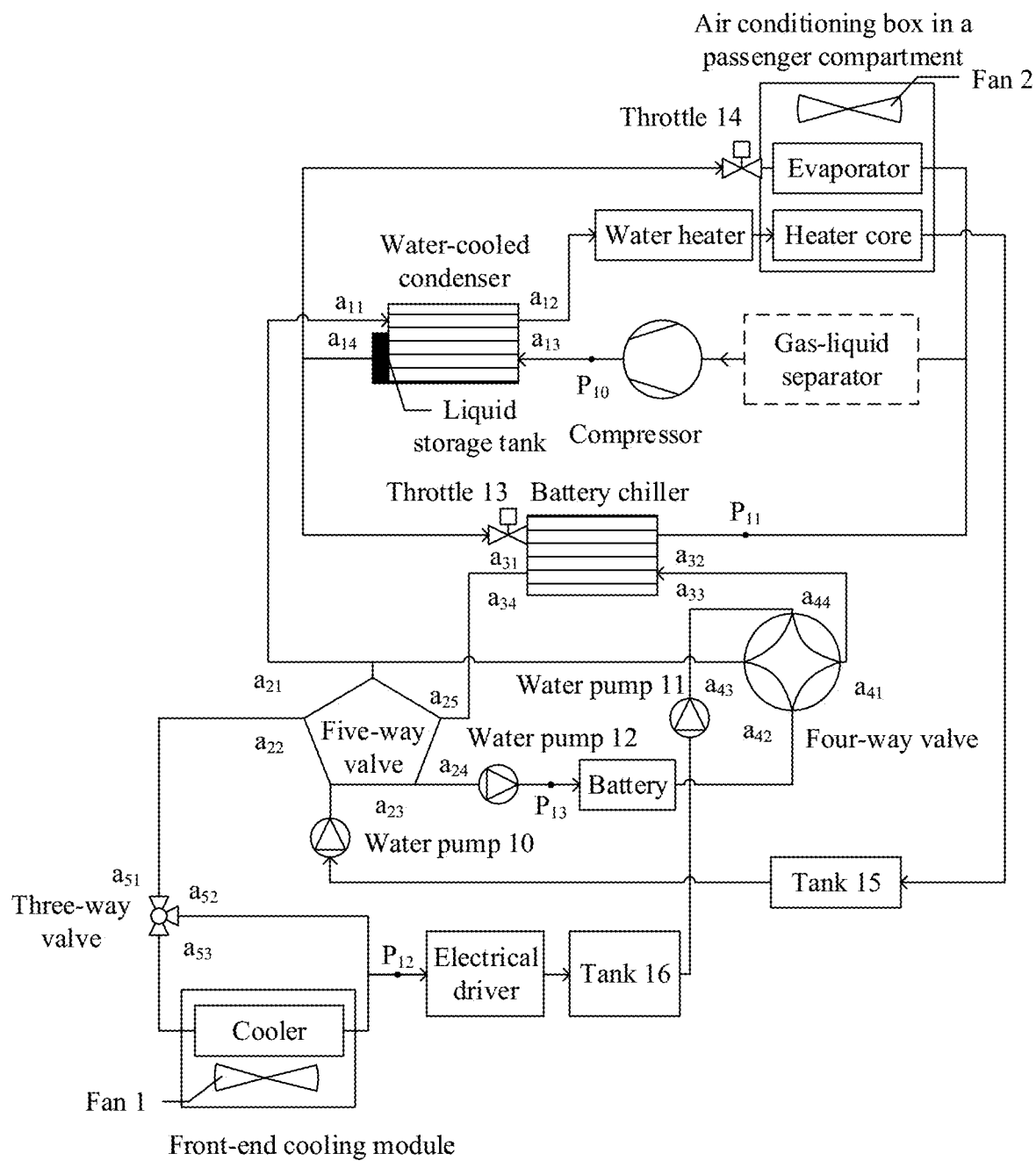
FIG. 1B is another schematic diagram illustrating a structure of a thermal management system according to embodiment 1 of this application.

It should be noted that the connection relationship between the components in FIG. 1A is merely an example for description. Positions of components located on a same loop may also be interchanged, but are not limited to the connection relationship shown in FIG. 1A. For example, the water pump 11 in FIG. 1A may alternatively be disposed between a tank 16 and the fourth end a44 of the four-way valve. In this case, an internal structure of the thermal management system may be shown in FIG. 1B. Because the water pump 11 is moved only from one end of the five-way valve shown in FIG. 1A to one end of the four-way valve shown in FIG. 1B, such position interchange has no substantial impact on the implementation of the solution. The following describes an implementation process of the solution by using the thermal management system shown in FIG. 1A.

In this embodiment of this application, the cooler is disposed in the front-end cooling module. A first fan (1) is also disposed in the front-end cooling module, and the fan 1 may implement heat exchange between an ambient temperature and the cooler by using ambient air. Therefore, the heat exchange for the cooler may include heating or cooling. For example, because a temperature of a coolant in winter is lower than an ambient temperature, the front-end cooling module may heat the coolant based on the ambient temperature; because a temperature of the coolant in summer is higher than an ambient temperature, the front-end cooling module may cool the coolant based on the ambient temperature. For ease of understanding, the following describes only cooling of the front-end cooling module as an example. It should be noted that this does not mean that the front-end cooling module cannot perform heating. In this embodiment of this application, the evaporator and the heater core are disposed in the air conditioner box in the passenger compartment. A second fan (2) may also be disposed in the air conditioner box in the passenger compartment. The fan 2 may directly blow ambient air (neither cooling nor heating) to the passenger compartment. Alternatively, ambient air may be cooled by the evaporator before the ambient air is blown out, or the air may be heated by the heater core before the ambient air is blown out.

In an optional implementation, still with reference to FIG. 1A, the thermal management system may further include a water heater, where an input end of the water heater is connected to the output end $a_{12}$ of the first heat exchange pipe, and an output end of the water heater is connected to the input end of the heater core. The water heater is configured to heat the coolant flowing through the water heater. When the passenger compartment needs to be heated, if a temperature of warm air blown out of the heater core to the passenger compartment does not reach a temperature set by a user, the coolant output by the first heat exchange pipe may be further heated by using the water heater. In this way, the coolant flowing to the heater core has a higher temperature, to increase the temperature of the warm air blowing out to the passenger compartment and improving a heating effect of the passenger compartment. If the temperature of the warm air blown out of the heater core to the passenger compartment is appropriate, the water heater may be turned off directly.

In an optional implementation, still with reference to FIG. 1A, the thermal management system may further include at least one throttle, such as a first throttle (13) and a second throttle (14). Both an input end of the throttle 13 and an input end of the throttle 14 are respectively connected to the output end $a_{14}$ of the second heat exchange pipe, an output end of the throttle 13 is connected to the input end $a_{31}$ of the third heat exchange pipe, and an output end of the throttle 14 is connected to the input end of the evaporator. The throttle is configured to control a flux of output liquid. When the throttle is completely closed, the throttle does not output liquid. In this case, if the throttle 13 is closed, low-temperature and low-pressure refrigerant liquid obtained through heat exchange by the second heat exchange pipe cannot be transmitted to the third heat exchange pipe through the throttle 13, and the fourth heat exchange pipe cannot exchange heat with the third heat exchange pipe to obtain a low-temperature coolant. Therefore, the thermal management system cannot refrigerate the battery or the electrical driver by using a refrigerant. Similarly, if the throttle 14 is closed, high-temperature and high-pressure refrigerant liquid obtained through heat exchange by the first heat exchange pipe cannot be transmitted to the heater core through the throttle 14. Therefore, the thermal management system cannot heat the passenger compartment by using the refrigerant.

In an optional implementation, still with reference to FIG. 1A, the thermal management system may further include a liquid storage tank. The liquid storage tank is disposed outside the output end of the second heat exchange pipe, and an input end of the liquid storage tank is connected to the output end of the second heat exchange pipe. The liquid storage tank is configured to store a part of refrigerant liquid in a first refrigerant loop and/or a second refrigerant loop. When cooling is excessive, the thermal management system may increase the refrigerant stored in the liquid storage tank, to reduce the refrigerant flowing in the first refrigerant loop and/or the second refrigerant loop, reduce a refrigeration capability of the first refrigerant loop and/or the second refrigerant loop, and resolve the problem of excessive cooling. When cooling is insufficient, the thermal management system may reduce the refrigerant stored in the liquid storage tank, to increase the refrigerant flowing in the first refrigerant loop and/or the second refrigerant loop, improve the refrigeration capability of the first refrigerant loop and/or the second refrigerant loop, and implement further cooling. In addition, after high-temperature and high-pressure refrigerant gas output by the compressor enters the second heat exchange pipe, if a heat exchange capability of the second heat exchange pipe is insufficient (for example, there is a lot of refrigerant gas, and exchanged heat cannot condense all refrigerant liquid), the refrigerant liquid obtained through heat exchange may be further mixed with a part of refrigerant gas. If the gas-liquid mixture is directly transmitted to the third heat exchange pipe, a capability of the third heat exchange pipe for cooling the coolant in the fourth heat exchange pipe is further affected. To resolve this problem, the input end of the liquid storage tank may alternatively be arranged at an upper end of a tank body, and an output end of the liquid storage tank may be arranged in a lower middle of the tank body. In this way, when the gas-liquid mixture output by the second heat exchange pipe passes through the liquid storage tank, the liquid storage tank can also filter the refrigerant gas, and output as much refrigerant liquid as possible and as little refrigerant gas as possible to the third heat exchange pipe, to improve a heat exchange capability of the battery chiller.

In this embodiment of this application, when a capability of the evaporator for evaporating the refrigerant liquid is insufficient, (or the refrigerant liquid is not evaporated in time due to an excessively high flow rate, or the refrigerant gas obtained through evaporation is condensed when flowing), the refrigerant gas output by the evaporator or the third heat exchange pipe may be further mixed with a part of refrigerant liquid. This not only affects a compression effect of the compressor, but also affects a service life of the compressor due to existence of the refrigerant liquid. Therefore, to resolve this problem, in an optional implementation, still with reference to FIG. 1A, the thermal management system may further include a gas-liquid separator. An input end of the gas-liquid separator is separately connected to the output end of the evaporator and the output end of the third heat exchange pipe. An output end of the gas-liquid separator is connected to the input end of the compressor. The gas-liquid separator is configured to perform gas-liquid separation on the refrigerant output by the evaporator and/or the third heat exchange pipe, so that the refrigerant gas flows into the compressor and that the refrigerant liquid is stored in the gas-liquid separator. In this way, on one hand, the compressor is enabled to receive pure refrigerant gas (being pure herein means that the liquid is not mixed with refrigerant liquid), and the compression effect of the compressor is improved to a greatest extent without affecting the service life of the compressor; on the other hand, a refrigeration effect of the refrigerant loop can be adjusted by storing the refrigerant liquid. For example, because both the gas-liquid separation apparatus and the liquid storage tank can store refrigerant liquid, the thermal management system may be provided with only the gas-liquid separation apparatus or only the liquid storage tank, rather than with both the two components. This reduces costs of the thermal management system. When only the liquid storage tank is disposed, if the compressor is still required to receive pure refrigerant gas, fluxes of the throttle 13 and the throttle 14 may be adjusted to minimize the refrigerant liquid flowing to the evaporator and the third heat exchange pipe and ensure that all the refrigerant liquid flowing the throttles is evaporated. In this way, there is no residual refrigerant liquid in the refrigerant gas output from the evaporator and the third heat exchange pipe.

In an optional implementation, still with reference to FIG. 1A, the thermal management system may further include at least one tank, such as a first tank (15) and a second tank (16). An input end of the tank 15 may be connected to the output end of the heater core, and an output end of the tank 15 may be connected to the input end of the water pump 10. An input end of the tank 16 may be connected to the output end of the electrical driver, and an output end of the tank 16 may be connected to the fourth end $a_{44}$ of the four-way valve. The tank is a container with an upper opening. The input end of the tank is located above the tank, and the output end of the tank is located below the tank. When the gas-liquid mixture enters the tank through the input end of the tank, the liquid in the gas-liquid mixture flows to the lower end of the tank due to the action of gravity and flows out at the output end of the tank, while the gas in the gas-liquid mixture is left in the tank. Therefore, the tank is actually equivalent to a component for purifying the liquid (so that the liquid is not mixed with gas). In this case, both the tank 15 and the tank 16 are disposed in a coolant loop, so that the tank 15 and the tank 16 can purify a coolant in the coolant loop. When the coolant is purer, a temperature adjustment effect of the coolant loop is better or improved.

In an optional implementation, still with reference to FIG. 1A, to learn an actual temperature and actual pressure at each key position in the thermal management system, and determine whether a temperature control effect needs to be adjusted in a next step, a temperature-pressure sensor such as a temperature-pressure sensor $P_{10}$, a temperature-pressure sensor $P_{11}$, a temperature-pressure sensor $P_{12}$, or a temperature-pressure sensor $P_{13}$ may be further disposed at each key position in the thermal management system. The temperature-pressure sensor $P_{10}$ is disposed at an air outlet of the compressor, and is configured to detect a temperature and pressure of the refrigerant output by the compressor. The temperature-pressure sensor P11 is disposed at an air outlet of the third heat exchange pipe, and is configured to detect a temperature and pressure of the battery chiller. The temperature-pressure sensor $P_{12}$ is disposed at a water inlet of the electrical driver, and is configured to detect a temperature and pressure of the electrical driver. The temperature-pressure sensor $P_{13}$ is disposed at a water inlet of the battery, and is configured to detect a temperature and pressure of the battery. It should be understood that the foregoing illustrated key positions are merely examples for description and that this application is not limited to these key positions.

It can be learned from the foregoing content that, in embodiment 1 of this application, components of the thermal management system are deployed in a same area as many as possible, so that various components are installed more compactly, and pipeline routes between the components can be relatively short. This not only helps reduce space occupied by the thermal management system, but also can reduce a pressure loss of liquid when the liquid circulates along a pipeline, and improve refrigeration efficiency or heating efficiency of the thermal management system.

In this embodiment of this application, a modular design may be further implemented for the components of the thermal management system in an integration mode. The modular design means that components with similar functions or structures (or randomly selected components) are integrated into one module. This not only helps reduce the occupied space, but also can freely combine the modules, and improve design flexibility. The modular design can be implemented in a plurality of solutions. Examples of the solutions are as follows.

In an optional implementation, various valve components in the thermal management system may be integrated in a first integrated unit (referred to as a valve assembly). A valve component is a component capable of controlling flowing of liquid. Each valve component may include at least two of the five-way valve, the three-way valve, the four-way valve, the water pump 10, the water pump 11, the water pump 12, the tank 15, and the tank 16. The following describes two possible integration modes of the valve assembly by using examples.

Figure 2A:
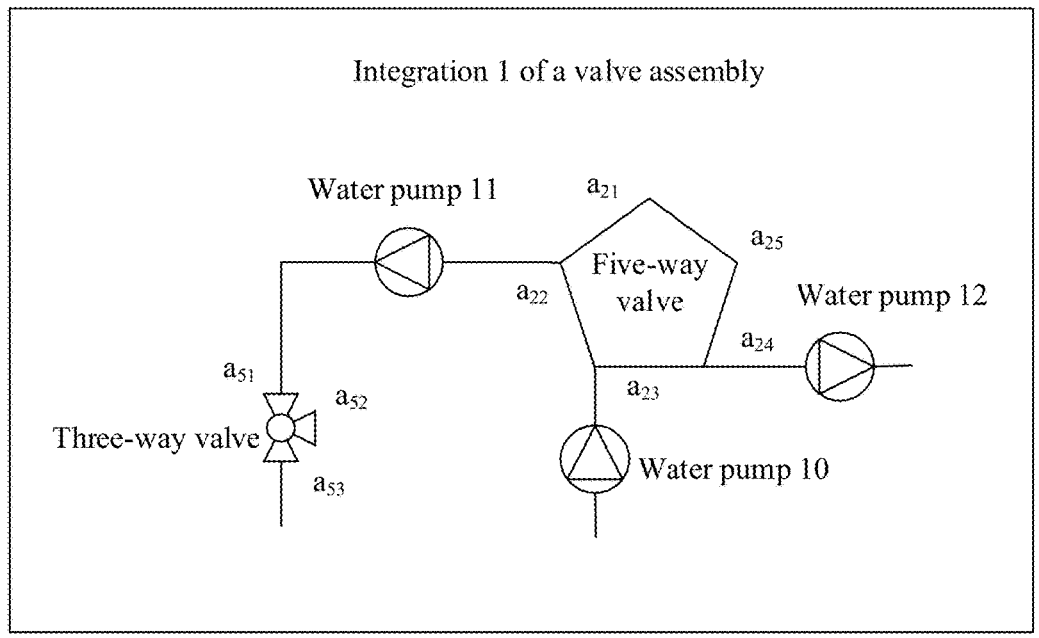
FIG. 2A is a schematic diagram illustrating an integration mode of a valve assembly according to embodiment 1 of this application.

FIG. 2A is a schematic diagram illustrating an integration mode of a valve assembly according to embodiment 1 of this application. As shown in FIG. 2A, in this integration mode, the five-way valve, the three-way valve, the water pump 10, the water pump 11, and the water pump 12 are integrated in the first integrated unit.

Figure 2B:
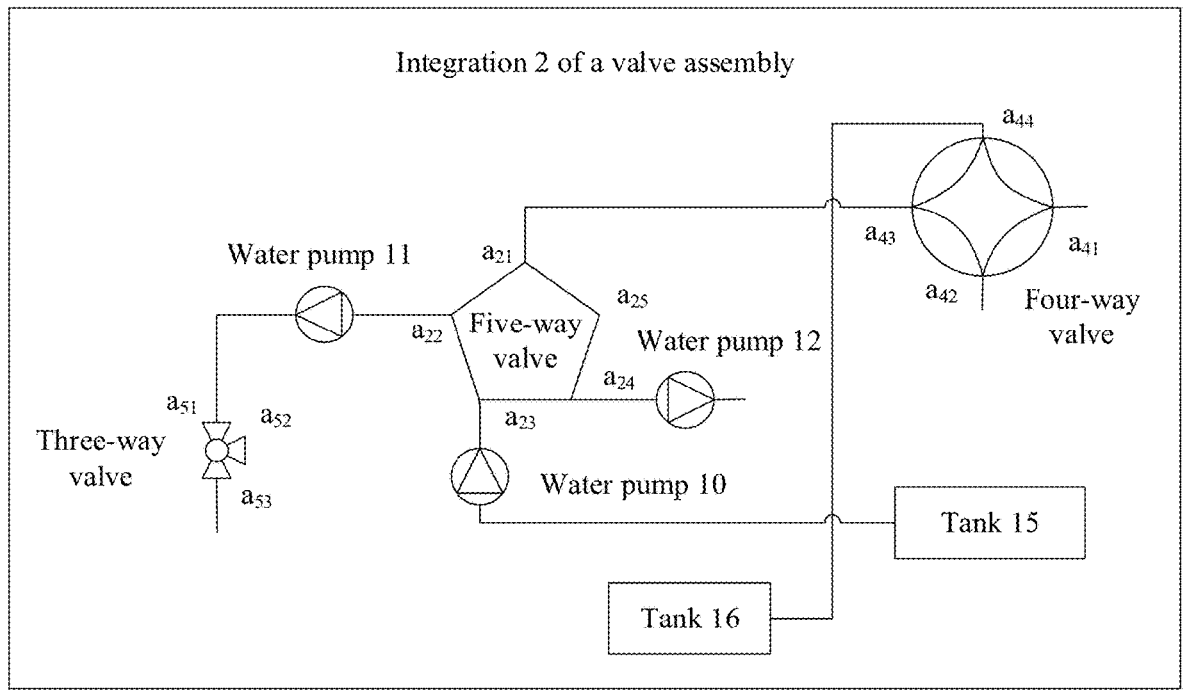
FIG. 2B is a schematic diagram illustrating another integration mode of a valve assembly according to embodiment 1 of this application.

FIG. 2B is another schematic diagram illustrating an integration mode of a valve assembly according to embodiment 1 of this application. As shown in FIG. 2B, in this integration mode, the five-way valve, the three-way valve, the water pump 10, the water pump 11, the water pump 12, the four-way valve, the tank 15, and the tank 16 are integrated in the valve assembly. The valve assembly in this mode integrates more components than that in the mode in FIG. 3A, and therefore has a lighter structure.

In an optional implementation, each exchanger component in the thermal management system may be further integrated in a second integrated unit (referred to as a plate-fin heat exchanger assembly). An exchanger component is a component capable of performing a heat exchange operation. Each exchanger component may include a water-cooled condenser and a battery chiller, or may further include a water heater or a compressor. It may be understood that, when the thermal management system includes the liquid storage tank, because the liquid storage tank is directly disposed at one port of the water-cooled condenser, the liquid storage tank may also be directly integrated in the plate-fin heat exchanger assembly. Correspondingly, because the throttle 13 is disposed at one port of the battery chiller, the throttle 13 may also be directly integrated in the plate-fin heat exchanger assembly. In addition, to facilitate detection of a heat exchange status of each exchanger component, some temperature-pressure sensors corresponding to the exchanger component may also be integrated in the plate-fin heat exchanger assembly.

When the thermal management system includes the liquid storage tank, the plate-fin heat exchanger assembly may be integrated in the following mode.

Figure 3A:
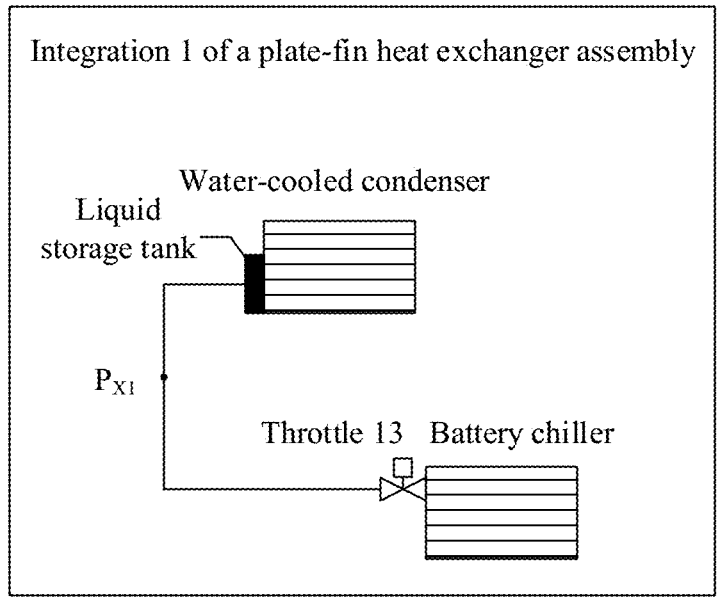
FIG. 3A is a schematic diagram illustrating an integration mode of a plate-fin heat exchanger assembly according to embodiment 1 of this application.

FIG. 3A is a schematic diagram illustrating an integration mode of a plate-fin heat exchanger assembly according to Embodiment 1 of this application. As shown in FIG. 3A, in this integration mode, the water-cooled condenser and the battery chiller are integrated in the plate-fin heat exchanger assembly. The liquid storage tank disposed at one port of the water-cooled condenser and the throttle 13 disposed at one port of the battery chiller may also be integrated in the plate-fin heat exchanger assembly. A temperature-pressure sensor ($P_{x1}$) may be integrated in a pipe connecting the water-cooled condenser and the battery chiller.

Figure 3B:
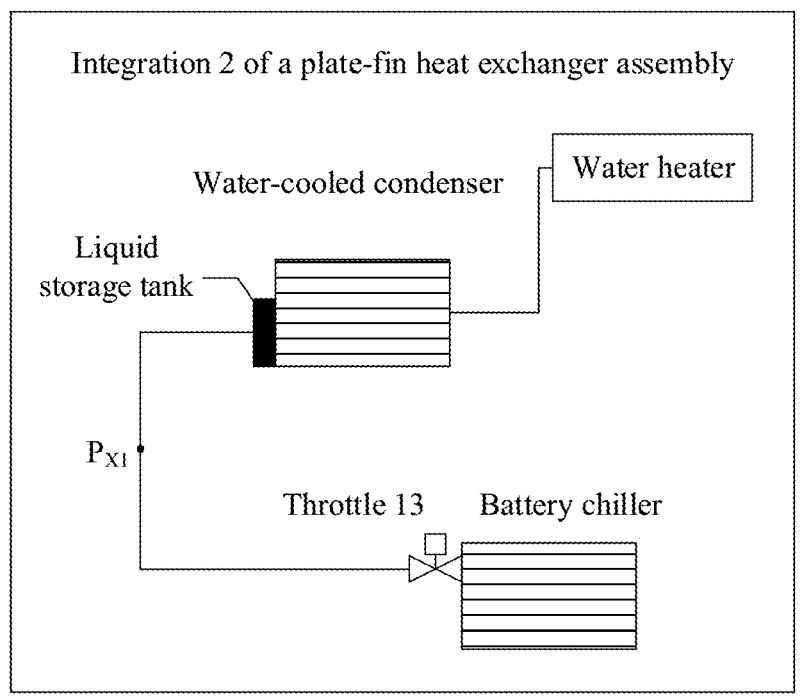
FIG. 3B is a schematic diagram illustrating another integration mode of a plate-fin heat exchanger assembly according to embodiment 1 of this application.

FIG. 3B is another schematic diagram illustrating an integration mode of a plate-fin heat exchanger assembly according to Embodiment 1 of this application. As shown in FIG. 3B, in this integration mode, the water-cooled condenser, the battery chiller, and the water heater are integrated in the plate-fin heat exchanger assembly. The liquid storage tank disposed at one port of the water-cooled condenser and the throttle 13 disposed at one port of the battery chiller may also be integrated in the plate-fin heat exchanger assembly. A temperature-pressure sensor $P_{x1}$ may be integrated in a pipe connecting the water-cooled condenser and the battery chiller.

Figure 3C:
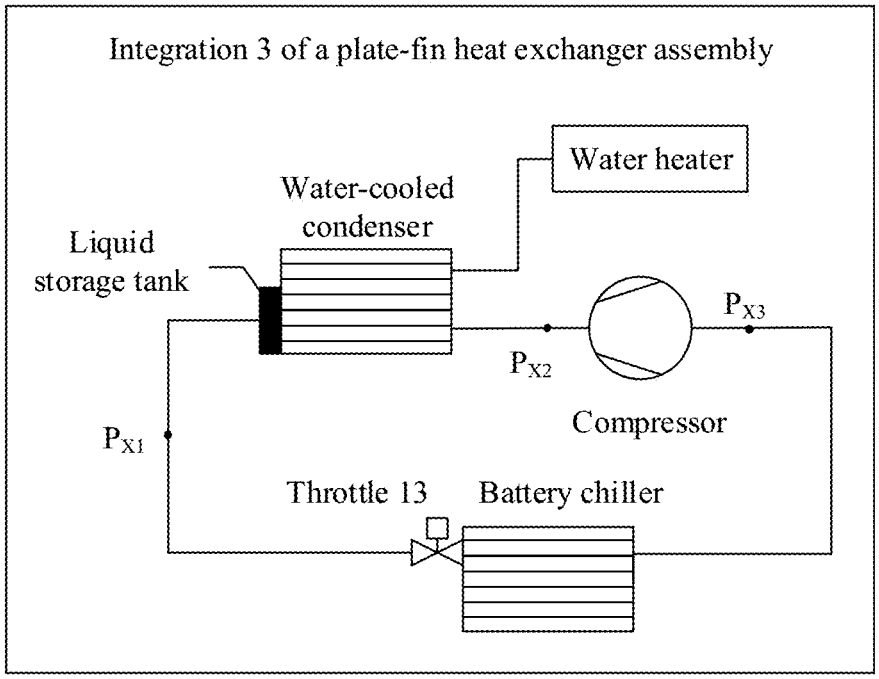
FIG. 3C illustrates still another integration mode of a plate-fin heat exchanger assembly according to embodiment 1 of this application.

FIG. 3C illustrates still another integration mode of a plate-fin heat exchanger assembly according to embodiment 1 of this application. As shown in FIG. 3C, in this integration mode, the water-cooled condenser, the battery chiller, the water heater, and the compressor are integrated in the plate-fin heat exchanger assembly. The liquid storage tank disposed at one port of the water-cooled condenser and the throttle 13 disposed at one port of the battery chiller may also be integrated in the plate-fin heat exchanger assembly, and a temperature-pressure sensor $P_{x1}$ may be integrated in a pipe connecting the water-cooled condenser and the battery chiller. A temperature-pressure sensor ($P_{x2}$) may be integrated in a pipe connecting the water-cooled condenser and the compressor, and a temperature-pressure sensor ($P_{x3}$) may be integrated in a pipe connecting the compressor and the battery chiller.

When the thermal management system includes the gas-liquid separator, the plate-fin heat exchanger assembly may be integrated in the following mode.

Figure 4A:
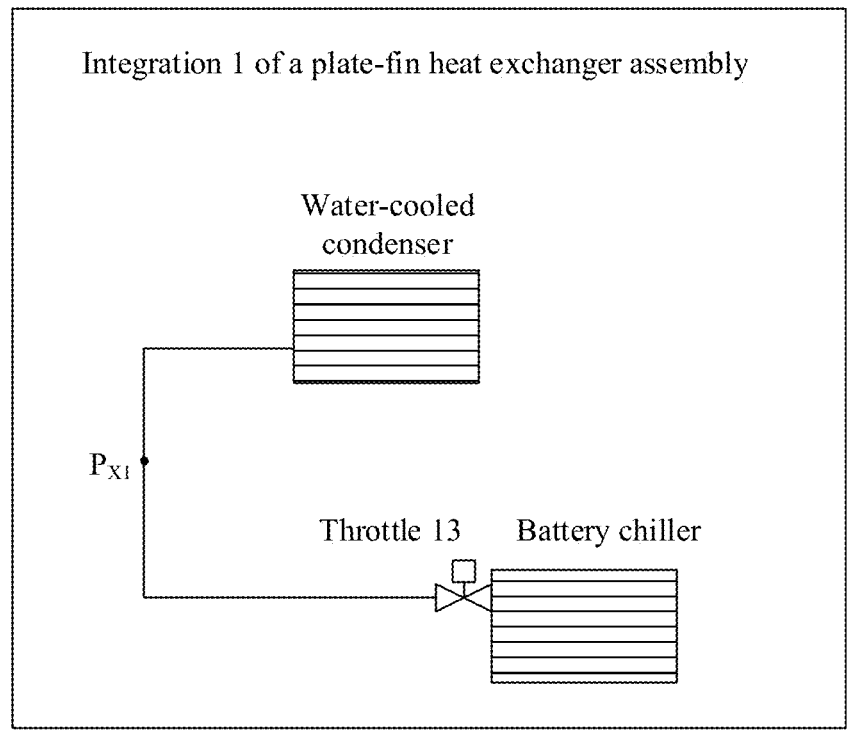
FIG. 4A is a schematic diagram illustrating still another integration mode of a plate-fin heat exchanger assembly according to embodiment 1 of this application.

FIG. 4A is a schematic diagram illustrating still another integration mode of a plate-fin heat exchanger assembly according to embodiment 1 of this application. As shown in FIG. 4A, in this integration mode, the water-cooled condenser and the battery chiller are integrated in the plate-fin heat exchanger assembly. The throttle 13 disposed at one port of the battery chiller may also be integrated in the plate-fin heat exchanger assembly. A temperature-pressure sensor $P_{x1}$ may be integrated in a pipe connecting the water-cooled condenser and the battery chiller.

Figure 4B:
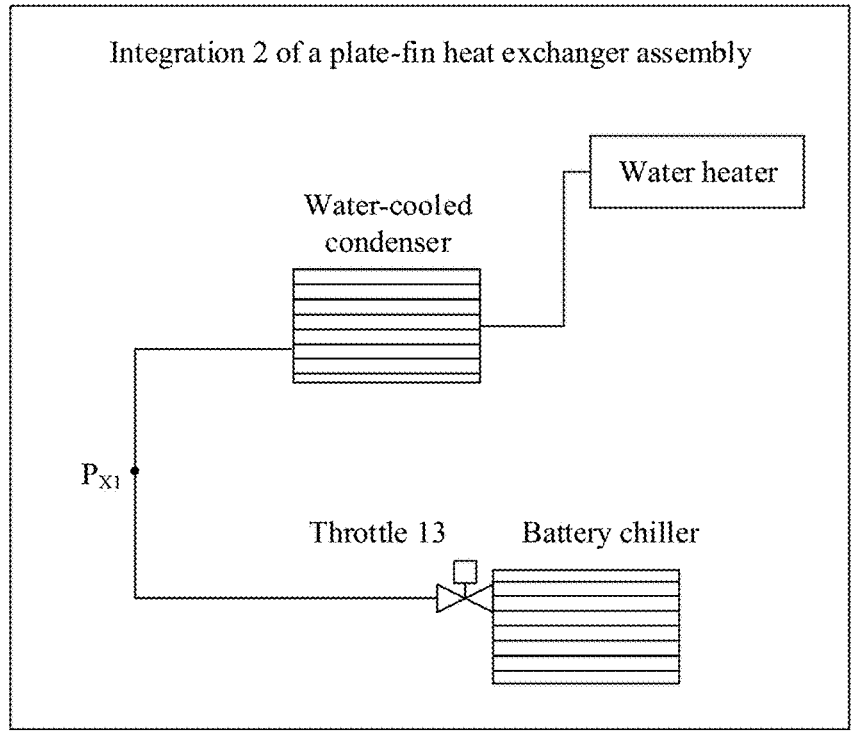
FIG. 4B is a schematic diagram illustrating still another integration mode of a plate-fin heat exchanger assembly according to embodiment 1 of this application.

FIG. 4B is a schematic diagram illustrating still another integration mode of a plate-fin heat exchanger assembly according to embodiment 1 of this application. As shown in FIG. 4B, in this integration mode, the water-cooled condenser, the battery chiller, and the water heater are integrated in the plate-fin heat exchanger assembly. The throttle 13 disposed at one port of the battery chiller may also be integrated in the plate-fin heat exchanger assembly. A temperature-pressure sensor $P_{x1}$ may be integrated in a pipe connecting the water-cooled condenser and the battery chiller.

Figure 4C:
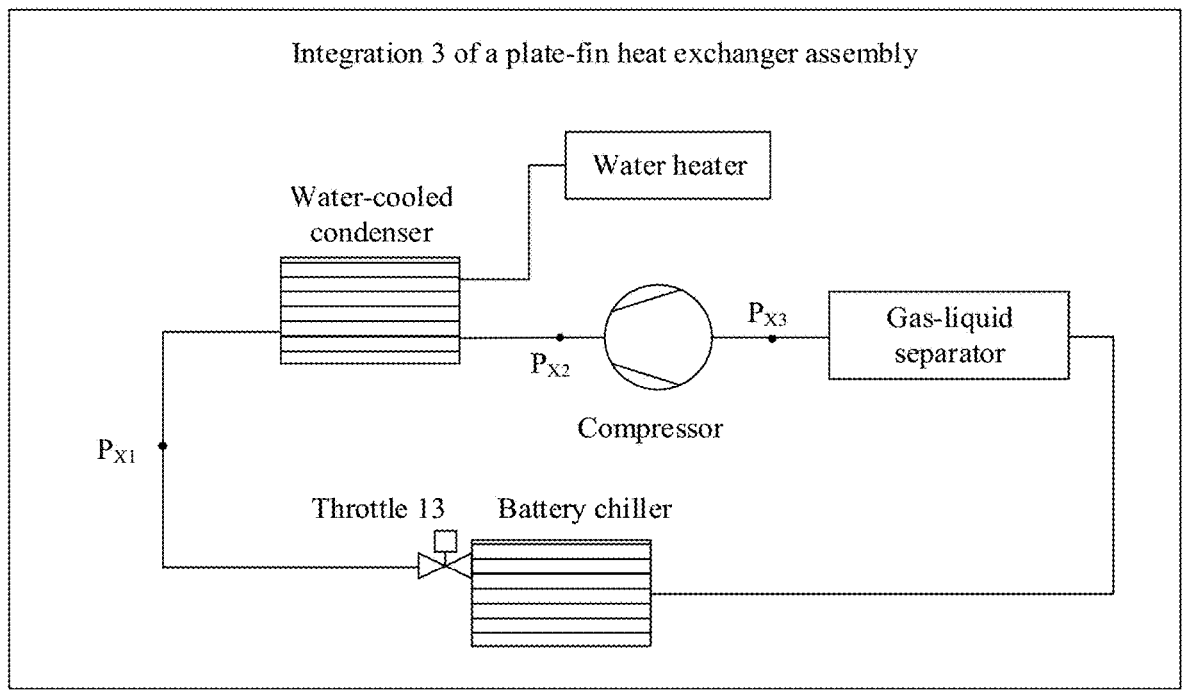
FIG. 4C is a schematic diagram illustrating still another integration mode of a plate-fin heat exchanger assembly according to embodiment 1 of this application.

FIG. 4C is a schematic diagram illustrating still another integration mode of a plate-fin heat exchanger assembly according to embodiment 1 of this application. As shown in FIG. 4C, in this integration mode, the water-cooled condenser, the battery chiller, the water heater, the compressor, and the gas-liquid separator are integrated in the plate-fin heat exchanger assembly. The throttle 13 disposed at one port of the battery chiller may also be integrated in the plate-fin heat exchanger assembly. A temperature-pressure sensor $P_{x1}$ may be integrated in a pipe connecting the water-cooled condenser and the battery chiller. A temperature-pressure sensor ($P_{x2}$) may be integrated in a pipe connecting the water-cooled condenser and the compressor. A temperature-pressure sensor ($P_{x3}$) may be integrated in a pipe connecting the compressor and the battery chiller.

It should be understood that, in the thermal management system, all exchanger components may be integrated in the plate-fin heat exchanger assembly and all valve components may be integrated in the valve assembly. In this way, the thermal management system includes both the plate-fin heat exchanger assembly and the valve assembly. When the thermal management system includes the valve assembly and the plate-fin heat exchanger assembly, integration may be performed for the thermal management system based on a combination of the foregoing valve assembly and plate-fin heat exchanger assembly, and details are not described herein again.

Figure 5A:
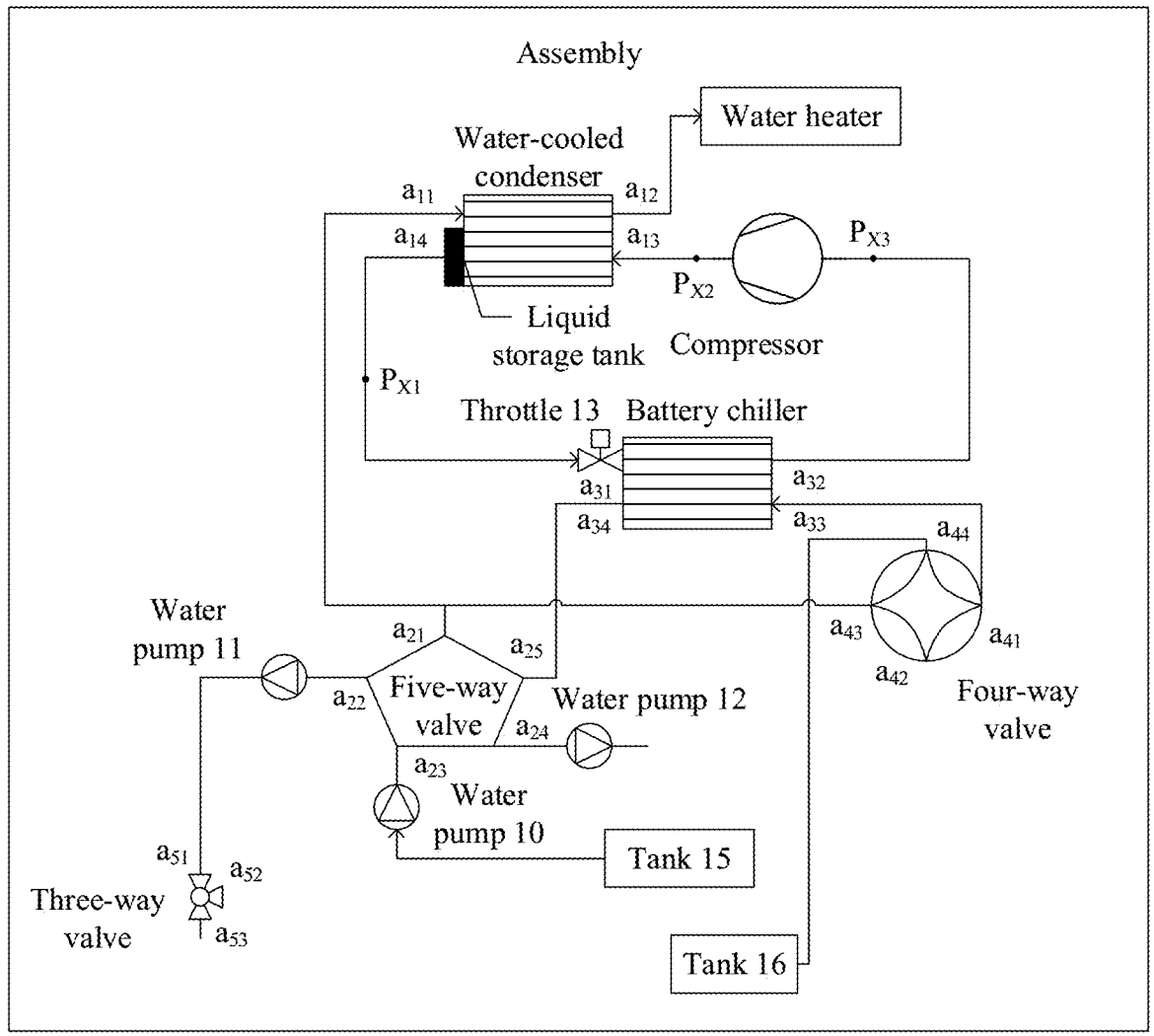
FIG. 5A is a schematic diagram illustrating an assembly when a liquid storage tank is used according to embodiment 1 of this application.
Figure 5B:
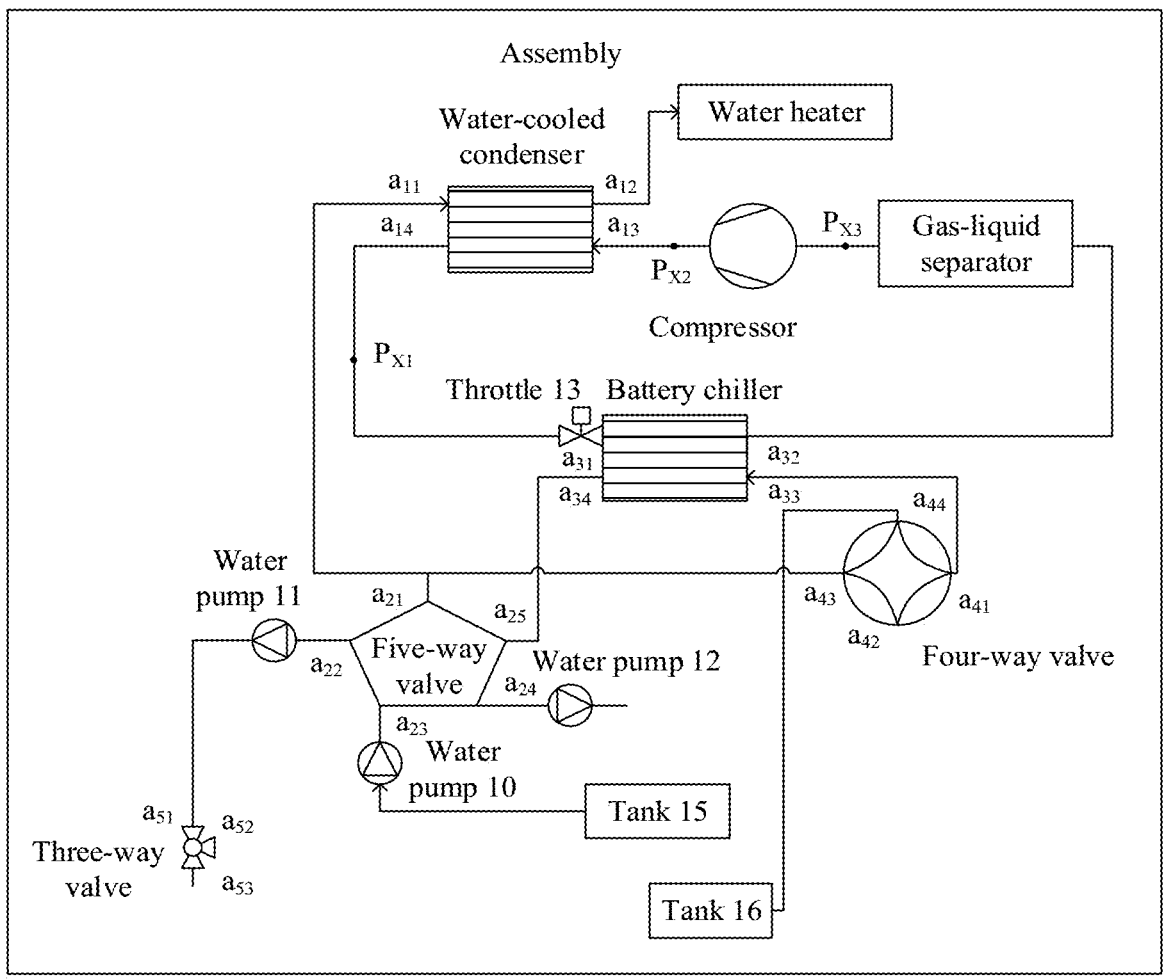
FIG. 5B is a schematic diagram illustrating an assembly when a gas-liquid separator is used according to embodiment 1 of this application.

In still another optional implementation, each exchanger component and each valve component in the thermal management system may be further integrated in a same component assembly. Each exchanger component may include one or more of the water-cooled condenser, the battery chiller, the water heater, the compressor, and the gas-liquid separator. Each valve component may include one or more of the five-way valve, the three-way valve, the four-way valve, the water pump 10, the water pump 11, the water pump 12, the tank 15, and the tank 16. FIG. 5A is a schematic diagram illustrating a corresponding assembly when the liquid storage tank is used according to embodiment 1 of this application. FIG. 5B is a schematic diagram illustrating a corresponding assembly when the gas-liquid separator is used according to embodiment 1 of this application. In this implementation, all the exchanger components and all the valve components are integrated in one integrated unit, thereby making the structure more compact and occupying less space.

In the foregoing several implementations, integrating various components (excluding the front-end cooling module) in the passenger compartment of the electric vehicle not only helps reduce structural complexity of the thermal management system and the occupied space, but also can shorten the routes between the components by using the compact structure arrangement, and help resolve a problem that components of a thermal management system are installed in a scattering manner in an electric vehicle and that a pipeline is excessively long in a current phase. When the coolant or refrigerant circulates in such a short circulation link, a pressure loss of the coolant or refrigerant in the circulation process is reduced, and efficiency of the refrigerant loop is improved. In addition, this integration mode can be made into modular components that are easy to maintain and carry.

The following first describes several loops that can be formed based on the thermal management system shown in FIG. 1A as examples.

First refrigerant loop: A refrigerant such as freon is preconfigured in the loop. Refrigerant gas in the loop is compressed by the compressor into high-temperature and high-pressure refrigerant gas, and then flows back to the compressor through the second heat exchange pipe and the third heat exchange pipe in sequence. After the high-temperature and high-pressure refrigerant gas output by the compressor undergoes heat exchange processing between the second heat exchange pipe and the first heat exchange pipe, low-temperature refrigerant liquid is obtained (correspondingly, a high-temperature coolant is obtained through heat exchange by the first heat exchange pipe). The low-temperature refrigerant liquid flows into the third heat exchange pipe, and after heat exchange processing is performed between the third heat exchange pipe and the fourth heat exchange pipe, high-temperature refrigerant gas is obtained (correspondingly, a low-temperature coolant is obtained through heat exchange by the fourth heat exchange pipe).

Second refrigerant loop: A refrigerant is also preconfigured in the loop, and the refrigerant in the loop and the refrigerant in the first refrigerant loop are shared. Assuming that refrigerant storage is not considered, when a larger amount of refrigerant is distributed to the first refrigerant loop, a smaller amount of refrigerant is distributed to the second refrigerant loop. The refrigerant in the loop is compressed by the compressor into high-temperature and high-pressure refrigerant gas, and then flows back to the compressor through the second heat exchange pipe and the evaporator in sequence. After the high-temperature and high-pressure refrigerant gas output by the compressor undergoes heat exchange processing between the second heat exchange pipe and the first heat exchange pipe, low-temperature refrigerant liquid is obtained (correspondingly, a high-temperature coolant is obtained through heat exchange by the first heat exchange pipe). The low-temperature refrigerant liquid flows into the evaporator for evaporation and heat absorption. When an air conditioner in the passenger compartment starts a refrigeration mode, the air conditioner in the passenger compartment first cools the ambient air based on evaporation and heat absorption of the evaporator, and then blows the cooled ambient air into the passenger compartment. In this case, the evaporator exchanges heat to obtain high-temperature refrigerant gas, and then the refrigerant gas flows back to the compressor. It can be learned that the second refrigerant loop can be used to cool the passenger compartment by using the refrigerant.

First coolant loop: A coolant such as mixed liquid of water and ethanol is preconfigured in the loop. The coolant in the loop is driven by the water pump 12, and flows back to the water pump 12 after flowing through the battery, the second end $a_{42}$ of the four-way valve, the first end $a_{41}$ of the four-way valve, the fourth heat exchange pipe, the fifth end $a_{25}$ of the five-way valve, and the fourth end $a_{24}$ of the five-way valve in sequence. When the first refrigerant loop is connected, the fourth heat exchange pipe can exchange heat to obtain a low-temperature coolant, and the low-temperature coolant circulates in the first coolant loop, thereby cooling the battery. When the first refrigerant loop is disconnected, the fourth heat exchange pipe cannot perform a heat exchange operation, and therefore a normal-temperature coolant circulates in the first coolant loop.

Second coolant loop: A coolant is preconfigured in the loop. The coolant in the loop is driven by the water pump 12, and flows back to the water pump 12 after flowing through the battery, the second end $a_{42}$ of the four-way valve, the first end $a_{41}$ of the four-way valve, the fourth heat exchange pipe, the fifth end $a_{25}$ of the five-way valve, the second end $a_{22}$ of the five-way valve, the water pump 11, the first end $a_{51}$ of the three-way valve, the second end $a_{52}$ of the three-way valve, the electrical driver, the fourth end $a_{44}$ of the four-way valve, the third end $a_{43}$ of the four-way valve, the first end $a_{21}$ of the five-way valve, and the fourth end $a_{24}$ of the five-way valve in sequence. When the first refrigerant loop is connected, the fourth heat exchange pipe can exchange heat to obtain a low-temperature coolant, and the low-temperature coolant circulates in the second coolant loop, thereby cooling the battery and the electrical driver. When the first refrigerant loop is disconnected, the fourth heat exchange pipe cannot perform a heat exchange operation, and therefore a normal-temperature coolant circulates in the first coolant loop.

Third coolant loop: A coolant is preconfigured in the loop. The coolant in the loop is driven by the water pump 12, and flows back to the water pump 12 after flowing through the battery, the second end $a_{42}$ of the four-way valve, the first end $a_{41}$ of the four-way valve, the fourth heat exchange pipe, the fifth end $a_{25}$ of the five-way valve, the second end $a_{22}$ of the five-way valve, the water pump 11, the first end $a_{51}$ of the three-way valve, the third end $a_{53}$ of the three-way valve, the cooler, the electrical driver, the fourth end $a_{44}$ of the four-way valve, the third end $a_{43}$ of the four-way valve, the first end $a_{21}$ of the five-way valve, and the fourth end $a_{24}$ of the five-way valve in sequence. The third coolant loop is similar to the second coolant loop, except that the coolant in the second coolant loop flows through the three-way valve and then is directly transmitted to the electrical driver, but the coolant in the third coolant loop flows through the three-way valve and is then cooled by the front-end cooling module before being transmitted to the electrical driver. Therefore, the third coolant loop is capable of simultaneously cooling the battery and the electrical driver, regardless of whether the first refrigerant loop is connected. When the first refrigerant loop is connected, the coolant in the third coolant loop is first cooled through heat exchange by the fourth heat exchange pipe for the first time, and then cooled through heat exchange by the front-end cooling module for the second time. Therefore, a cooling effect is better or improved. However, when the first refrigerant loop is disconnected, the coolant in the third coolant loop is cooled only by the front-end cooling module. Therefore, the battery and the electrical driver are actually cooled based on a natural ambient temperature.

It should be understood that the second coolant loop and the third coolant loop may alternatively constitute one coolant loop, provided that the coolant flowing into the end $a_{51}$ of the three-way valve flows out from the end $a_{52}$ of the three-way valve and the end $a_{52}$ of the three-way valve simultaneously. The cooling effects of the two branches are also different when amounts of coolants on the two branches are different.

Fourth coolant loop: A coolant is preconfigured in the loop. The coolant in the loop is driven by the water pump 11, and flows back to the water pump 11 after flowing through the first end $a_{51}$ of the three-way valve, the third end $a_{53}$ of the three-way valve, the cooler, the electrical driver, the fourth end $a_{44}$ of the four-way valve, the third end $a_{43}$ of the four-way valve, the first end $a_{21}$ of the five-way valve, and the second end $a_{22}$ of the five-way valve in sequence. In this case, the coolant in the loop is cooled by the front-end cooling module and then flows to the electrical driver, thereby naturally cooling the electrical driver. If the temperature of the electrical driver is excessively low, one part of the coolant output by the water pump 11 may also be transmitted to the electrical driver through the three-way valve, and the other part is transmitted to the electrical driver through the three-way valve and the cooler, so that the temperature of the coolant obtained by convergence of the coolants in the two branches increases, to alleviate a cooling effect of the electrical driver.

Fifth coolant loop: A coolant is preconfigured in the loop. The coolant in the loop is driven by the water pump 11, and flows back to the water pump 11 after flowing through the first end $a_{51}$ of the three-way valve, the second end $a_{52}$ of the three-way valve (or another branch may pass through the cooler), the electrical driver, the fourth end $a_{44}$ of the four-way valve, the first end $a_{41}$ of the four-way valve, the fourth heat exchange pipe, the fifth end $a_{25}$ of the five-way valve, and the second end $a_{22}$ of the five-way valve in sequence. When the first refrigerant loop is connected, the coolant in the loop is first cooled by the front-end cooling module for the first time, and then cooled by the fourth heat exchange pipe for the second time, so that the electrical driver can be cooled by using the refrigerant (or by using the refrigerant and the front end together). When the first refrigerant loop is disconnected, the coolant in the loop is cooled only by the front-end cooling module. Although the electrical driver can also be cooled naturally, such cooling needs to be implemented through more pipes than the fourth coolant loop. Therefore, a loss is greater than that of the fourth coolant loop, and a cooling effect is worse than that of the fourth coolant loop.

Sixth coolant loop: A coolant is preconfigured in the loop. The coolant in the loop is driven by the water pump 10, and flows back to the water pump 10 after flowing through the third end $a_{23}$ of the five-way valve, the second end $a_{22}$ of the five-way valve, the water pump 11, the first end $a_{51}$ of the three-way valve, the third end $a_{53}$ of the three-way valve, the cooler, the electrical driver, the fourth end $a_{44}$ of the four-way valve, the third end $a_{43}$ of the four-way valve, the first heat exchange pipe, and the heater core in sequence. In this case, the coolant in the sixth coolant loop may be cooled by the front-end cooling module. When the second refrigerant loop is connected, the second refrigerant loop (implementing cooling by using the refrigerant) is used as a main cooling loop for cooling the passenger compartment, and the sixth coolant loop (implementing cooling by using the coolant) is used as an auxiliary cooling loop for cooling the passenger compartment, both of which jointly cool the passenger compartment. In addition, the electrical driver can be cooled naturally by using the coolant. When the second refrigerant loop is disconnected, the sixth coolant loop naturally cools the passenger compartment and the electrical driver by using the coolant.

Seventh coolant loop: A coolant is preconfigured in the loop. The coolant in the loop is driven by the water pump 10, and flows back to the water pump 10 after flowing through the third end $a_{23}$ of the five-way valve, the first end $a_{21}$ of the five-way valve, the first heat exchange pipe, and the heater core in sequence. When the first refrigerant loop is connected, the first heat exchange pipe can exchange heat to obtain a high-temperature coolant, and the high-temperature coolant is transmitted to the heater core, so that the air conditioner in the passenger compartment in the heating mode first heats air by using the heater core and then blows out warm air. When the first refrigerant loop and the second refrigerant loop are simultaneously connected, a low-temperature refrigerant obtained through heat exchange by the second heat exchange pipe flows through the evaporator for evaporation and heat absorption, and a high-temperature coolant obtained through heat exchange by the first heat exchange pipe flows through the heater core. When the air conditioner in the passenger compartment is in a dehumidification mode, the air conditioner in the passenger compartment may first cool and dehumidify ambient air, and then heat the ambient air after cooling and dehumidification, thereby implementing a function of dehumidifying the passenger compartment.

Eighth coolant loop: A coolant is preconfigured in the loop. The coolant in the loop is driven by the water pump 12, and flows back to the water pump 12 after flowing through the battery, the second end $a_{42}$ of the four-way valve, the third end $a_{43}$ of the four-way valve, the first heat exchange pipe, the heater core, the water pump 10, the third end $a_{23}$ of the five-way valve, and the fourth end $a_{24}$ of the five-way valve in sequence. When the first refrigerant loop is connected, the first heat exchange pipe can exchange heat to obtain a high-temperature coolant, and the high-temperature coolant is transmitted to the heater core. When only the battery needs to be heated but the passenger compartment does not need to be heated, the fan 2 can blow ambient air directly to the passenger compartment without first heating the ambient air by using the heater core. In this case, the high-temperature coolant flows to the battery through the water pump 10 and the water pump 12, to heat only the battery. When the battery and the passenger compartment need to be heated simultaneously, the fan 2 may first heat the air by using the heater core and then blow the heated air into the passenger compartment. If not much heat is consumed in this process, the coolant with remaining heat may further flow to the battery through the water pump 10 and the water pump 12, to simultaneously heating the passenger compartment and the battery. However, in this case, the battery is actually heated by using remaining coolant after the passenger compartment is heated. Therefore, a heating effect of the battery may not be very good.

Ninth coolant loop: A coolant is preconfigured in the loop. The coolant in the loop is driven by the water pump 12, and flows through the water pump 10 through the battery, the second end $a_{42}$ of the four-way valve, the third end $a_{43}$ of the four-way valve, the first heat exchange pipe, and the heater core in sequence. Then, one branch flows back to the water pump 12 through the five-way valve, and the other branch flows into the first heat exchange pipe through the five-way valve. When the first refrigerant loop is connected, and the battery and the passenger compartment need to be heated simultaneously, the fan 2 may heat the air by using the heater core, and then blow the heated air into the passenger compartment, so that one part of the coolant that flows out continues to heat the battery, and the other part of the coolant that flows out is directly transmitted to the first heat exchange pipe for circulation. In this way, even if a temperature of the other part of the coolant in the loop is not quite high after the battery is heated, the first part of the high-temperature coolant can be used for compensation. This helps improve a heating effect of heating the battery and the passenger compartment simultaneously.

Tenth coolant loop: A coolant is preconfigured in the loop. The coolant in the loop is driven by the water pump 12, and flows through the water pump 10 through the battery, the second end $a_{42}$ of the four-way valve, the first end $a_{41}$ of the four-way valve, the fourth heat exchange pipe, the five-way valve, and the heater core in sequence. Then, one branch flows back to the water pump 12 through the five-way valve, and the other branch flows to the first heat exchange pipe through the five-way valve to participate in the entire cycle. The tenth coolant loop can also implement a function of heating the battery and the passenger compartment simultaneously.

It should be understood that only several possible loops are described as examples. The thermal management system may further form more loops. Details are not described herein.

Based on the foregoing several loops, the following uses examples to describe some modes that can be implemented by the thermal management system in embodiment 1 of this application. In this embodiment of this application, a controller may be further disposed in the electric vehicle. A control end of each valve component, a control end of each water pump, and an output end of each temperature-pressure sensor in the thermal management system may be further connected to the controller. The controller can not only implement different temperature modes by controlling each valve component and each water pump, but also obtain a temperature and pressure at each key position from the output end of each temperature-pressure sensor in a control process, and determine, based on the temperature and pressure at each key position, whether the current temperature and pressure meet requirements of a current temperature mode. If the current temperature and pressure do not meet the requirements, the controller may perform a real-time adjustment, to adjust the temperature and pressure based on the current temperature mode.

Figure 6A:
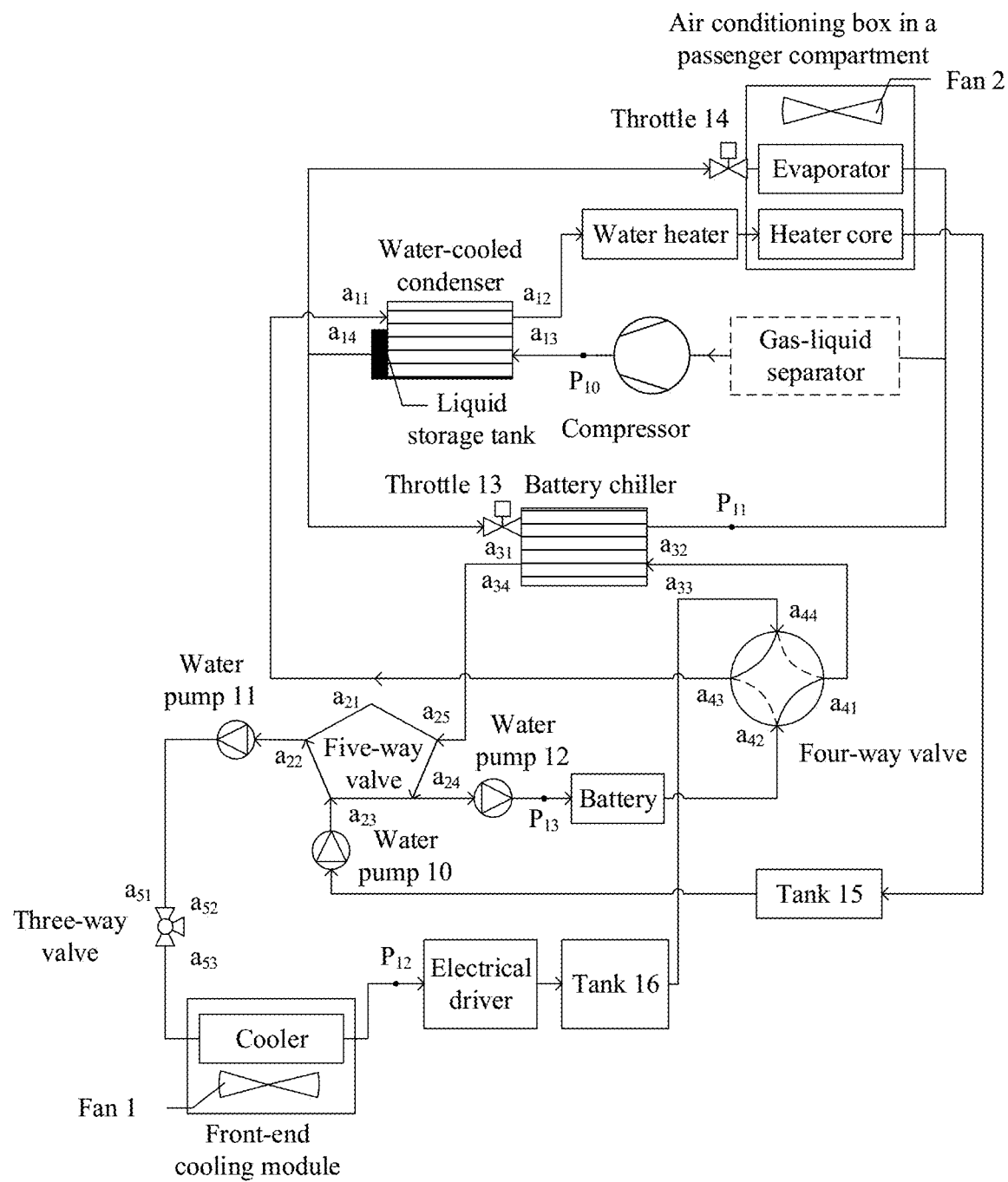
FIG. 6A is a schematic diagram illustrating a connection relationship of a thermal management system in a mode of refrigerating a passenger compartment and a battery simultaneously.

M10: Mode of Refrigerating the Passenger Compartment and the Battery Simultaneously FIG. 6A is a schematic diagram illustrating a connection relationship of a thermal management system in a mode of refrigerating a passenger compartment and a battery simultaneously. As shown in FIG. 6A, in the M10 mode, the controller may connect the second end $a_{22}$ of the five-way valve and the third end $a_{23}$ of the five-way valve, connect the fourth end $a_{24}$ of the five-way valve and the fifth end $a_{25}$ of the five-way valve, connect the first end $a_{41}$ of the four-way valve and the second end $a_{42}$ of the four-way valve, connect the third end $a_{43}$ of the four-way valve and the fourth end $a_{44}$ of the four-way valve, connect the first end $a_{51}$ of the three-way valve and the third end $a_{53}$ of the three-way valve, open the throttle 13 and the throttle 14, and start the water pump 10, the water pump 11, and the water pump 12. In this case, the first refrigerant loop, the second refrigerant loop, the first coolant loop, and the sixth coolant loop are connected. High-temperature and high-pressure refrigerant gas output by the compressor passes through the second heat exchange pipe for heat exchange to obtain low-temperature and low-pressure refrigerant liquid. One branch (that is, the second refrigerant loop) of the low-temperature and low-pressure refrigerant liquid is transmitted to the evaporator for evaporation and heat absorption. In this case, the air conditioner in the passenger compartment may be set to a full refrigeration mode, and the air conditioner in the passenger compartment first uses the evaporator to cool the air and then blows the air into the passenger compartment. The other branch (that is, the first refrigerant loop) of the low-temperature and low-pressure refrigerant liquid in the third heat exchange pipe cools the coolant in the fourth heat exchange pipe to obtain a low-temperature and low-pressure coolant, and the low-temperature and low-pressure coolant (circulating in the first coolant loop) flows to the battery through the five-way valve and the water pump 12 in sequence to cool the battery. The coolant (circulating in the sixth coolant loop) driven by the water pump 10 further cools the electrical driver after being naturally cooled by the front-end cooling module, and then is transmitted to the heater core. However, because the air conditioner in the passenger compartment may be set to the full refrigeration mode, and the water heater is not started, the coolant flowing through the heater core flows through the air conditioner box only as a bypass, and does not greatly affect a temperature of an operator cabin.

In an optional implementation, the controller may further obtain, in real time or periodically, a temperature of an air outlet of the air conditioner box in the passenger compartment and data that is of a water inlet of the battery and that is collected by the temperature-pressure sensor P13, to determine the temperature of the passenger compartment and a temperature of the battery. When the temperature of the passenger compartment or the temperature of the battery does not meet a requirement of the M10 mode, the controller may adjust openings of the throttle 13 and the throttle 14 to change amounts of refrigerant in the two refrigerant loops to adjust the temperature of the passenger compartment and the temperature of the battery. For example, assuming that it is specified that the temperature of the passenger compartment does not exceed 28 degrees and that the temperature of the battery does not exceed 30 degrees in the M10 mode, when a detected temperature of the passenger compartment exceeds 28 degrees, the controller may enlarge the opening of the throttle 14 to enable more refrigerant liquid to flow through the evaporator (which is implemented by automatically changing the amount of stored refrigerant liquid by the liquid storage tank or the gas-liquid separation apparatus), to improve a cooling effect of the evaporator and improve a cooling effect of the passenger compartment. When the detected temperature of the battery exceeds 30 degrees, the controller may enlarge the opening of the throttle 13 to enable more refrigerant liquid to flow through the third heat exchange pipe, to reduce the temperature of the coolant in the fourth heat exchange pipe and improve a cooling effect of the battery. For example, when requirements for adjusting the temperature of the passenger compartment and the temperature of the battery cannot be met simultaneously, a temperature requirement of the battery may be met preferentially. For example, when no refrigerant liquid exists in the current liquid storage tank or the gas-liquid separation apparatus, all refrigerants flow in the two refrigerant loops. In this case, if a detected temperature of the passenger compartment exceeds 28 degrees and a detected temperature of the battery exceeds 30 degrees, the opening of the throttle 13 may be enlarged and the opening of the throttle 14 may be reduced, to ensure that the battery is not overheating and ensure safety of the electric vehicle and the user.

In this embodiment of this application, a scenario to which the M10 mode is applicable is, for example, that the user drives the electric vehicle in summer. In this scenario, the temperatures of both the passenger compartment and the battery may be very high. Battery overheating may cause an accident such as battery explosion, affecting physical and psychological safety of the user. However, overheating of the passenger compartment may reduce user experience. For example, if the user is in an overheating environment for a long time, the user may have a heat stroke. Therefore, if the foregoing manner is used to adjust the thermal management system to satisfy the connection relationship required in the M10 mode, the passenger compartment and the battery can be cooled simultaneously. This improves user experience while ensuring safety.

M11: Mode of Refrigerating Only the Passenger Compartment.

Figure 6B:
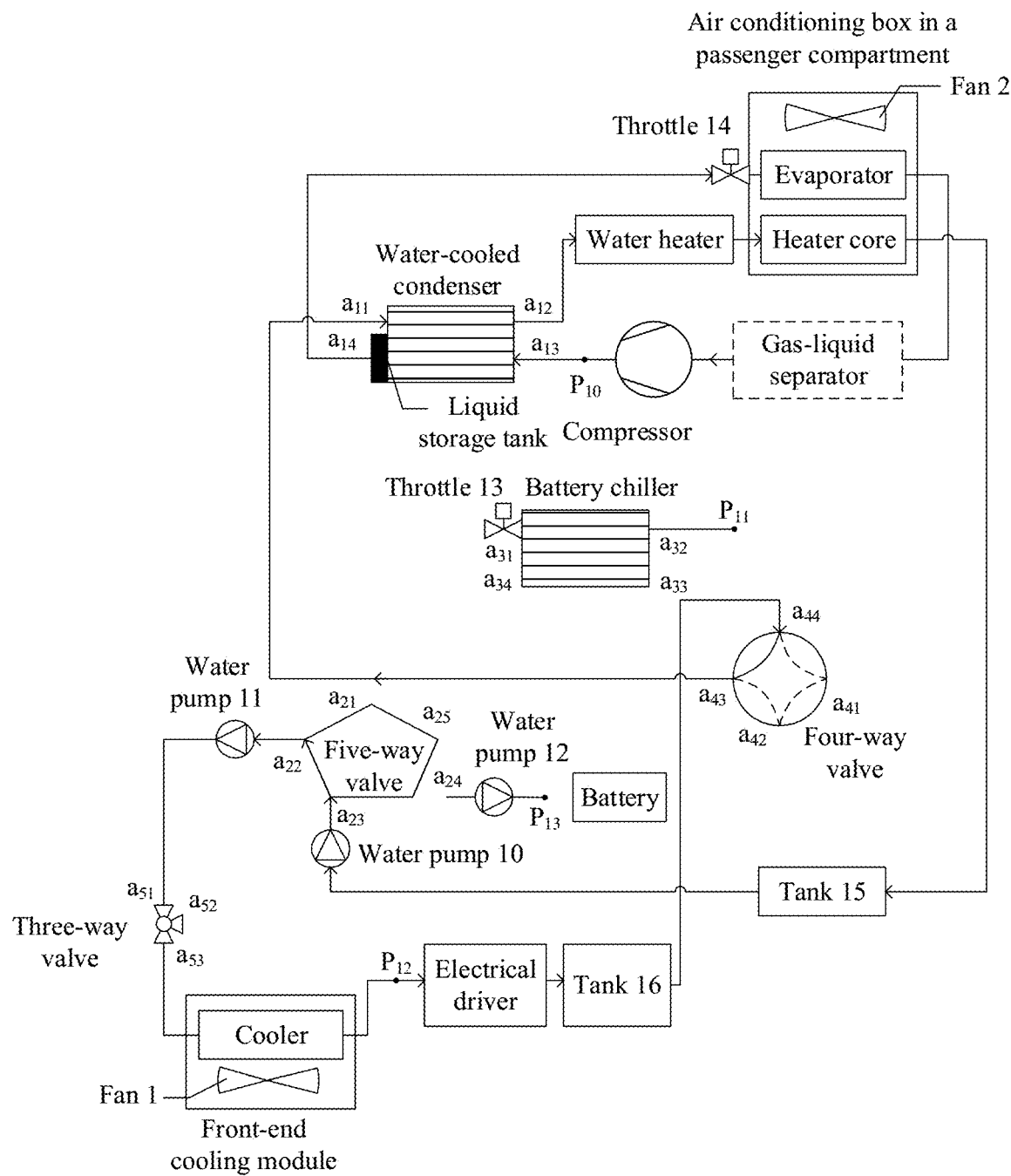
FIG. 6B is a schematic diagram illustrating a connection relationship of a thermal management system in a mode of refrigerating only a passenger compartment.

FIG. 6B is a schematic diagram illustrating a connection relationship of a thermal management system in a mode of refrigerating only a passenger compartment. As shown in FIG. 6B, in the M11 mode, the controller may connect the second end $a_{22}$ of the five-way valve and the third end $a_{23}$ of the five-way valve, connect the third end $a_{43}$ of the four-way valve and the fourth end $a_{44}$ of the four-way valve, connect the first end $a_{51}$ of the three-way valve and the third end $a_{53}$ of the three-way valve, open the throttle 14, close the throttle 13 (the battery chiller is in a sleep mode by default; when the throttle 13 is closed, no refrigerant flows through the battery chiller, and therefore the battery chiller does not work), and start the water pump 10 and the water pump 11. In this case, the second refrigerant loop and the sixth refrigerant loop are connected. High-temperature and high-pressure refrigerant gas output by the compressor passes through the second heat exchange pipe for heat exchange to obtain low-temperature and low-pressure refrigerant liquid. The low-temperature and low-pressure refrigerant liquid is transmitted to the evaporator through the second refrigerant loop to cool the passenger compartment. In this case, the air conditioner in the passenger compartment is set to a full refrigeration mode. The coolant driven by the water pump 10 flows to the front-end cooling module through the sixth coolant loop for natural cooling, then cools the electrical driver, and then is transmitted to the heater core. However, because the air conditioner in the passenger compartment is set to the full refrigeration mode, and the water heater is not started, the coolant flowing through the heater core flows through the air conditioner box only as a bypass, and does not greatly affect a temperature of an operator cabin.

In an optional implementation, the controller may further obtain a temperature of an air outlet of the air conditioner box in the passenger compartment in real time or periodically, to determine the temperature of the passenger compartment. When the temperature of the passenger compartment is higher than a temperature specified in the M11 mode, the controller may enlarge an opening of the throttle 14 and increase a rotational speed of the compressor. In this way, the compressor can obtain higher-pressure and higher-temperature refrigerant gas through compression. When the refrigerant gas passes through the water-cooled condenser, more refrigerant liquid is obtained. Further, after the refrigerant liquid passes through the throttle 14 with the enlarged opening, more refrigerant liquid enters the evaporator. This helps improve a refrigeration effect of the evaporator on the passenger compartment. When the temperature of the passenger compartment is lower than the temperature specified in the M11 mode, the controller may reduce the opening of the throttle 14 and reduce the rotational speed of the compressor to reduce the refrigeration effect of the passenger compartment and avoid discomfort to the user. It should be understood that, in the M11 mode, because only the passenger compartment needs to be refrigerated but the battery does not need to be refrigerated, an amount of refrigerant flowing through the second refrigerant loop only needs to meet a refrigeration requirement of the passenger compartment, and there is no need to set an excessively large amount, to avoid a waste of the refrigerant.

In this embodiment of this application, a scenario to which the M11 mode is applicable is, for example, that the user often needs to first lower a temperature of the passenger compartment before entering the passenger compartment to drive the electric vehicle in summer. In this scenario, the temperature of the passenger compartment is quite high, but a temperature of the battery is not high because the electric vehicle is not started. Therefore, if the foregoing manner is used to adjust the thermal management system to satisfy the connection relationship required in the M11 mode, only the passenger compartment can be refrigerated. In addition, this manner further helps save power and improve endurance of the electric vehicle while meeting a user requirement.

M12: Mode of Refrigerating Only the Battery.

Figure 6C:
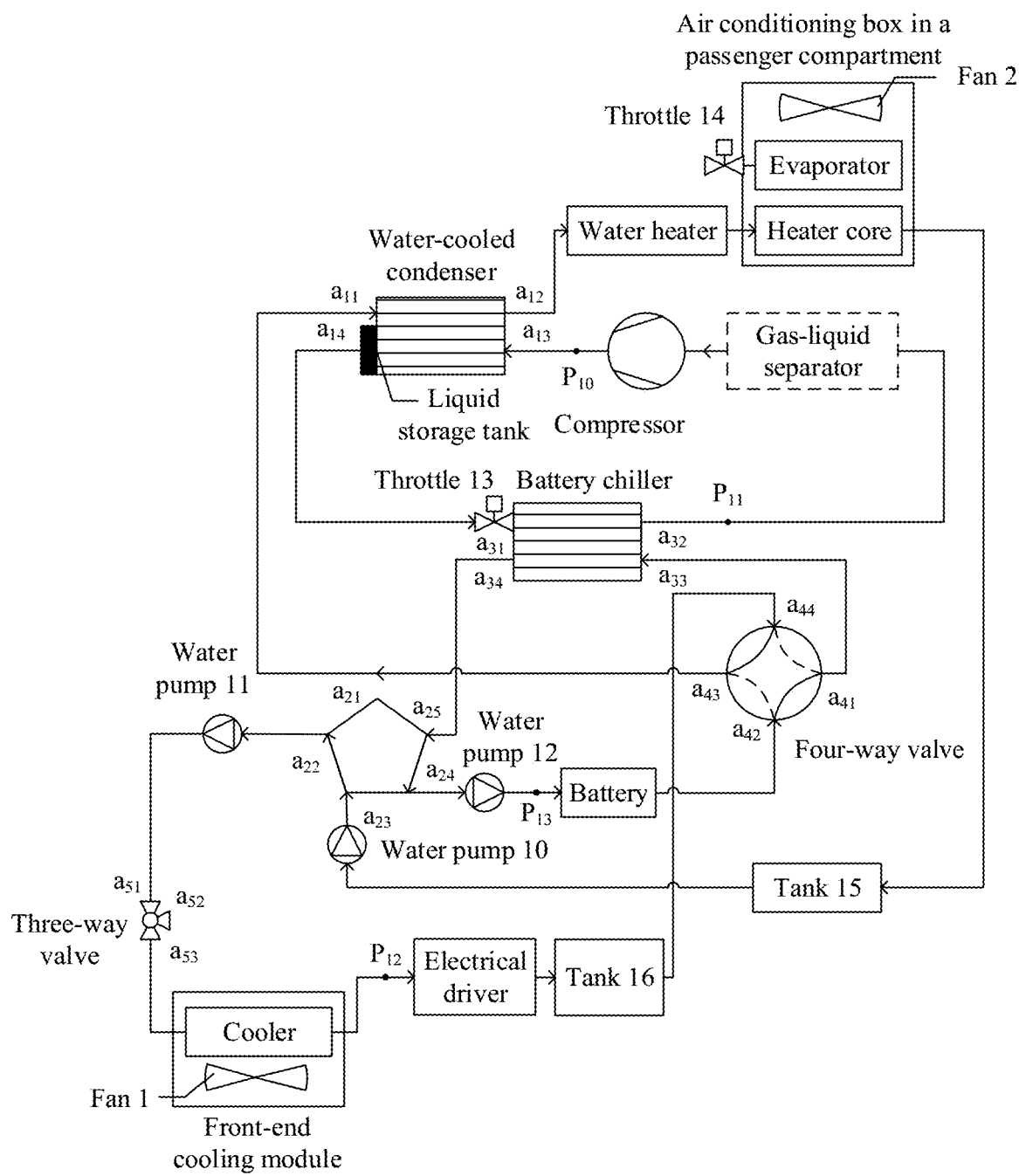
FIG. 6C is a schematic diagram illustrating a connection relationship of a thermal management system in a mode of refrigerating only a battery.

FIG. 6C is a schematic diagram illustrating a connection relationship of a thermal management system in a mode of refrigerating only a battery. As shown in FIG. 6C, in the M12 mode, the controller may connect the second end $a_{22}$ of the five-way valve and the third end $a_{23}$ of the five-way valve, connect the fourth end $a_{24}$ of the five-way valve and the fifth end $a_{25}$ of the five-way valve, connect the first end $a_{41}$ of the four-way valve and the second end $a_{42}$ of the four-way valve, connect the third end $a_{43}$ of the four-way valve and the fourth end $a_{44}$ of the four-way valve, connect the first end $a_{51}$ of the three-way valve and the third end $a_{53}$ of the three-way valve, open the throttle 13, close the throttle 14 (so that the evaporator does not work), and start the water pump 10, the water pump 11, and the water pump 12. In this case, the first refrigerant loop, the first coolant loop, and the sixth coolant loop are connected. High-temperature and high-pressure refrigerant gas output by the compressor passes through the second heat exchange pipe for heat exchange to obtain low-temperature and low-pressure refrigerant liquid. The low-temperature and low-pressure refrigerant liquid passes through the first refrigerant loop, and cools, in the third heat exchange pipe, the coolant in the fourth heat exchange pipe to obtain a low-temperature and low-pressure coolant. The low-temperature and low-pressure coolant circulates in the first coolant loop, and is transmitted to the battery after passing through the five-way valve and the water pump 10, thereby cooling the battery. The coolant driven by the water pump 10 flows to the front-end cooling module through the sixth coolant loop for natural cooling, then cools the electrical driver, and then is transmitted to the heater core. However, because the air conditioner in the passenger compartment is not started, and the water heater is not started, the coolant flowing through the heater core flows through the air conditioner box only as a bypass, and does not greatly affect a temperature of an operator cabin.

In an optional implementation, the controller may further obtain a temperature of a water inlet of the battery in real time or periodically, to determine a temperature of the battery. When the temperature of the battery is higher than a temperature specified in the M12 mode, the controller may enlarge the opening of the throttle 13 and increase a rotational speed of the compressor. In this way, the compressor can obtain higher-pressure and higher-temperature refrigerant gas through compression. When the refrigerant gas passes through the water-cooled condenser, more refrigerant liquid is obtained. Further, after the refrigerant gas passes through the throttle 13 with the enlarged opening, more refrigerant liquid enters the battery chiller. This helps improve a refrigeration effect of the third heat exchange pipe on the coolant in the fourth heat exchange pipe and further improve a refrigeration effect on the battery. When the temperature of the passenger compartment is lower than the temperature specified in the M12 mode, the controller may reduce the opening of the throttle 13 and reduce the rotational speed of the compressor to reduce the refrigeration effect of the battery and avoid discomfort to the user. It should be understood that, in the M12 mode, because only the battery needs to be refrigerated but the passenger compartment does not need to be refrigerated, an amount of the refrigerant flowing through the first refrigerant loop only needs to meet a refrigeration requirement of the battery, and there is no need to set an excessively large amount, to avoid waste.

In this embodiment of this application, a scenario to which the M12 mode is applicable is, for example, that the user drives the electric vehicle in spring and autumn. In this scenario, the temperature of the passenger compartment is relatively appropriate, but the temperature of the battery may be relatively high because the battery is always providing power. Therefore, if the foregoing manner is used to adjust the thermal management system to satisfy the connection relationship required in the M12 mode, only the battery can be refrigerated. This helps avoid overheating of the battery and ensure safety of the user.

M13: Mode of Refrigerating the Battery but Heating the Passenger Compartment.

Figure 6D:
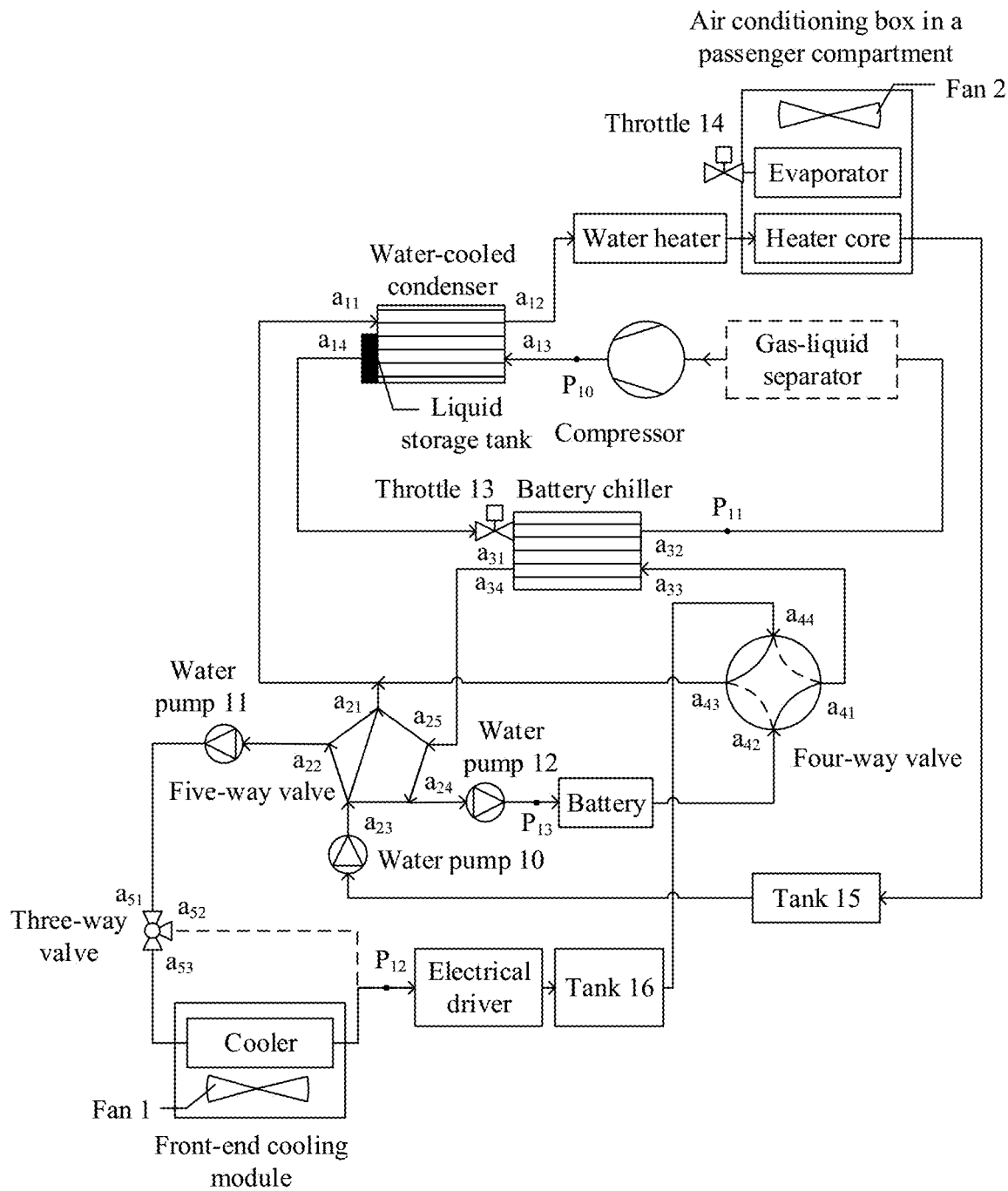
FIG. 6D is a schematic diagram illustrating a connection relationship of a thermal management system in a mode of refrigerating a battery but heating a passenger compartment.

FIG. 6D is a schematic diagram illustrating a connection relationship of a thermal management system in a mode of refrigerating a battery but heating a passenger compartment. As shown in FIG. 6D, in the M13 mode, the controller may connect the first end $a_{21}$ of the five-way valve and the third end $a_{23}$ of the five-way valve, connect the second end $a_{22}$ of the five-way valve and the third end $a_{23}$ of the five-way valve, connect the fourth end $a_{24}$ of the five-way valve and the fifth end $a_{25}$ of the five-way valve, connect the first end $a_{41}$ of the four-way valve and the second end $a_{42}$ of the four-way valve, connect the third end $a_{43}$ of the four-way valve and the fourth end $a_{44}$ of the four-way valve, connect the first end $a_{51}$ of the three-way valve and the third end $a_{52}$ of the three-way valve, open the throttle 13, close the throttle 14 (so that the evaporator does not work), start the water heater, and start the water pump 10, the water pump 11, and the water pump 12. In this case, the first refrigerant loop, the first coolant loop, the sixth coolant loop, and the seventh coolant loop are connected. High-temperature and high-pressure refrigerant gas output by the compressor passes through the second heat exchange pipe for heat exchange to obtain low-temperature and low-pressure refrigerant liquid (determined based on the coolants that converge from the sixth coolant loop and the seventh coolant loop into the second heat exchange pipe). The low-temperature and low-pressure refrigerant liquid passes through the third heat exchange pipe in the first refrigerant loop and cools the coolant in the fourth heat exchange pipe to obtain a low-temperature and low-pressure coolant. The low-temperature and low-pressure coolant circulates in the first coolant loop, and is transmitted to the battery, thereby cooling the battery. The coolant output by the water pump 10 is transmitted to the water heater through the seventh coolant loop on one branch, and the high-temperature coolant heated by the water heater is transmitted to the heater core. The air conditioner box in the passenger compartment starts a full heating mode. Therefore, the air conditioner first heats the air through the heater core and then blows out warm air. The coolant output by the water pump 10 cools the electrical driver through the sixth coolant loop on the other branch. For example, the controller may further obtain, in real time, a temperature that is of a water inlet of the electrical driver and is collected by the temperature-pressure sensor $P_{12}$, to determine a temperature of the electrical driver. When the temperature of the electrical driver is higher than an expected temperature of the electrical driver, the first end $a_{51}$ of the three-way valve is separately connected to the second end $a_{52}$ of the three-way valve and the third end $a_{53}$ of the three-way valve. In this way, the coolant in the sixth coolant loop is divided into two branches at the three-way valve, where one branch directly flows to the electrical driver, and the other branch is cooled by the front-end cooling module and then flows to the electrical driver. Convergence of the two branches of coolants improves a capability of cooling the electrical driver.

In an optional implementation, the controller may further obtain a temperature of an air outlet of the passenger compartment in real time or periodically, to determine a temperature of the passenger compartment. When the temperature of the passenger compartment is lower than a temperature specified in the M13 mode, the controller may distribute more power to the water heater to improve the heating effect of the water heater and increase the temperature of the passenger compartment. When the temperature of the passenger compartment is higher than the temperature specified in the M13 mode, the controller may distribute less power to the water heater to reduce the heating effect of the water heater and avoid an excessively high temperature of the passenger compartment. In addition, the controller may further adjust the opening of the throttle 13 and the rotational speed of the compressor, so that a temperature of a water inlet of the battery reaches an expectation. For an example adjustment manner, refer to the foregoing content. Details are not described herein again. It should be understood that, in the M13 mode, because only the battery needs to be refrigerated but the passenger compartment does not need to be refrigerated, an amount of the refrigerant flowing through the first refrigerant loop only needs to meet a refrigeration requirement of the battery.

In this embodiment of this application, a scenario to which the M13 mode is applicable is, for example, that the user drives the electric vehicle to move quickly in winter, or drives the electric vehicle uphill. In this scenario, the temperature of the passenger compartment is relatively low due to impact of an external environment. However, because the quick movement or uphill movement consumes more power, the temperature of the battery is relatively high. Therefore, if the foregoing manner is used to adjust the thermal management system to satisfy the connection relationship required in the M13 mode, the battery can be refrigerated while the passenger compartment is heated. This not only helps improve comfort of the user, but also can avoid overheating of the battery and ensure safety of the user.

M14: Mode of Naturally Cooling the Battery.

Figure 6E:
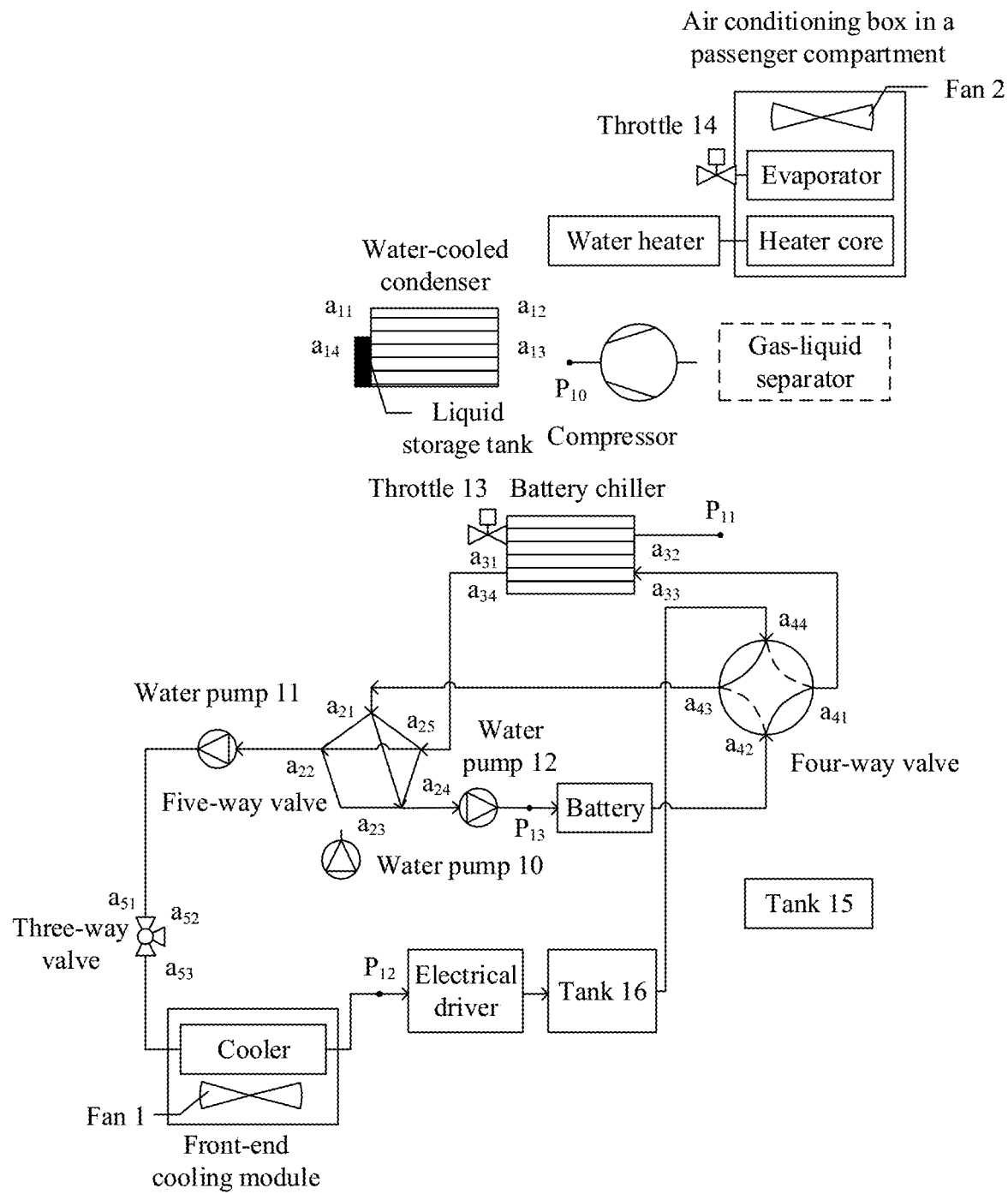
FIG. 6E is a schematic diagram illustrating a connection relationship of a thermal management system in a mode of naturally cooling a battery.

FIG. 6E is a schematic diagram illustrating a connection relationship of a thermal management system in a mode of naturally cooling a battery. As shown in FIG. 6E, in the M14 mode, the controller may connect the first end $a_{21}$ of the five-way valve and the fourth end $a_{24}$ of the five-way valve, connect the second end $a_{22}$ of the five-way valve and the fifth end $a_{25}$ of the five-way valve, connect the first end $a_{41}$ of the four-way valve and the second end $a_{42}$ of the four-way valve, connect the third end $a_{43}$ of the four-way valve and the fourth end $a_{44}$ of the four-way valve, connect the first end $a_{51}$ of the three-way valve and the third end $a_{53}$ of the three-way valve, close the throttle 13 and the throttle 14 (so that the evaporator and the battery chiller do not work), turn off the water heater, and start the water pump 11 and the water pump 12. In this case, the third coolant loop is connected. The coolant in the third coolant loop first flows to the front-end cooling module and is cooled by a temperature in a natural environment, and then flows sequentially to the electrical driver and the battery to cool the electrical driver and the battery.

In this embodiment of this application, a scenario to which the M14 mode is applicable is, for example, that the electric vehicle is charged. In this scenario, the battery may be hot when being charged, but this heating is a safe phenomenon specified by factory settings. Therefore, if the foregoing manner is used to adjust the thermal management system to satisfy the connection relationship required in the M14 mode, only the front-end cooling module can be used to naturally cool the battery without starting the compressor to forcibly cool the battery. This saves more power.

M15: Mode of Naturally Cooling a Motor.

Figure 6F:
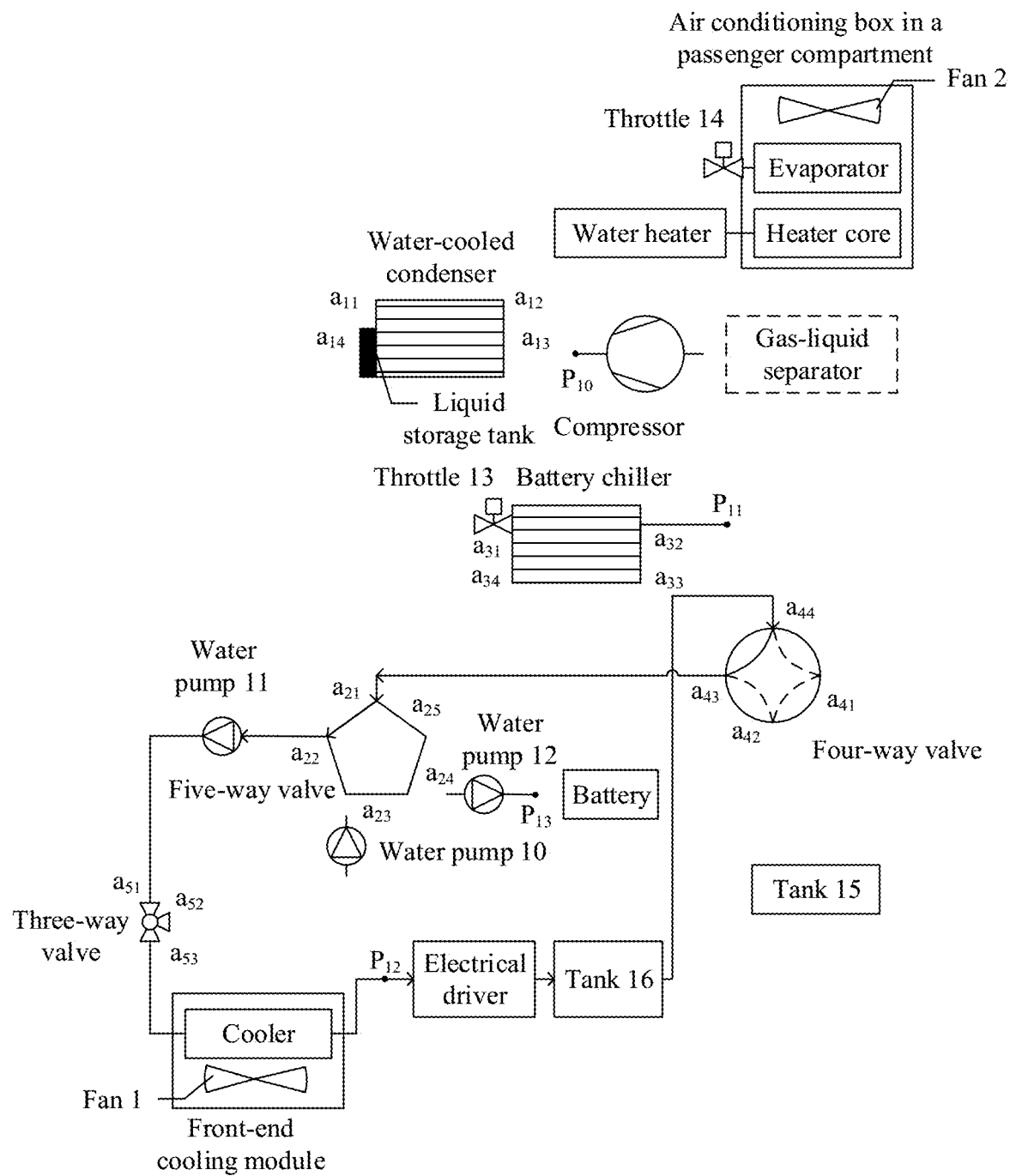
FIG. 6F is a schematic diagram illustrating a connection relationship of a thermal management system in a mode of naturally cooling a motor.

FIG. 6F is a schematic diagram illustrating a connection relationship of a thermal management system in a mode of naturally cooling a motor. As shown in FIG. 6F, in the M15 mode, the controller may connect the first end $a_{21}$ of the five-way valve and the second end $a_{22}$ of the five-way valve, connect the third end $a_{43}$ of the four-way valve and the fourth end $a_{44}$ of the four-way valve, connect the first end $a_{51}$ of the three-way valve and the third end $a_{53}$ of the three-way valve, close the throttle 13 and the throttle 14 (so that the evaporator and the battery chiller do not work), turn off the water heater, and start the water pump 11. In this case, the fourth coolant loop is connected. The coolant in the fourth coolant loop first flows to the front-end cooling module and is cooled by a temperature in a natural environment, and then flows to the electrical driver to cool the electrical driver.

In this embodiment of this application, a scenario to which the M15 mode is applicable is, for example, braking in a process of driving the electric vehicle. In this scenario, the braking may cause heating of the electrical driver, and the heating will end in a short time, without requiring forcible cooling. Therefore, if the foregoing manner is used to adjust the thermal management system to satisfy the connection relationship required in the M15 mode, the electrical driver can be naturally cooled only by using the front-end cooling module, and there is no need to start the compressor to forcibly cool the electrical driver. This saves more power.

M16: Mode of Heating the Passenger Compartment and the Battery Simultaneously.

Figure 6G:
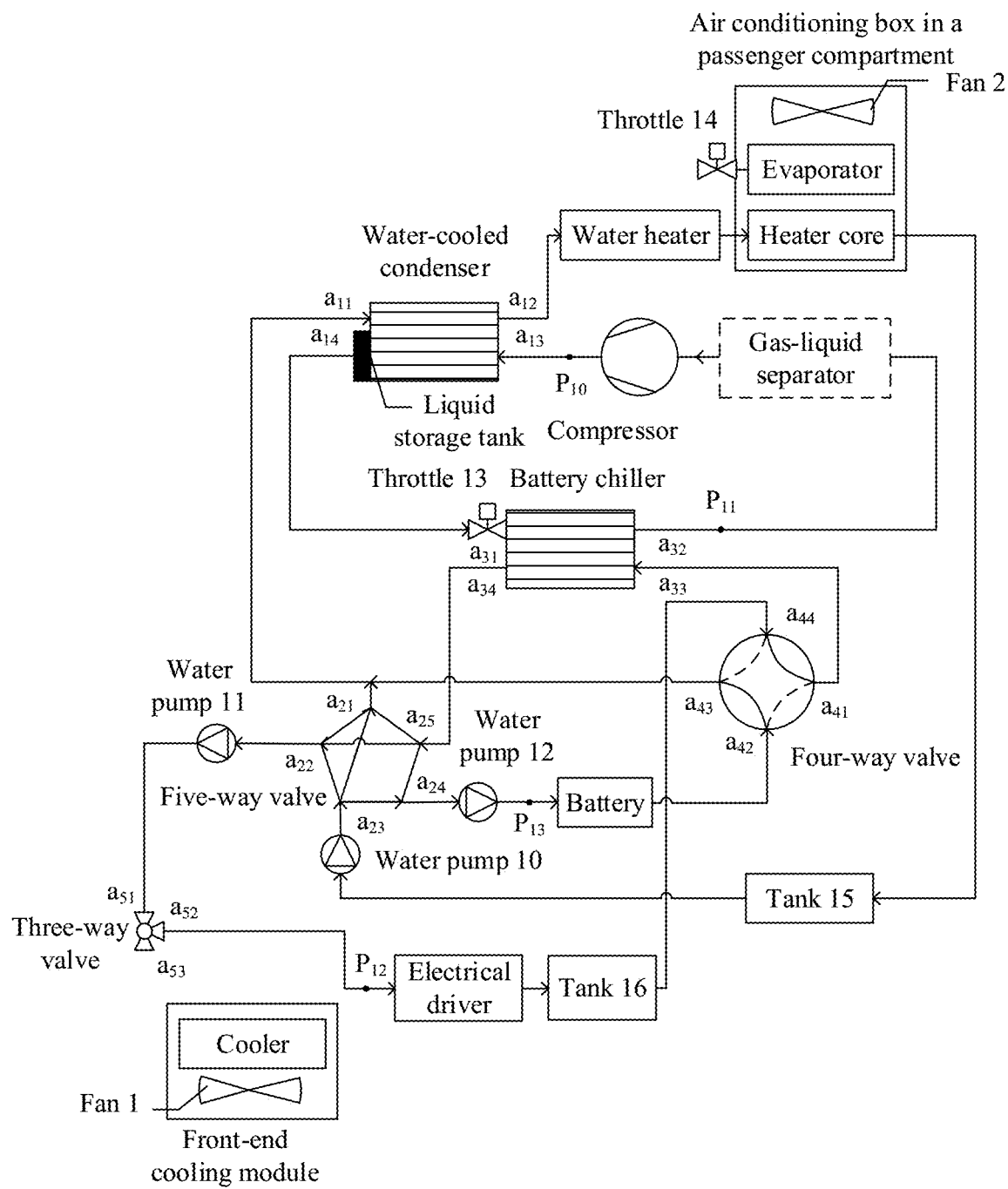
FIG. 6G is a schematic diagram illustrating a connection relationship of a thermal management system in a mode of heating a passenger compartment and a battery simultaneously.

FIG. 6G is a schematic diagram illustrating a connection relationship of a thermal management system in a mode of heating a passenger compartment and a battery simultaneously. As shown in FIG. 6G, in the M16 mode, the controller may connect the first end $a_{21}$ of the five-way valve and the third end $a_{23}$ of the five-way valve, connect the second end $a_{22}$ of the five-way valve and the fifth end $a_{25}$ of the five-way valve, connect the third end $a_{23}$ of the five-way valve and the fourth end $a_{24}$ of the five-way valve, connect the first end $a_{41}$ of the four-way valve and the fourth end $a_{44}$ of the four-way valve, connect the second end $a_{42}$ of the four-way valve and the third end $a_{43}$ of the four-way valve, connect the first end $a_{51}$ of the three-way valve and the second end $a_{52}$ of the three-way valve, open the throttle 13, close the throttle 14 (so that the evaporator does not work), turn on the water heater, and start the water pump 10, the water pump 11, and the water pump 12. In this case, the first refrigerant loop, the fifth coolant loop, and the ninth coolant loop are connected. High-temperature and high-pressure refrigerant gas output by the compressor passes through the second heat exchange pipe for heat exchange to obtain low-temperature and low-pressure refrigerant liquid. The low-temperature and low-pressure refrigerant liquid passes through the third heat exchange pipe, exchanges heat with the coolant in the fourth heat exchange pipe, and then flows back to the compressor. The air conditioner in the passenger compartment starts a full heating mode. The coolant heated by the water heater is transmitted to the heater core to heat the passenger compartment, and then flows into the water pump 10. After the coolant flowing out of the water pump 10 passes through the five-way valve, one branch heats the battery through the water pump 12, and then converges with the other branch through the four-way valve into the first heat exchange pipe. Flux distribution of the coolants in the two branches depends on whether a coolant flux in the branch in which the battery is located meets a heating requirement of the battery, and if no, the coolant flux distributed to the branch in which the battery is located is increased by using the controller. The low-temperature coolant flowing out of the fourth heat exchange pipe may directly pass through the fifth coolant loop to cool the electrical driver. If the cooling effect is excessively high, the controller may further open the third end $a_{53}$ of the three-way valve at the same time, to absorb a part of heat in the environment through a front-end branch and reduce the cooling effect after convergence in the fifth coolant loop. When two branches of the three-way valve are both opened, flux distribution of the coolants in the two branches can be adjusted automatically based on whether a temperature of an inlet of the electrical driver can meet a cooling requirement of the motor.

In this embodiment of this application, a scenario to which the M16 mode is applicable is, for example, that the user sits in the passenger compartment of the electric vehicle in winter, but does not drive the electric vehicle. In this scenario, temperatures of the passenger compartment and the battery are relatively low due to impact of the external environment. The low temperatures not only cause poor user experience, but also may cause a relatively large electric energy loss because the battery is in a low temperature state for a long time. Consequently, endurance of the electric vehicle is reduced. Therefore, if the foregoing manner is used to adjust the thermal management system to satisfy the connection relationship required in the M16 mode, the battery can be heated while the passenger compartment is heated. This helps protect battery power and improve user experience.

M17. Mode of Heating the Battery and Dehumidifying the Passenger Compartment.

Figure 6H:
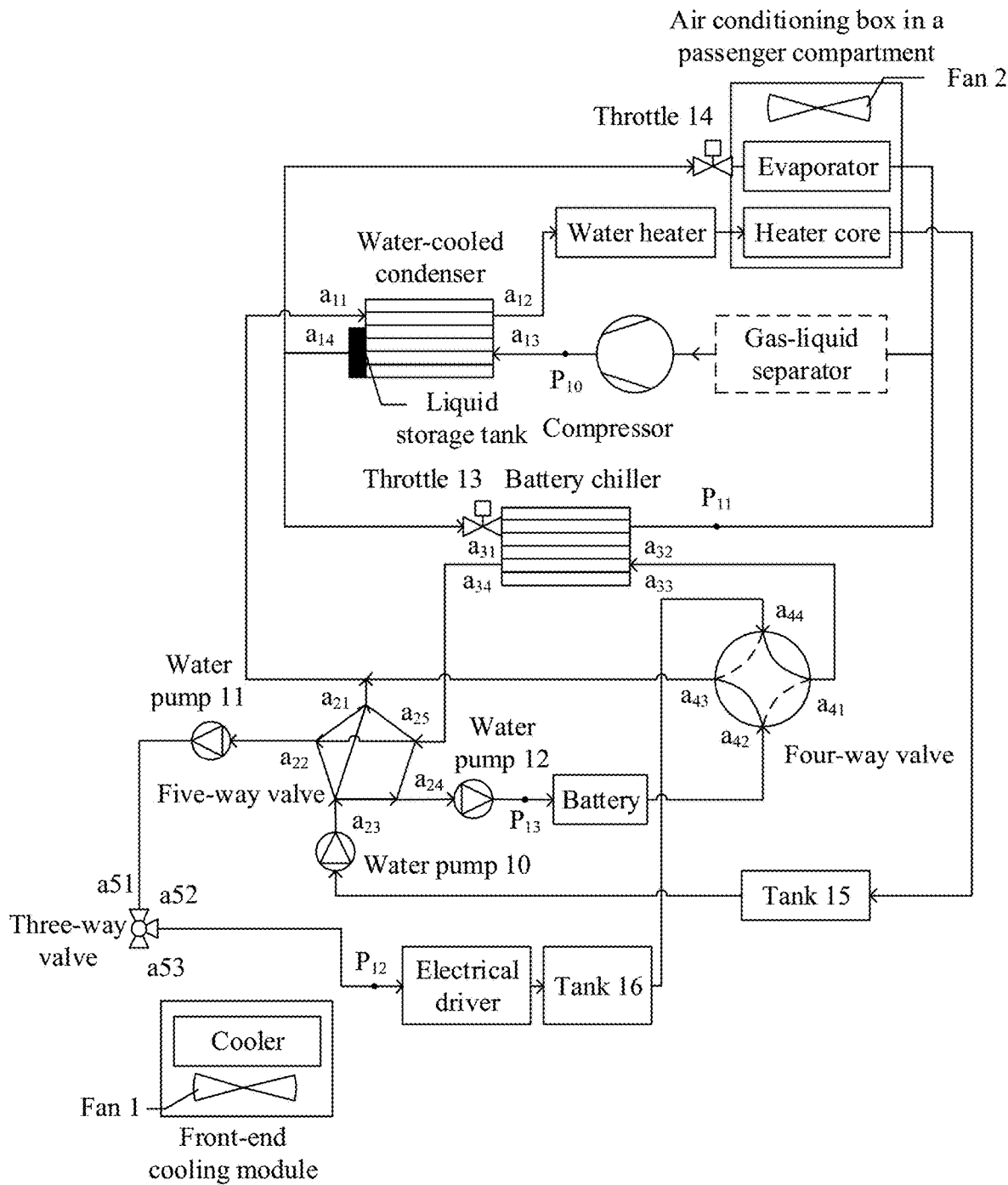
FIG. 6H is a schematic diagram illustrating a connection relationship of a thermal management system in a mode of heating a battery and dehumidifying a passenger compartment.

FIG. 6H is a schematic diagram illustrating a connection relationship of a thermal management system in a mode of heating a battery and dehumidifying a passenger compartment. As shown in FIG. 6H, in the M17 mode, the controller may connect the first end $a_{21}$ of the five-way valve and the third end $a_{23}$ of the five-way valve, connect the second end $a_{22}$ of the five-way valve and the fifth end $a_{25}$ of the five-way valve, connect the third end $a_{23}$ of the five-way valve and the fourth end $a_{24}$ of the five-way valve, connect the first end $a_{41}$ of the four-way valve and the fourth end $a_{44}$ of the four-way valve, connect the second end $a_{42}$ of the four-way valve and the third end $a_{43}$ of the four-way valve, connect the first end $a_{51}$ of the three-way valve and the second end $a_{52}$ of the three-way valve, open the throttle 13 and the throttle 14, turn on the water heater, and start the water pump 10, the water pump 11, and the water pump 12. In this case, the first refrigerant loop, the second refrigerant loop, the fifth coolant loop, and the ninth coolant loop are connected. High-temperature and high-pressure refrigerant gas output by the compressor passes through the second heat exchange pipe for heat exchange to obtain low-temperature and low-pressure refrigerant liquid. One part of the low-temperature and low-pressure refrigerant liquid is transmitted to the evaporator for cooling. The other part passes through the third heat exchange pipe, exchanges heat with the coolant in the fourth heat exchange pipe, and then flows back to the compressor. The coolant heated by the water heater is transmitted to the heater core. Power of the water heater can be controlled by the controller based on whether a temperature of an air outlet of the air conditioner meets a requirement. The air conditioner in the passenger compartment starts the dehumidification mode. An air intake of the passenger compartment is first cooled and dehumidified by the evaporator, then is heated by the heater core, and then flows into the water pump 10. After the coolant flowing out of the water pump 10 passes through the five-way valve, one branch heats the battery through the water pump 12, and then converges with the other branch through the four-way valve into the first heat exchange pipe. Flux distribution of the coolants in the two branches depends on whether a coolant flux in the branch in which the battery is located meets a heating requirement of the battery, and if no, the coolant flux distributed to the branch in which the battery is located is increased by using the controller. The low-temperature coolant flowing out of the fourth heat exchange pipe may directly pass through the fifth coolant loop to cool the electrical driver. If the cooling effect is excessively high, the controller may further open the third end $a_{53}$ of the three-way valve at the same time, to absorb a part of heat in the environment through a front-end branch and reduce the cooling effect after convergence in the fifth coolant loop. When two branches of the three-way valve are both opened, flux distribution of the coolants in the two branches can be adjusted automatically based on whether a temperature of an inlet of the electrical driver can meet a cooling requirement of the motor.

In this embodiment of this application, a scenario to which the M17 mode is applicable is, for example, that the user sits in the passenger compartment of the electric vehicle in wet winter, but does not drive the electric vehicle. In this scenario, a temperature of the battery is relatively low due to impact of the external environment, and humidity of the passenger compartment is relatively high due to impact of the external environment. Therefore, if the foregoing manner is used to adjust the thermal management system to satisfy the connection relationship required in the M17 mode, the passenger compartment can be dehumidified while the battery is heated. This helps protect battery power and improve user experience.

M18: Mode of Heating Only the Passenger Compartment.

Figure 6I:
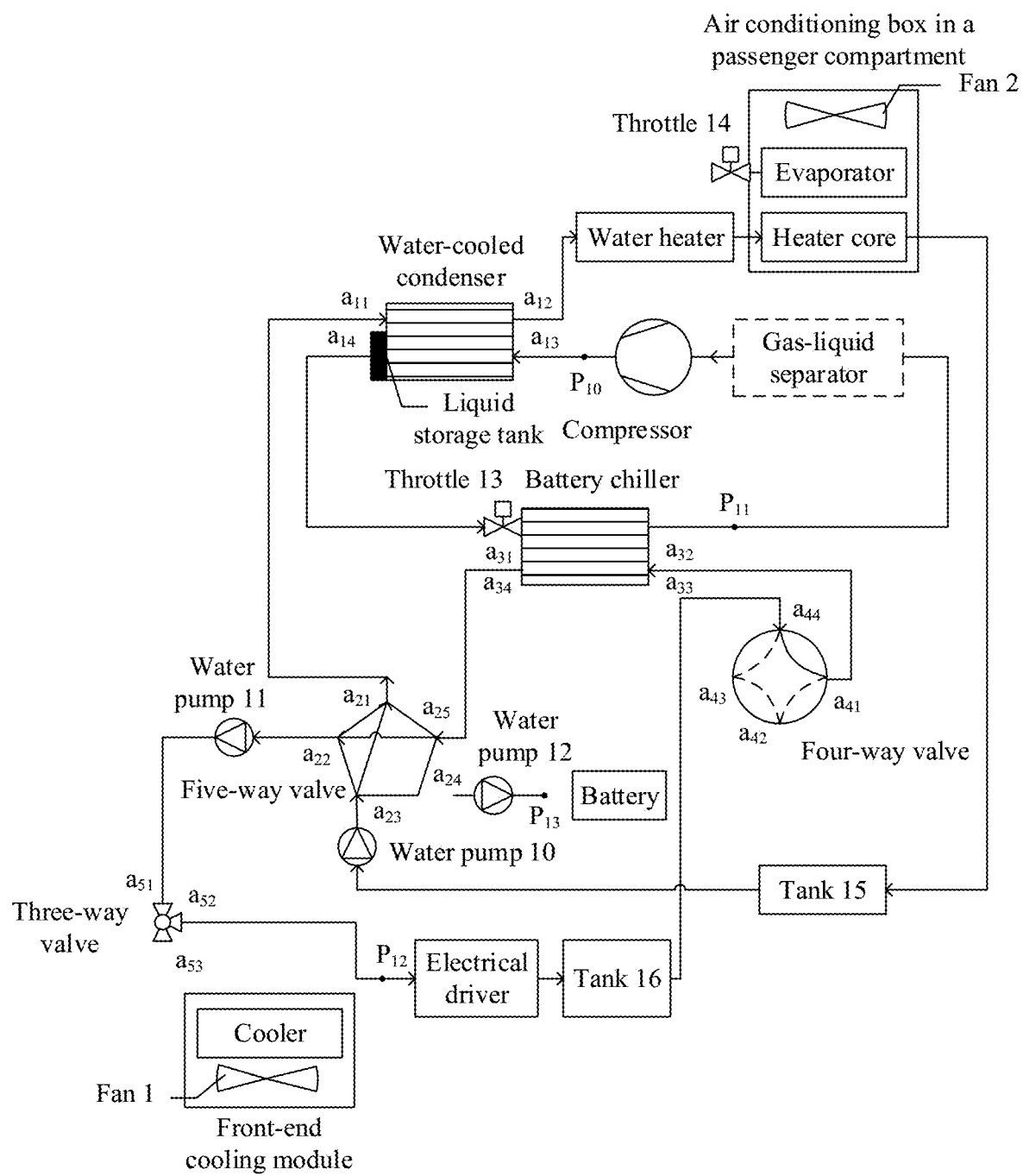
FIG. 6I is a schematic diagram illustrating a connection relationship of a thermal management system in a mode of heating only a passenger compartment.

FIG. 6I is a schematic diagram illustrating a connection relationship of a thermal management system in a mode of heating only a passenger compartment. As shown in FIG. 6I, in the M18 mode, the controller may connect the first end $a_{21}$ of the five-way valve and the third end $a_{23}$ of the five-way valve, connect the second end $a_{22}$ of the five-way valve and the fifth end $a_{25}$ of the five-way valve, connect the first end $a_{41}$ of the four-way valve and the fourth end $a_{44}$ of the four-way valve, connect the first end $a_{51}$ of the three-way valve and the second end $a_{52}$ of the three-way valve, open the throttle 13, close the throttle 14 (so that the evaporator does not work), turn on the water heater, and start the water pump 10 and the water pump 11. In this case, the first refrigerant loop, the fifth coolant loop, and the seventh coolant loop are connected. High-temperature and high-pressure refrigerant gas output by the compressor passes through the second heat exchange pipe for heat exchange to obtain low-temperature and low-pressure refrigerant liquid. The low-temperature and low-pressure refrigerant liquid passes through the third heat exchange pipe, exchanges heat with the coolant in the fourth heat exchange pipe, and then flows back to the compressor. The air conditioner in the passenger compartment starts a full heating mode. The coolant flowing out of the water pump 10 is heated by the water heater and then transmitted to the heater core to heat the passenger compartment, and then flows back to the water pump 10. The controller can control power of the water heater based on a temperature of an air outlet of the air conditioner in the passenger compartment to change the heating effect of the passenger compartment. The low-temperature coolant flowing out of the fourth heat exchange pipe may directly cool the electrical driver through the fifth coolant loop.

In this embodiment of this application, a scenario to which the M18 mode is applicable is, for example, that the user sits in the passenger compartment of the electric vehicle in winter, but an external ambient temperature is still within a range tolerable by the battery. Therefore, if the foregoing manner is used to adjust the thermal management system to satisfy the connection relationship required in the M18 mode, only the passenger compartment can be heated.

M19: Mode of Heating Only the Battery.

Figure 6J:
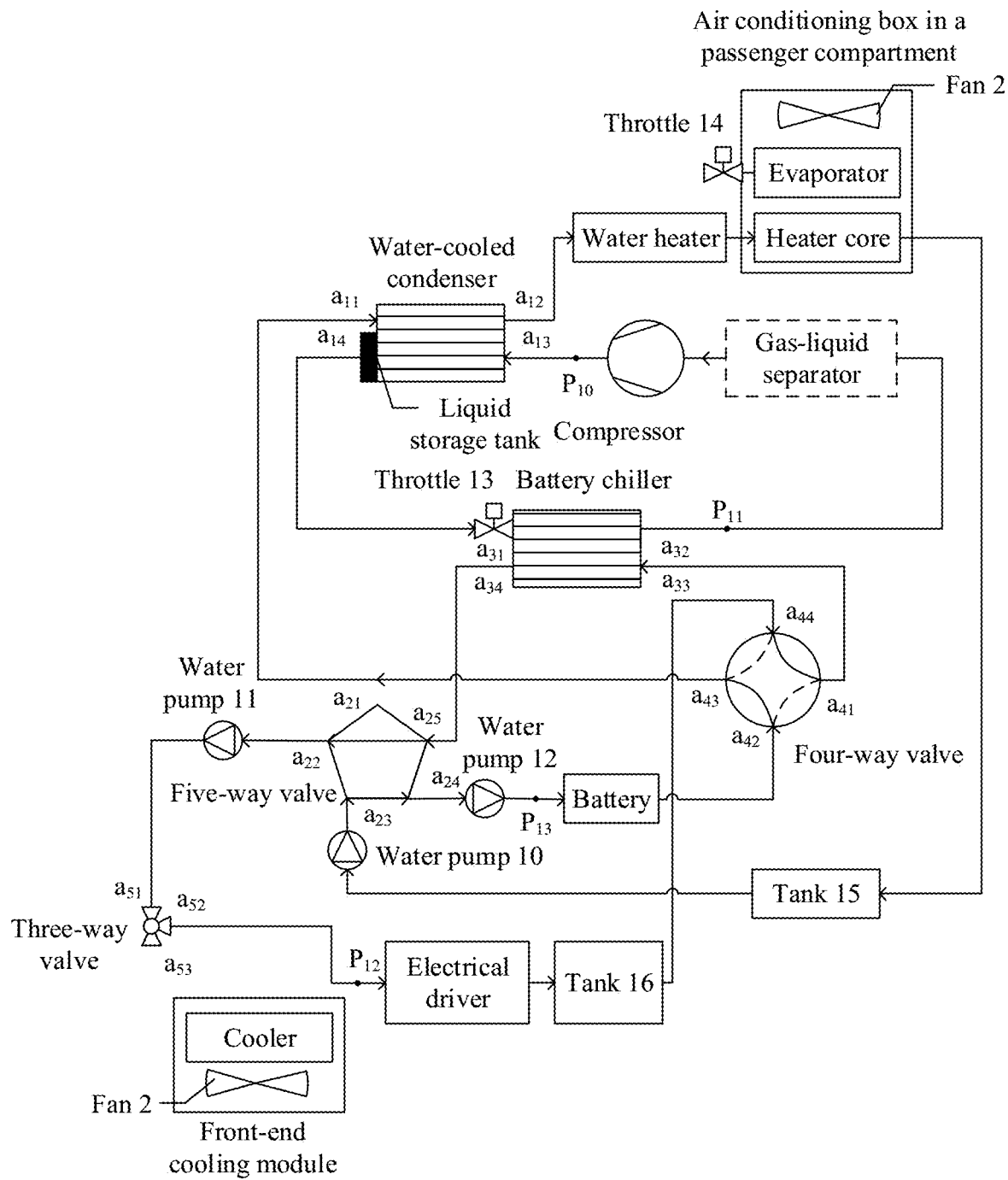
FIG. 6J is a schematic diagram illustrating a connection relationship of a thermal management system in a mode of heating only a battery.

FIG. 6J is a schematic diagram illustrating a connection relationship of a thermal management system in a mode of heating only a battery. As shown in FIG. 6J, in the M19 mode, the controller may connect the second end $a_{22}$ of the five-way valve and the third end $a_{25}$ of the five-way valve, connect the third end $a_{23}$ of the five-way valve and the fourth end $a_{24}$ of the five-way valve, connect the first end $a_{41}$ of the four-way valve and the fourth end $a_{44}$ of the four-way valve, connect the second end $a_{42}$ of the four-way valve and the third end $a_{43}$ of the four-way valve, connect the first end $a_{51}$ of the three-way valve and the second end $a_{52}$ of the three-way valve, open the throttle 13, close the throttle 14 (so that the evaporator does not work), turn on the water heater, and start the water pump 10, the water pump 11, and the water pump 12. In this case, the first refrigerant loop, the fifth coolant loop, and the eighth coolant loop are connected. High-temperature and high-pressure refrigerant gas output by the compressor passes through the second heat exchange pipe for heat exchange to obtain low-temperature and low-pressure refrigerant liquid. The low-temperature and low-pressure refrigerant liquid passes through the third heat exchange pipe, exchanges heat with the coolant in the fourth heat exchange pipe, and then flows back to the compressor. The air conditioner in the passenger compartment is not started. Therefore, the coolant heated by the water heater flows through the heater core only as a bypass and is transmitted to the water pump 10, and the water pump 10 heats the battery through the five-way valve. The controller may control power of the water heater based on a temperature of a water inlet of the battery, to change the heating effect of the battery. The low-temperature coolant flowing out of the fourth heat exchange pipe may directly pass through the fifth coolant loop to cool the electrical driver. If the cooling effect is excessively high, the controller may further open the third end $a_{53}$ of the three-way valve at the same time, to absorb a part of heat in the environment through a front-end branch and reduce the cooling effect after convergence in the fifth coolant loop. When two branches of the three-way valve are both opened, flux distribution of the coolants in the two branches can be adjusted automatically based on whether a temperature of an inlet of the electrical driver can meet a cooling requirement of the motor.

In this embodiment of this application, a scenario to which the M19 mode is applicable is, for example, that a temperature of the battery is relatively low due to impact of an external environment in winter, but the user is not cold or the user is not in the vehicle. To avoid a relatively large electric energy loss and reduction of endurance of the electric vehicle because the battery is in a low-temperature state for a long time, the thermal management system may be adjusted in the foregoing manner to the connection relationship satisfied by the M19 mode, to implement a function of heating only the battery.

M20: Mode of Dehumidifying the Entire Vehicle.

Figure 6K:
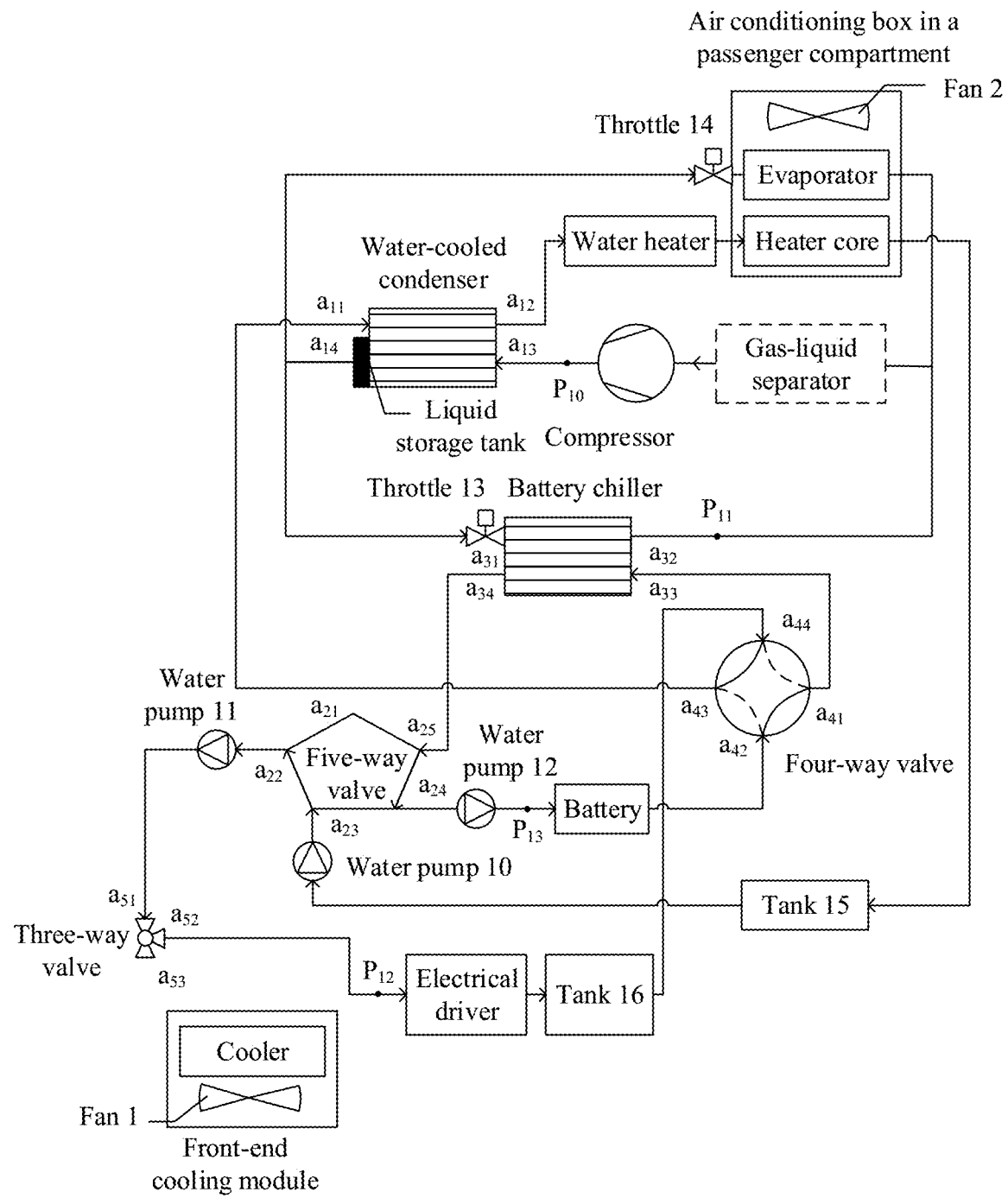
FIG. 6K is a schematic diagram illustrating a connection relationship of a thermal management system in a mode of naturally cooling a motor.

FIG. 6K is a schematic diagram illustrating a connection relationship of a thermal management system in a mode of naturally cooling a motor. As shown in FIG. 6K, in the M20 mode, the controller may connect the second end $a_{22}$ of the five-way valve and the third end $a_{23}$ of the five-way valve, connect the fourth end $a_{24}$ of the five-way valve and the fifth end $a_{25}$ of the five-way valve, connect the first end $a_{41}$ of the four-way valve and the second end $a_{42}$ of the four-way valve, connect the third end $a_{43}$ of the four-way valve and the fourth end $a_{44}$ of the four-way valve, connect the first end $a_{51}$ of the three-way valve and the second end $a_{52}$ of the three-way valve, open the throttle 13 and the throttle 14, turn on the water heater, and start the water pump 10, the water pump 11, and the water pump 12. In this case, the first refrigerant loop, the second refrigerant loop, the fifth coolant loop, and the eighth coolant loop are connected. High-temperature and high-pressure refrigerant gas output by the compressor passes through the second heat exchange pipe for heat exchange to obtain low-temperature and low-pressure refrigerant liquid, and then flows back to the compressor through the evaporator and the third heat exchange pipe separately. The controller may control refrigerant fluxes in the two refrigerant loops by controlling openings of the throttle 13 and the throttle 14 respectively, to adjust the refrigeration effects of the passenger compartment and the battery. When the passenger compartment and the battery conflict, the controller is preferentially configured to ensure that a temperature of an inlet of the battery reaches an expectation requirement. The air conditioner in the passenger compartment starts the dehumidification mode, that is, first using the evaporator to perform cooling and dehumidification, and then using the coolant heated by the water heater to perform heating, so that the dehumidified coolant flows in each coolant loop. The controller may further change the heating effect by controlling power of the water heater. Further, the dehumidified coolant passes through the five-way valve and the three-way valve to cool the electrical driver, and then enters circulation of the water heater through one branch of the four-way valve, and the other branch enters the fourth heat exchange pipe to cool the battery. For example, the M20 mode may be periodically executed based on a preset period, to maintain a dry environment in the entire electric vehicle, and improve user experience.

It should be understood that the foregoing describes only several modes that can be implemented by the thermal management system as examples. In this embodiment of this application, the thermal management system may further implement other modes in addition to the foregoing several modes, for example, a mode of refrigerating only the motor or a mode of heating only the motor. In addition, a same mode may be actually further implemented by using various different loops, and the mode is not limited to those described above. Details are not described herein in this application.

However, the thermal management system in embodiment 1 can implement free switching between various refrigeration modes and various heating modes, including but not limited to M10 to M20. In this way, a plurality of different modes can be implemented by using fewer components. This can not only meet different user requirements, but also improve flexibility of mode switching and expand an application scope of the thermal management system.

Embodiment 2

Figure 7A:
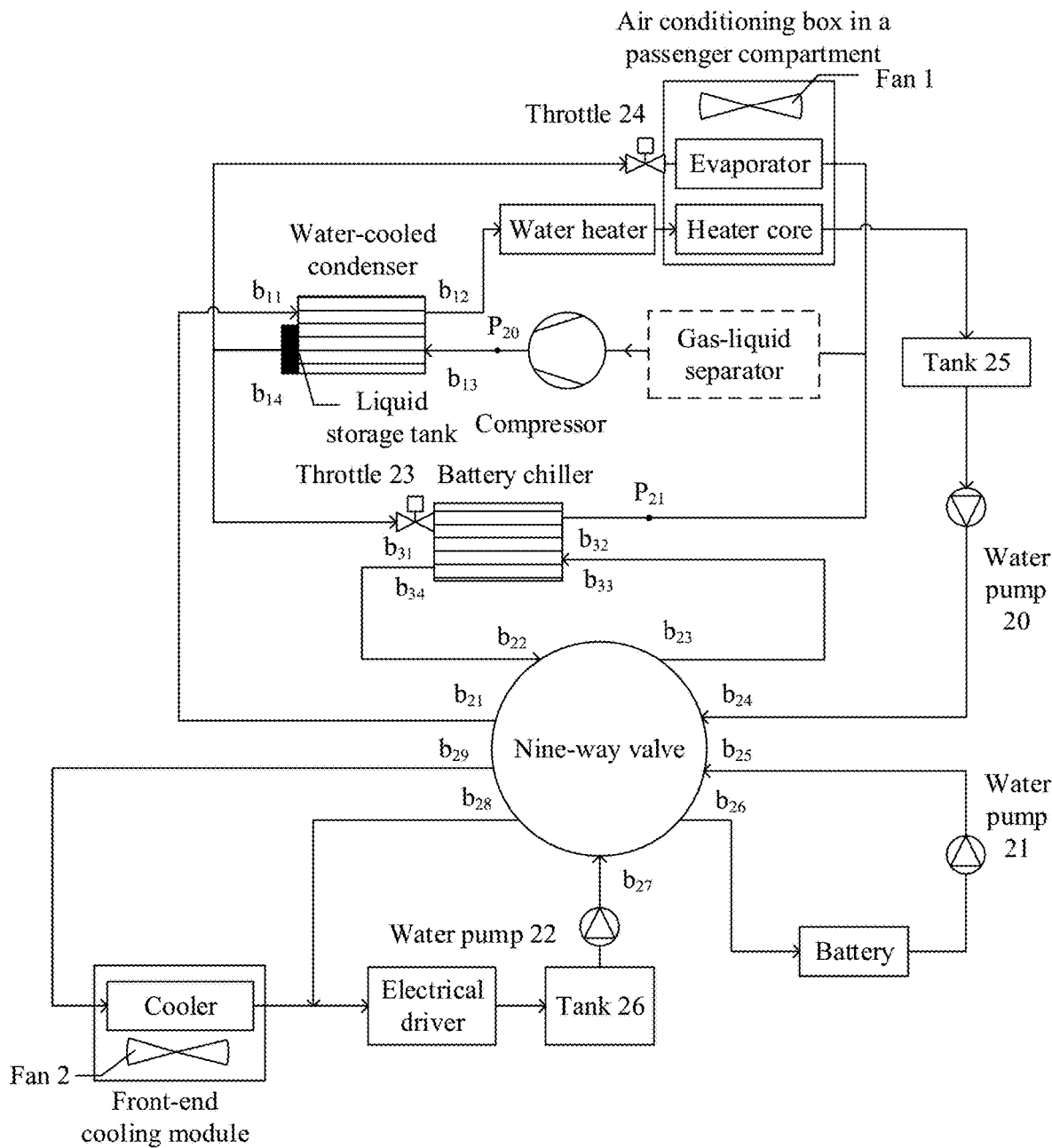
FIG. 7A is a schematic diagram illustrating a structure of a thermal management system according to embodiment 2 of this application.

FIG. 7A is a schematic diagram illustrating a structure of a thermal management system according to embodiment 2 of this application. As shown in FIG. 7A, the thermal management system may include a compressor, a water-cooled condenser, a battery chiller, a nine-way valve, a water pump 21, a water pump 22, and a water pump 23. The water-cooled condenser may include a first heat exchange pipe and a second heat exchange pipe. The battery chiller may include a third heat exchange pipe and a fourth heat exchange pipe. An input end (bit) of the first heat exchange pipe is connected to a first end (b21) of the nine-way valve, an output end (b12) of the first heat exchange pipe is connected to an input end of a heater core in an air conditioner box in a passenger compartment, an output end of the heater core is connected to an input end of a water pump 20, and an output end of the water pump 20 is connected to a fourth end (b24) of the nine-way valve. An input end (b13) of the second heat exchange pipe is connected to an output end of the compressor. An output end (b14) of the second heat exchange pipe is divided into two branches, where one branch is connected to an input end (b31) of the third heat exchange pipe, and then is connected to an input end of the compressor through an output end (b32) of the third heat exchange pipeline, and the other branch is connected to an input end of an evaporator in the air conditioner box in the passenger compartment, and then is connected to the input end of the compressor through an output end of the evaporator. An input end (b33) of the fourth heat exchange pipe is connected to a third end (b23) of the nine-way valve, and an output end (b$_{34}$) of the fourth heat exchange pipe is connected to a second end (b22) of the nine-way valve. A sixth end (b26) of the nine-way valve is connected to an input end of a battery, an output end of the battery is connected to an input end of the water pump 21, and an output end of the water pump 21 is connected to a fifth end (b25) of the nine-way valve. A ninth end (b29) of the nine-way valve is connected to an input end of a cooler in a front-end cooling module, both an output end of the cooler and an eighth end (b28) of the nine-way valve are connected to an input end of an electrical driver, an output end of the electrical driver is connected to an input end of the water pump 22, and an output end of the water pump 22 is connected to the fifth end (b25) of the nine-way valve.

Figure 7B:
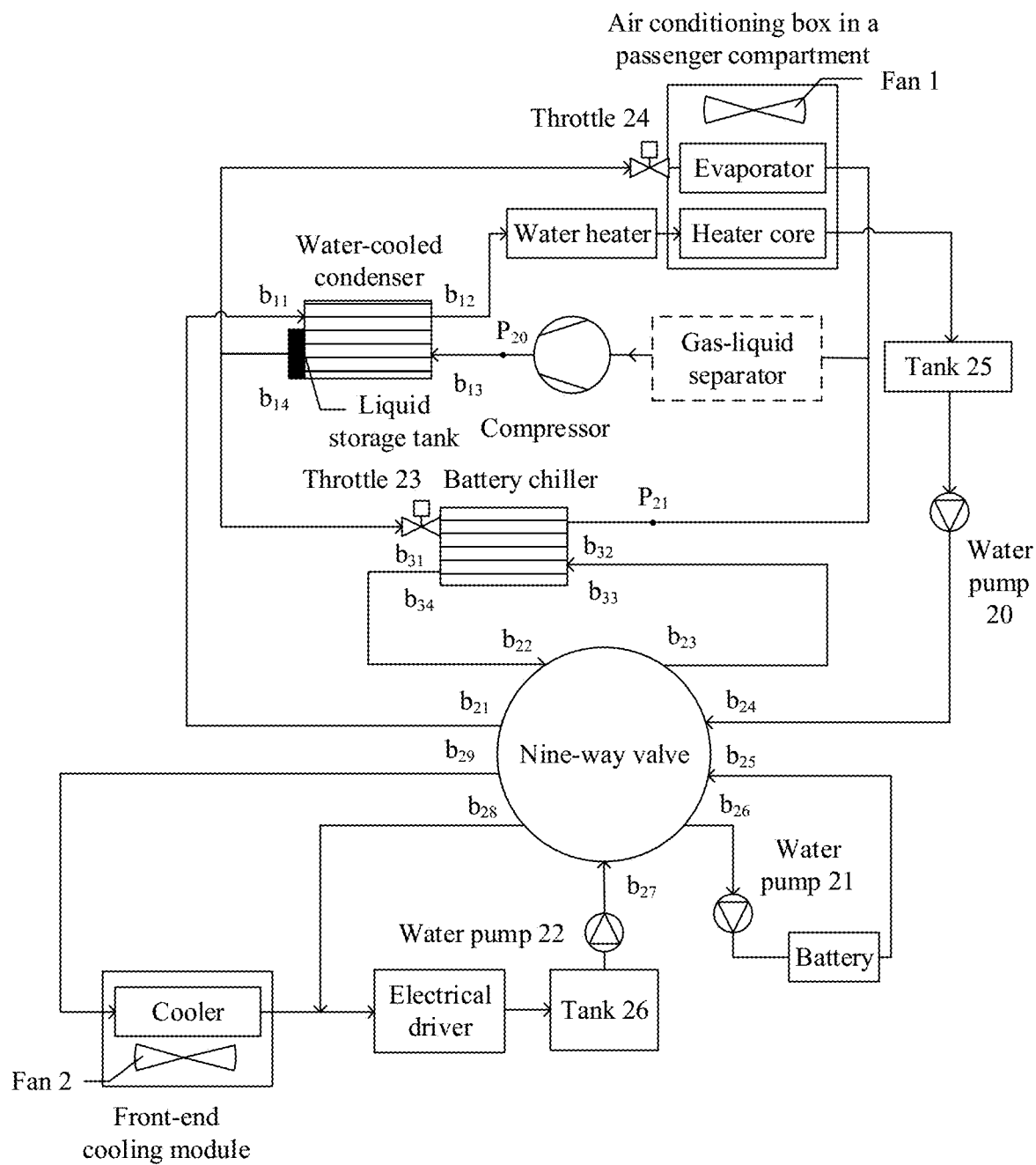
FIG. 7B is another schematic diagram illustrating a structure of a thermal management system according to embodiment 2 of this application.

It should be noted that, in embodiment 2, positions of components on a same loop may also be interchanged. For example, the water pump 21 may alternatively be disposed between the battery and the sixth end b$_{62}$ of the nine-way valve. FIG. 7B shows an internal composition diagram of the thermal management system in this case. Because the water pump 21 is moved only from a seventh end of the nine-way valve shown in FIG. 7A to the sixth end of the nine-way valve shown in FIG. 7B, this interchange has no essential impact on implementation of the solution. The following describes the solution in embodiment 2 of this application by using the thermal management system shown in FIG. 7A as an example.

In this embodiment of this application, a first fan (1) is further disposed in the front-end cooling module, and the fan 1 is configured to complete heat exchange processing between an ambient temperature and the cooler in the front-end cooling module based on ambient air. A temperature adjustment may be heating or cooling. For example, because a temperature of a coolant in winter is lower than an ambient temperature, the front-end cooling module can heat the coolant based on the ambient temperature; because a temperature of the coolant in summer is higher than an ambient temperature, the front-end cooling module can cool the coolant based on the ambient temperature. For ease of understanding, the following describes only cooling of the front-end cooling module as an example. It should be noted that this does not mean that the front-end cooling module cannot perform heating. Correspondingly, the evaporator and the heater core are disposed in the air conditioner box in the passenger compartment. A second fan (2) may also be disposed in the air conditioner box in the passenger compartment. The fan 2 may directly blow ambient air to the passenger compartment. Alternatively, the air may be cooled by the evaporator before the air is blown out, or the air may be heated by the heater core before the air is blown out.

In an optional implementation, still with reference to FIG. 7A, the thermal management system may further include a water heater, where an input end of the water heater is connected to the output end b$_{12}$ of the first heat exchange pipe, and an output end of the water heater is connected to the input end of the heater core. The water heater is configured to heat the coolant flowing through the water heater. When the passenger compartment needs to be heated, if a temperature of warm air blown out of the heater core to the passenger compartment does not reach a temperature set by a user, the coolant output by the first heat exchange pipe may be first heated by using the water heater, and then warm air blown out of an air conditioner to the passenger compartment is heated by the heater core, to improve a heating effect of the passenger compartment. Certainly, if the temperature of the warm air blown out of the heater core to the passenger compartment is appropriate, the water heater may be turned off directly.

In an optional implementation, still with reference to FIG. 7A, the thermal management system may further include at least one throttle, such as a throttle 23 and a throttle 24. Both an input end of the throttle 23 and an input end of the throttle 24 are connected to the output end b$_{14}$ of the second heat exchange pipe, an output end of the throttle 23 is connected to the input end b$_{31}$ of the third heat exchange pipe, and an output end of the throttle 24 is connected to the input end of the evaporator. The throttle is configured to control a flux of output liquid. When the throttle 23 is closed, low-temperature and low-pressure refrigerant liquid obtained through heat exchange by the second heat exchange pipe cannot be transmitted to the third heat exchange pipe through the throttle 23, and the fourth heat exchange pipe cannot exchange heat with the third heat exchange pipe to obtain a low-temperature and low-pressure coolant. When the throttle 24 is closed, high-temperature and high-pressure refrigerant liquid obtained through heat exchange by the first heat exchange pipe cannot be transmitted to the heater core through the throttle 24.

In an optional implementation, still with reference to FIG. 7A, the thermal management system may further include a liquid storage apparatus. The liquid storage apparatus is configured to store a part of refrigerant liquid in a refrigerant loop. The liquid storage apparatus may be a liquid storage tank or a gas-liquid separation apparatus. When the liquid storage apparatus is a liquid storage tank, the liquid storage tank may be disposed outside the output end of the second heat exchange pipe, an input end of the liquid storage tank is connected to the output end $b_{14}$ of the second heat exchange pipe, and an output end of the liquid storage tank is separately connected to the input end of the evaporator and the input end of the throttle 23. The liquid storage tank is configured to store a part of refrigerant liquid in a first refrigerant loop and/or a second refrigerant loop. When the liquid storage apparatus is a gas-liquid separation apparatus, an input end of the gas-liquid separator is separately connected to the output end of the evaporator and the output end of the third heat exchange pipe, and an output end of the gas-liquid separator is connected to the input end of the compressor. The gas-liquid separator may separate refrigerant gas and refrigerant liquid in the refrigerant loop, so that the refrigerant gas flows into the compressor and that the refrigerant liquid is stored in the gas-liquid separator. Because the liquid storage apparatus is disposed in the thermal management system, not only the compressor can receive pure refrigerant gas, and a compression effect of the compressor can be improved, but also a refrigeration effect of the loop can be adjusted.

In an optional implementation, still with reference to FIG. 7A, the thermal management system may further include at least one tank, such as a tank 25 and a tank 26. An input end of the tank 25 may be connected to the output end of the heater core, and an output end of the tank 25 may be connected to the input end of the water pump 20. An input end of the tank 26 may be connected to the output end of the electrical driver, and an output end of the tank 26 may be connected to the input end of the water pump 22. Both the tank 25 and the tank 26 are disposed in a coolant loop, and are configured to purify a coolant in the coolant loop. When the coolant is purer, a temperature adjustment effect of the coolant loop is better or improved.

In an optional implementation, still with reference to FIG. 7A, a temperature-pressure sensor such as a temperature-pressure sensor $P_{20}$ or a temperature-pressure sensor $P_{21}$ may be further disposed at each key position in the thermal management system. The temperature-pressure sensor $P_{20}$ is disposed at an output end of the compressor, and is configured to detect a temperature and pressure of the refrigerant output by the compressor. The temperature-pressure sensor $P_{21}$ is disposed at the output end of the third heat exchange pipe, and is configured to detect a temperature and pressure of the battery chiller. It should be understood that the foregoing illustrated key positions are merely examples for description and that this application is not limited to these key positions.

embodiment 2 uses one nine-way valve to replace the three-way valve, the four-way valve, and the five-way valve in embodiment 1. Therefore, embodiment 2 can not only have the beneficial effect of embodiment 1, but also further simplify the structure of the thermal management system and further reduce the size occupied by the thermal management system. However, the nine-way valve is relatively sophisticated in a process design. Therefore, costs of the thermal management system in embodiment 2 may be higher than costs of the thermal management system in Embodiment 1.

Figure 8:
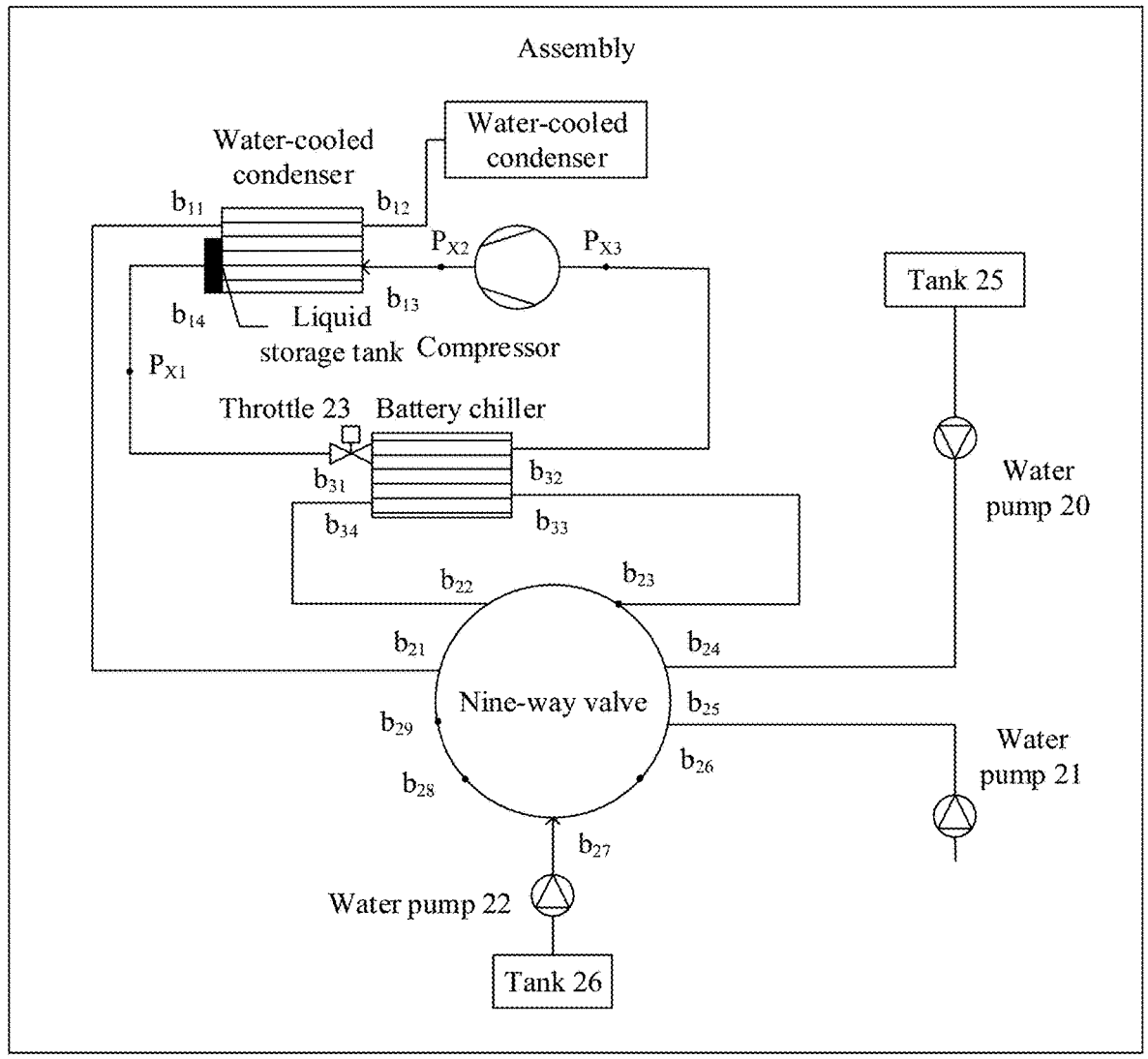
FIG. 8 is a schematic diagram illustrating an assembly according to embodiment 2 of this application.

In embodiment 2 of this application, components of the thermal management system may be further designed in an integration mode. For details about various solutions to implementing the integration mode, refer to the foregoing embodiment 1. A difference lies only in that the five-way valve, the four-way valve, and the three-way valve in embodiment 1 are replaced with the nine-way valve. FIG. 8 is a schematic diagram illustrating an assembly according to embodiment 2 of this application. In this solution, the liquid storage tank is used as a gas-liquid separation apparatus. As shown in FIG. 8, in the assembly, all exchanger components and all valve components in the thermal management system may be integrated in a same component assembly simultaneously. Each exchanger component may include one or more of the water-cooled condenser, the battery chiller, the water heater, and the compressor. Each valve component may include one or more of the nine-way valve, the water pump 20, the water pump 21, the water pump 22, the tank 25, and the tank 26. The solution illustrated in FIG. 8 integrates all the exchanger components and all the valve components, so that the structure is more compact and that less space is occupied.

The following still uses several modes illustrated in embodiment 1 as examples to describe some modes that can be implemented by the thermal management system in embodiment 2 of this application. It should be understood that a control end of each valve component, a control end of each water pump, and an output end of each temperature-pressure sensor in the thermal management system may be further connected to a controller. The controller can not only implement different temperature modes by controlling each valve component and each water pump, but also obtain the temperature and pressure at each key position from the output end of each temperature-pressure sensor in the control process, further determine whether the current temperature and pressure meet requirements of the current temperature mode, and if the current temperature and pressure do not meet the requirements, may perform a real-time adjustment, to adjust the temperature and pressure based on the current temperature mode. For details about how to control a flux of the throttle, how to control a rotational speed of the compressor, how to control power of the water heater in the process of running the thermal management system, and the like, refer to embodiment 1. Details are not described in the following description.

M10: Mode of Refrigerating the Passenger Compartment and the Battery Simultaneously.

Figure 9A:
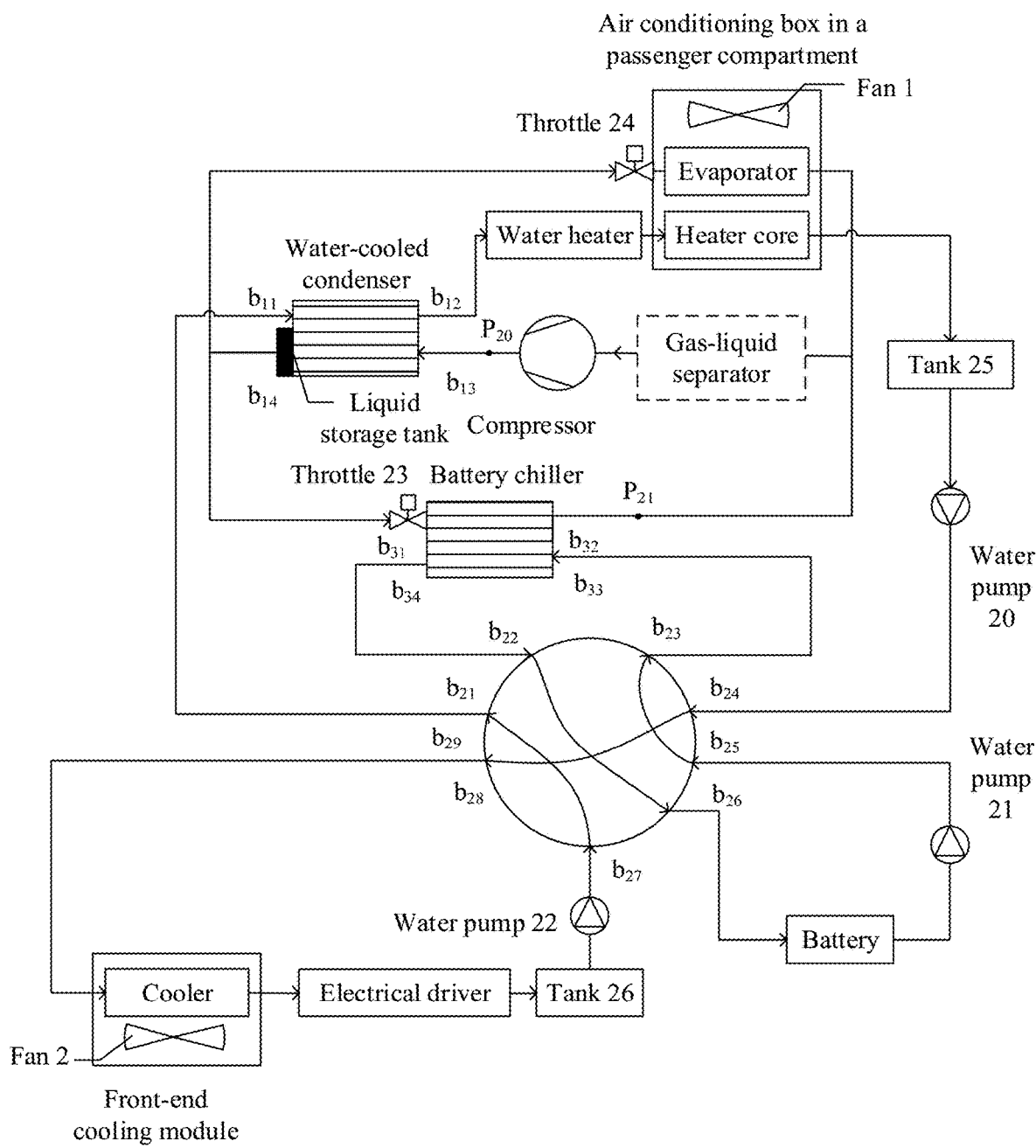
FIG. 9A is a schematic diagram illustrating a connection relationship of a thermal management system in a mode of refrigerating a passenger compartment and a battery simultaneously.

FIG. 9A is a schematic diagram illustrating a connection relationship of a thermal management system in a mode of refrigerating a passenger compartment and a battery simultaneously. As shown in FIG. 9A, in the M10 mode, the controller may connect the first end $b_{21}$ of the nine-way valve and the seventh end $b_{27}$ of the nine-way valve, connect the second end $b_{22}$ of the nine-way valve and the sixth end $b_{26}$ of the nine-way valve, connect the third end $b_{23}$ of the nine-way valve and the fifth end $b_{25}$ of the nine-way valve, connect the fourth end $b_{24}$ of the nine-way valve and the ninth end $b_{29}$ of the nine-way valve, open the throttle 23 and the throttle 24, turn off the water heater, and start the water pump 20, the water pump 21, and the water pump 22. In this case, high-temperature and high-pressure refrigerant gas output by the compressor passes through the second heat exchange pipe for heat exchange to obtain low-temperature and low-pressure refrigerant liquid. One branch of the low-temperature and low-pressure refrigerant liquid is transmitted to the evaporator to cool the passenger compartment and flows back to the compressor. In this case, the air conditioner in the passenger compartment is set to a full refrigeration mode (the full refrigeration mode is one of refrigeration modes, and is a mode of refrigerating the passenger compartment and the battery simultaneously). The other branch of the low-temperature and low-pressure refrigerant liquid passes through the third heat exchange pipe and cools the coolant (the coolant driven by the water pump 21 flows to the fourth heat exchange pipe through the fifth end $b_{25}$ and the third end $b_{23}$ of the nine-way valve) in the fourth heat exchange pipe to obtain a low-temperature and low-pressure coolant, and the low-temperature and low-pressure coolant flows to the battery through the second end $b_{22}$ and the sixth end $b_{26}$ of the nine-way valve to cool the battery. In addition, the coolant driven by the water pump 20 flows into the front-end cooling module through the nine-way valve for cooling, then flows to the electrical driver to cool the electrical driver, and then flows back to the water pump 20 through the water pump 22, the nine-way valve, the first heat exchange pipe, and the heater core. Although a coolant also flows through the heater core in the air conditioner box in the passenger compartment, the water heater is not started and the heater core does not work. Therefore, the coolant flowing through the heater core flows through the air conditioner box only as a bypass, and does not affect a temperature of an operator cabin. In this case, the battery is refrigerated by the cooled coolant in the battery chiller, the passenger compartment is refrigerated by the cooled refrigerant in the water-cooled condenser, and the electrical driver is naturally cooled by the cooled coolant in the front-end cooling module.

M11: Mode of Refrigerating Only the Passenger Compartment.

Figure 9B:
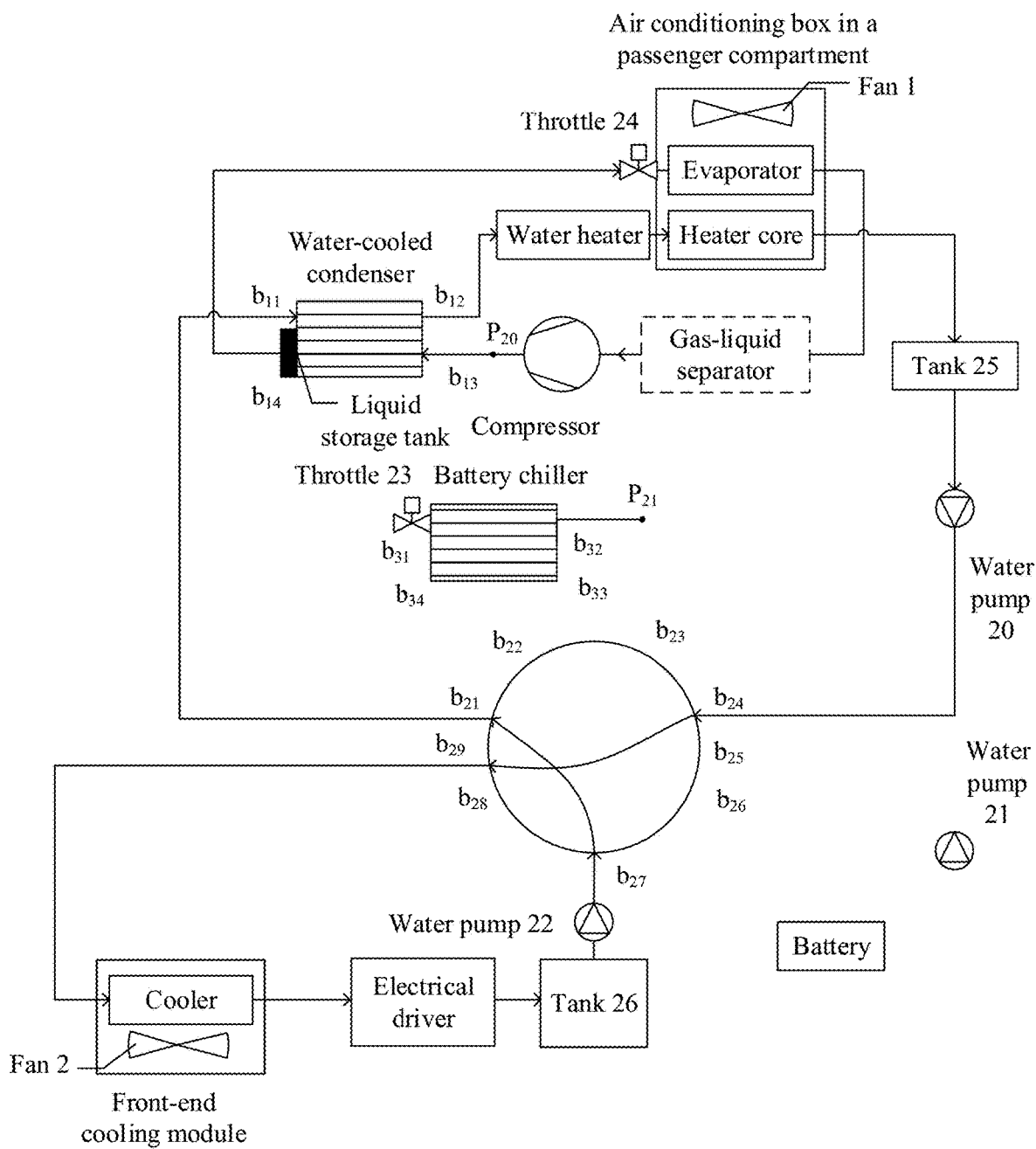
FIG. 9B is a schematic diagram illustrating a connection relationship of a thermal management system in a mode of refrigerating only a passenger compartment.

FIG. 9B is a schematic diagram illustrating a connection relationship of a thermal management system in a mode of refrigerating only a passenger compartment. As shown in FIG. 9B, in the M11 mode, the controller may connect the first end $b_{21}$ of the nine-way valve and the seventh end $b_{27}$ of the nine-way valve, connect the fourth end $b_{24}$ of the nine-way valve and the ninth end $b_{29}$ of the nine-way valve, open the throttle 24, close the throttle 23 (that is, the battery chiller does not work), turn off the water heater, turn off the heater core (when the air conditioner in the passenger compartment is started, the air conditioner in the passenger compartment blows the ambient air directly to the passenger compartment without heating by the heater core), and start the water pump 20 and the water pump 22. In this case, high-temperature and high-pressure refrigerant gas output by the compressor passes through the second heat exchange pipe for heat exchange to obtain low-temperature and low-pressure refrigerant liquid. The low-temperature and low-pressure refrigerant liquid is transmitted to the evaporator to cool the passenger compartment and then flows back to the compressor. In this case, the air conditioner in the passenger compartment is set to a refrigeration mode. The coolant driven by the water pump 20 flows into the front-end cooling module through the nine-way valve for cooling, then flows to the electrical driver to cool the electrical driver, and then flows back to the water pump 20 through the nine-way valve, the first heat exchange pipe, and the heater core. Although a coolant also flows through the heater core in the air conditioner box in the passenger compartment, the water heater is not started and the heater core does not work. Therefore, the coolant flowing through the heater core flows through the air conditioner box only as a bypass, and does not affect a temperature of an operator cabin. In this case, the passenger compartment is refrigerated by the cooled refrigerant in the water-cooled condenser, and the electrical driver is cooled naturally by the cooled coolant in the front-end cooling module.

M12: Mode of Refrigerating Only the Battery.

Figure 9C:
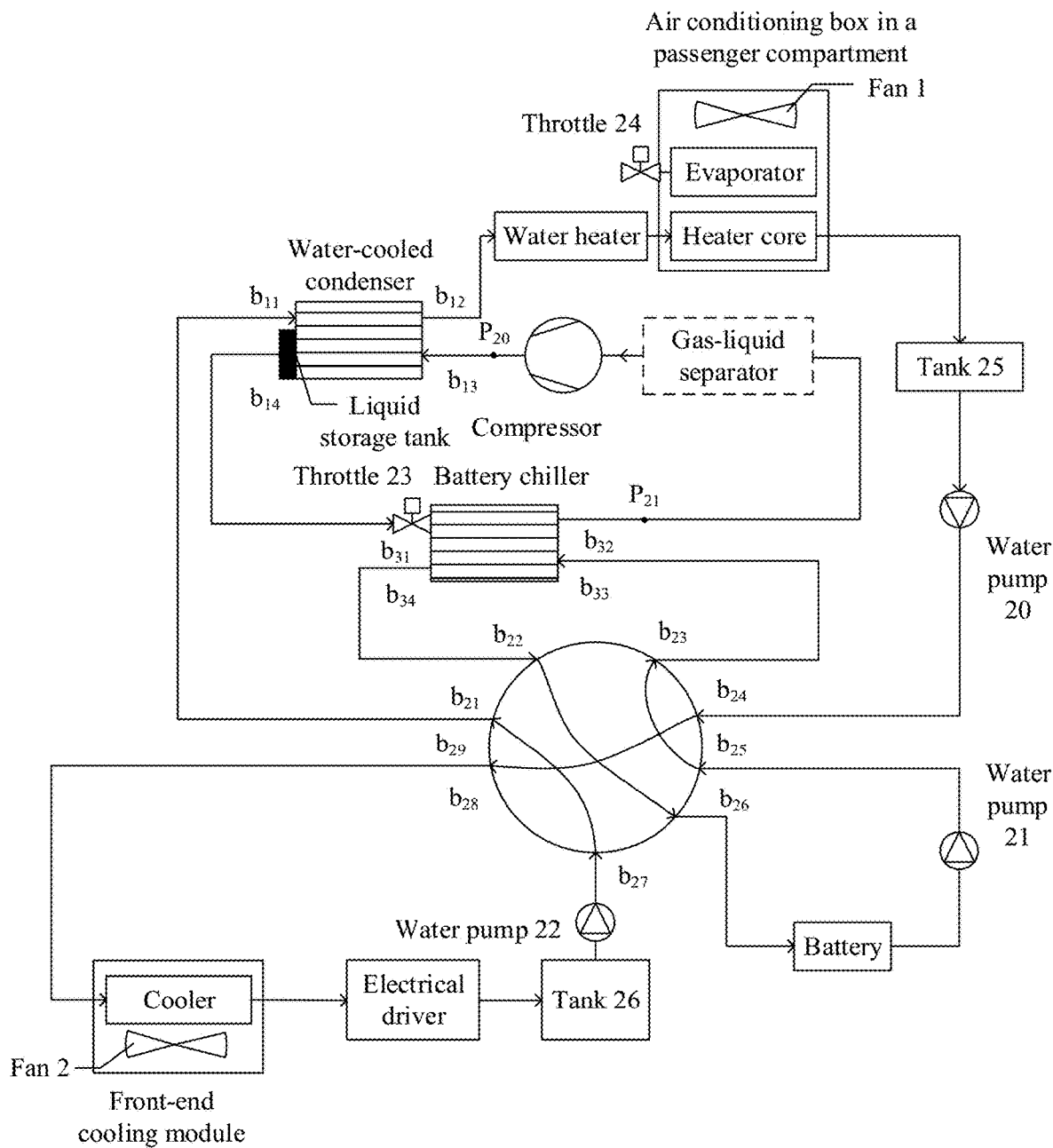
FIG. 9C is a schematic diagram illustrating a connection relationship of a thermal management system in a mode of refrigerating only a battery.

FIG. 9C is a schematic diagram illustrating a connection relationship of a thermal management system in a mode of refrigerating only a battery. As shown in FIG. 9C, in the M12 mode, the controller may connect the first end $b_{21}$ of the nine-way valve and the seventh end $b_{27}$ of the nine-way valve, connect the second end $b_{22}$ of the nine-way valve and the sixth end $b_{26}$ of the nine-way valve, connect the third end $b_{23}$ of the nine-way valve and the fifth end $b_{25}$ of the nine-way valve, connect the fourth end $b_{24}$ of the nine-way valve and the ninth end $b_{29}$ of the nine-way valve, open the throttle 23, close the throttle 24 (that is, the evaporator does not work), turn off the water heater, turn off the heater core, and start the water pump 20, the water pump 21, and the water pump 22. In this case, high-temperature and high-pressure refrigerant gas output by the compressor passes through the second heat exchange pipe for heat exchange to obtain low-temperature and low-pressure refrigerant liquid. The low-temperature and low-pressure refrigerant liquid passes through the third heat exchange pipe, cools the coolant (the coolant driven by the water pump 21 flows to the fourth heat exchange pipe through the fifth end $b_{25}$ and the third end $b_{23}$ of the nine-way valve) in the fourth heat exchange pipe to obtain a low-temperature and low-pressure coolant, and then flows back to the compressor. The low-temperature and low-pressure coolant obtained through heat exchange by the fourth heat exchange pipe flows to the battery through the second end $b_{22}$ and the sixth end $b_{26}$ of the nine-way valve to cool the battery, and then flows back to the water pump 21. The coolant driven by the water pump 20 flows into the front-end cooling module through the nine-way valve for cooling, then flows to the electrical driver to cool the electrical driver, and then flows back to the water pump 20 through the water pump 22, the nine-way valve, the first heat exchange pipe, and the heater core. Although a coolant also flows through the heater core in the air conditioner box in the passenger compartment, the water heater is not started and the heater core does not work. Therefore, the coolant flowing through the heater core flows through the air conditioner box only as a bypass, and does not affect a temperature of an operator cabin. In this case, the battery is refrigerated by the cooled coolant in the battery chiller, and the electrical driver is naturally cooled by the cooled coolant in the front-end cooling module.

M14: Mode of Naturally Cooling the Battery.

Figure 9D:
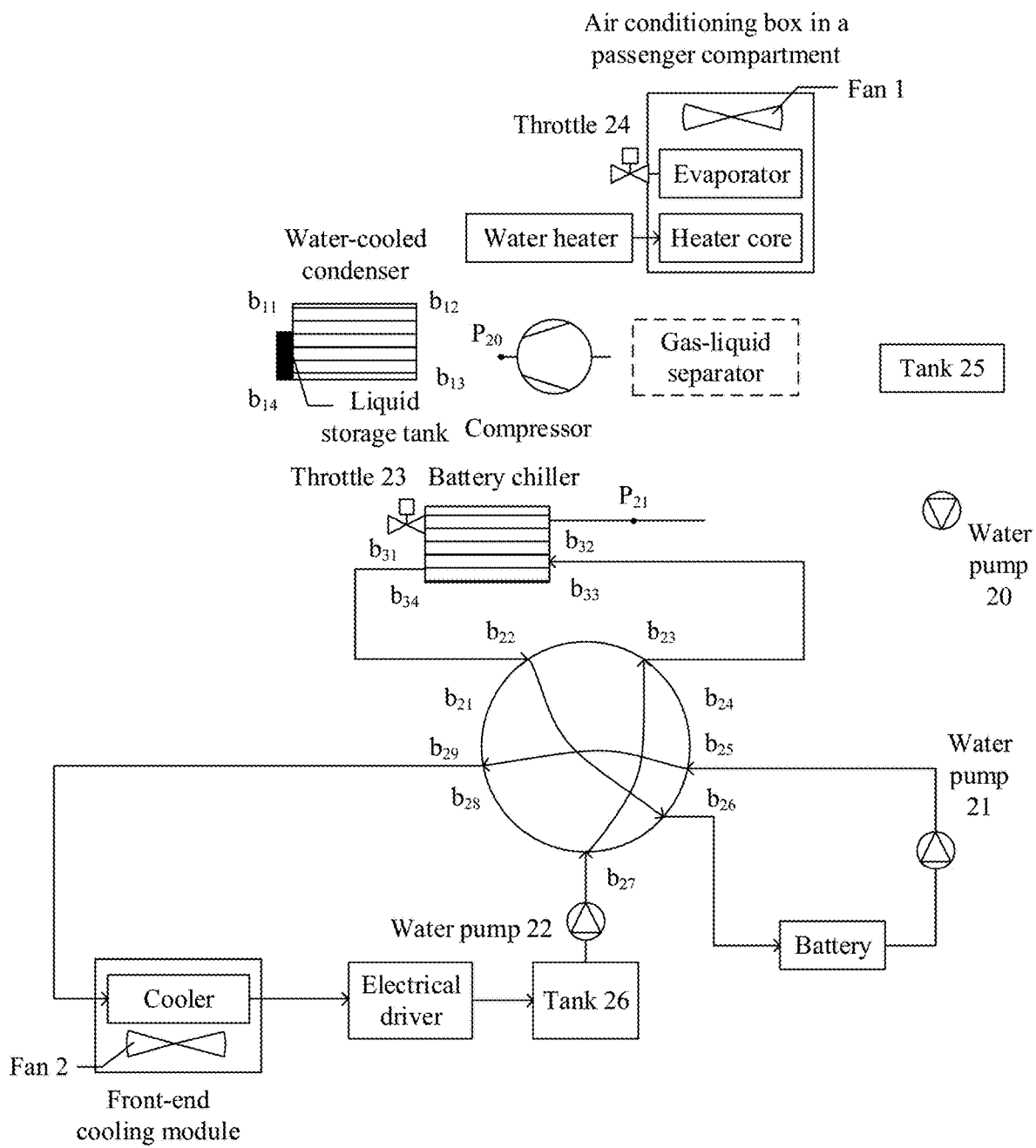
FIG. 9D is a schematic diagram illustrating a connection relationship of a thermal management system in a mode of naturally cooling a battery.

FIG. 9D is a schematic diagram illustrating a connection relationship of a thermal management system in a mode of naturally cooling a battery. As shown in FIG. 9D, in the M14 mode, the controller may connect the second end $b_{22}$ of the nine-way valve and the sixth end $b_{26}$ of the nine-way valve, connect the third end $b_{23}$ of the nine-way valve and the seventh end $b_{27}$ of the nine-way valve, connect the fifth end $b_{25}$ of the nine-way valve and the ninth end $b_{29}$ of the nine-way valve, close the throttle 23 and the throttle 24 (so that neither the evaporator nor the battery chiller works), turn off the water heater, turn off the heater core, and start the water pump 21 and the water pump 22. In this case, the coolant driven by the water pump 21 flows to the front-end cooling module through the fifth end $b_{25}$ and the ninth end $b_{29}$ of the nine-way valve for cooling, then flows to the electrical driver to cool the electrical driver, further flows to the battery through the water pump 22, the seventh end $b_{27}$ of the nine-way valve, the third end $b_{23}$ of the nine-way valve, the fourth heat exchange pipe (because the battery chiller does not work, the fourth heat exchange pipe is actually used only as a pipe for circulation and does not perform heat exchange), the second end $b_{22}$ of the nine-way valve, and the sixth end $b_{26}$ of the nine-way valve, to cool the battery, and then flows back to the water pump 21. In this case, both the battery and the electrical driver are naturally cooled by using the coolant cooled by the front-end cooling module.

M15: Mode of Naturally Cooling a Motor.

Figure 9E:
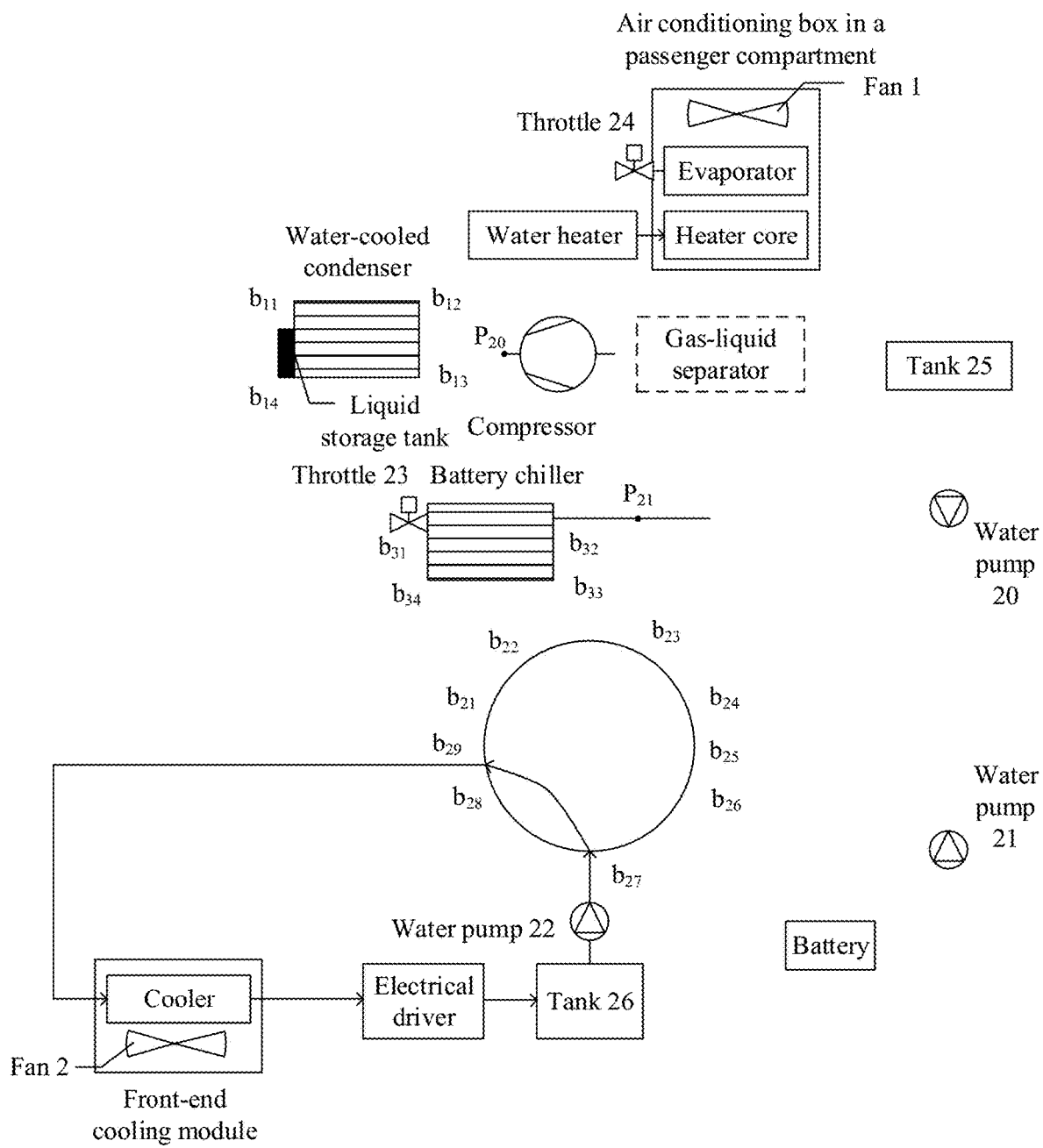
FIG. 9E is a schematic diagram illustrating a connection relationship of a thermal management system in a mode of naturally cooling a motor.

FIG. 9E is a schematic diagram illustrating a connection relationship of a thermal management system in a mode of naturally cooling a motor. As shown in FIG. 9E, in the M15 mode, the controller may connect the seventh end $b_{27}$ of the nine-way valve and the ninth end $b_{29}$ of the nine-way valve, close the throttle 23 and the throttle 24 (so that neither the evaporator nor the battery chiller works), turn off the water heater, and start the water pump 22. In this case, the coolant driven by the water pump 22 flows into the front-end cooling module through the seventh end $b_{27}$ of the nine-way valve and the ninth end $b_{29}$ of the nine-way valve for cooling, then flows to the electrical driver to cool the electrical driver, and then flows back to the water pump 22. In this case, the electrical driver is naturally cooled by using the coolant cooled by the front-end cooling module.

M16: Mode of Heating the Passenger Compartment and the Battery Simultaneously.

Figure 9F:
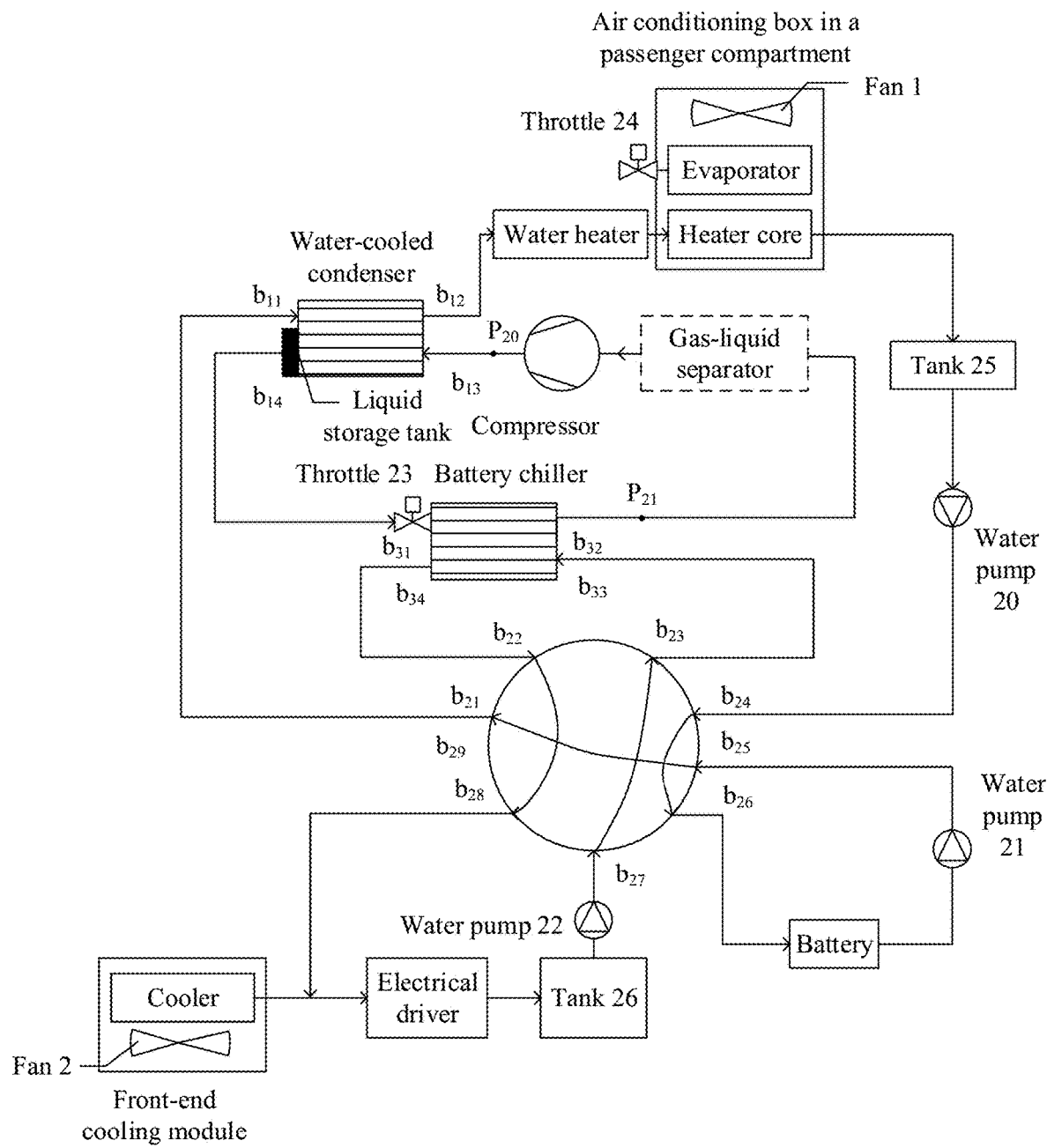
FIG. 9F is a schematic diagram illustrating a connection relationship of a thermal management system in a mode of heating a passenger compartment and a battery simultaneously.

FIG. 9F is a schematic diagram illustrating a connection relationship of a thermal management system in a mode of heating a passenger compartment and a battery simultaneously. As shown in FIG. 9F, in the M16 mode, the controller may connect the first end $b_{21}$ of the nine-way valve and the fifth end $b_{25}$ of the nine-way valve, connect the second end $b_{22}$ of the nine-way valve and the eighth end $b_{28}$ of the nine-way valve, connect the third end $b_{23}$ of the nine-way valve and the seventh end $b_{27}$ of the nine-way valve, connect the fourth end $b_{24}$ of the nine-way valve and the sixth end $b_{26}$ of the nine-way valve, open the throttle 23, close the throttle 24 (so that the evaporator does not work), turn off the water heater, turn off the heater core, and start the water pump 20, the water pump 21, and the water pump 22. In this case, high-temperature and high-pressure refrigerant gas output by the compressor passes through the second heat exchange pipe for heat exchange with the first heat exchange pipe (the coolant driven by the water pump 21 flows to the first heat exchange pipe through the fifth end $b_{25}$ of the nine-way valve and the first end $b_{21}$ of the nine-way valve) to obtain low-temperature and low-pressure refrigerant liquid. The low-temperature and low-pressure refrigerant liquid passes through the third heat exchange pipe, cools the coolant in the fourth heat exchange pipe (the coolant driven by the water pump 22 flows to the fourth heat exchange pipe through the seventh end $b_{27}$ of the nine-way valve and the third end $b_{23}$ of the nine-way valve) to obtain a low-temperature and low-pressure coolant, and then flows back to the compressor. The high-temperature and high-pressure refrigerant liquid obtained through heat exchange by the first heat exchange pipe flows into the heater core after being heated by the water heater. The air conditioner in the passenger compartment starts a full heating mode (the full heating mode is one of heating modes, and is a mode of heating the passenger compartment and the battery simultaneously). Therefore, the air conditioner in the passenger compartment first heats the ambient air by using the heater core and then blows the ambient air into the passenger compartment to heat the passenger compartment. The high-temperature refrigerant liquid flowing out of the heater core then flows to the battery through the water pump 20, the fourth end $b_{24}$ of the nine-way valve, and the sixth end $b_{26}$ of the nine-way valve to heat the battery, and then flows back to the water pump 21. The low-temperature and low-pressure coolant in the fourth heat exchange pipe flows to the electrical driver through the second end $b_{22}$ and the eighth end $b_{28}$ of the nine-way valve to cool the electrical driver, and then flows back to the water pump 22. In this case, the passenger compartment and the battery are heated by using the coolant heated by the third heat exchange pipe and/or the water heater, and the electrical driver is cooled by using the coolant cooled by the battery chiller.

M18: Mode of Heating Only the Passenger Compartment.

Figure 9G:
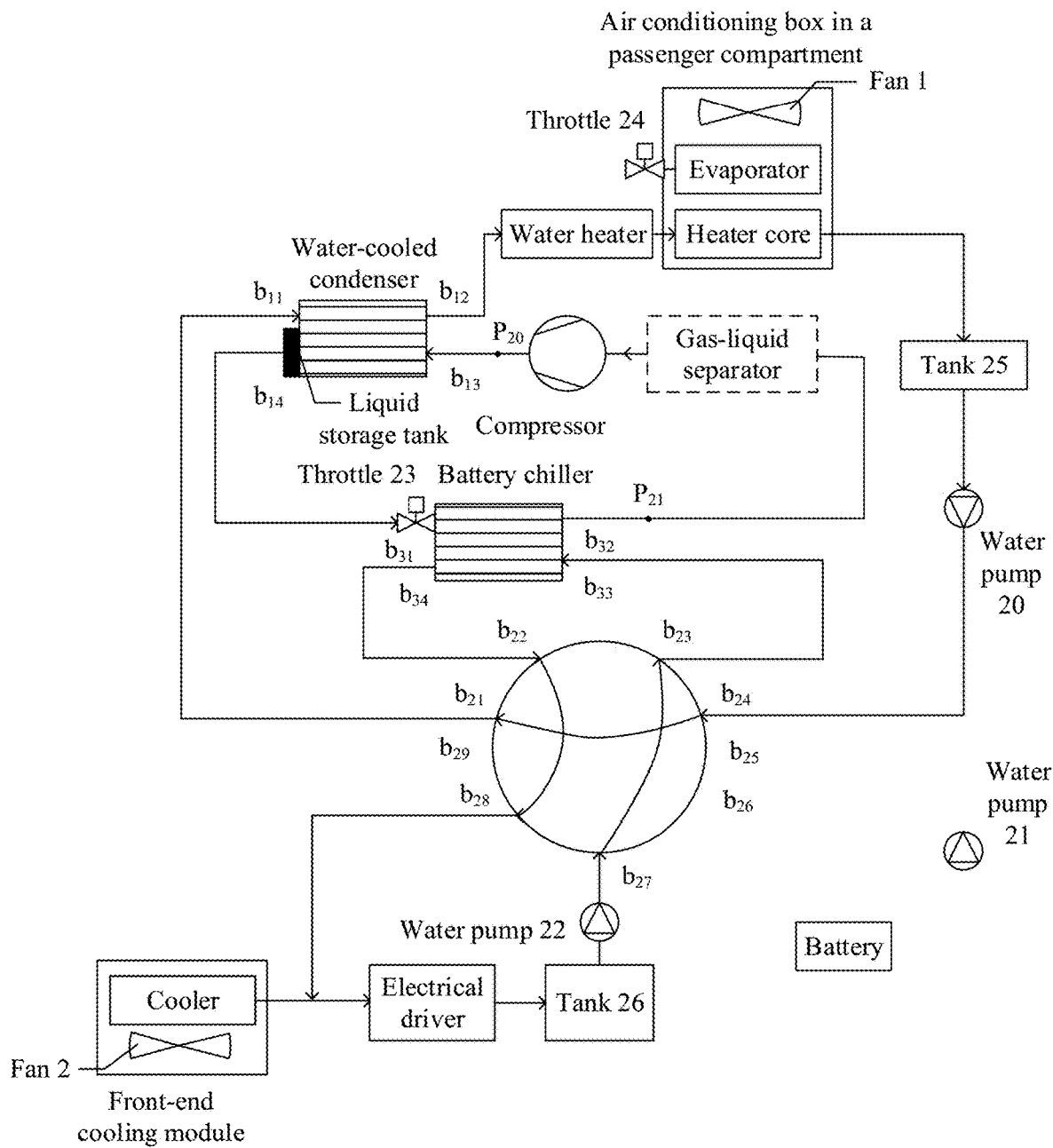
FIG. 9G is a schematic diagram illustrating a connection relationship of a thermal management system in a mode of heating only a passenger compartment.

FIG. 9G is a schematic diagram illustrating a connection relationship of a thermal management system in a mode of heating only a passenger compartment. As shown in FIG. 9G, in the M18 mode, the controller may connect the first end $b_{21}$ of the nine-way valve and the fourth end $b_{24}$ of the nine-way valve, connect the second end $b_{22}$ of the nine-way valve and the eighth end $b_{28}$ of the nine-way valve, connect the third end $b_{23}$ of the nine-way valve and the seventh end $b_{27}$ of the nine-way valve, open the throttle 23, close the throttle 24 (so that the evaporator does not work), turn on the water heater, turn on the heater core, and start the water pump 20 and the water pump 22. In this case, high-temperature and high-pressure refrigerant gas output by the compressor passes through the second heat exchange pipe for heat exchange with the first heat exchange pipe (the coolant driven by the water pump 20 flows to the first heat exchange pipe through the fourth end $b_{24}$ of the nine-way valve and the first end $b_{21}$ of the nine-way valve) to obtain low-temperature and low-pressure refrigerant liquid. The low-temperature and low-pressure refrigerant liquid passes through the third heat exchange pipe, cools the coolant in the fourth heat exchange pipe (the coolant driven by the water pump 22 flows to the fourth heat exchange pipe through the seventh end $b_{27}$ of the nine-way valve and the third end $b_{23}$ of the nine-way valve) to obtain a low-temperature and low-pressure coolant, and then flows back to the compressor. The high-temperature and high-pressure refrigerant liquid obtained through heat exchange by the first heat exchange pipe flows into the heater core after being heated by the water heater. The air conditioner in the passenger compartment starts the heating mode. Therefore, the air conditioner in the passenger compartment first heats the ambient air by using the heater core and then blows the ambient air into the passenger compartment to heat the passenger compartment. The controller may further adjust the heating effect of the passenger compartment by adjusting the power of the water heater. The high-temperature refrigerant liquid flowing out of the heater core flows back to the water pump 20. The low-temperature and low-pressure coolant in the fourth heat exchange pipe flows to the electrical driver through the second end $b_{22}$ and the eighth end $b_{28}$ of the nine-way valve to cool the electrical driver, and then flows back to the water pump 22. In this case, the passenger compartment is heated by using the coolant heated by the third heat exchange pipe and/or the water heater, and the electrical driver is cooled by using the coolant cooled by the battery chiller.

M19: Mode of Heating Only the Battery.

Figure 9H:
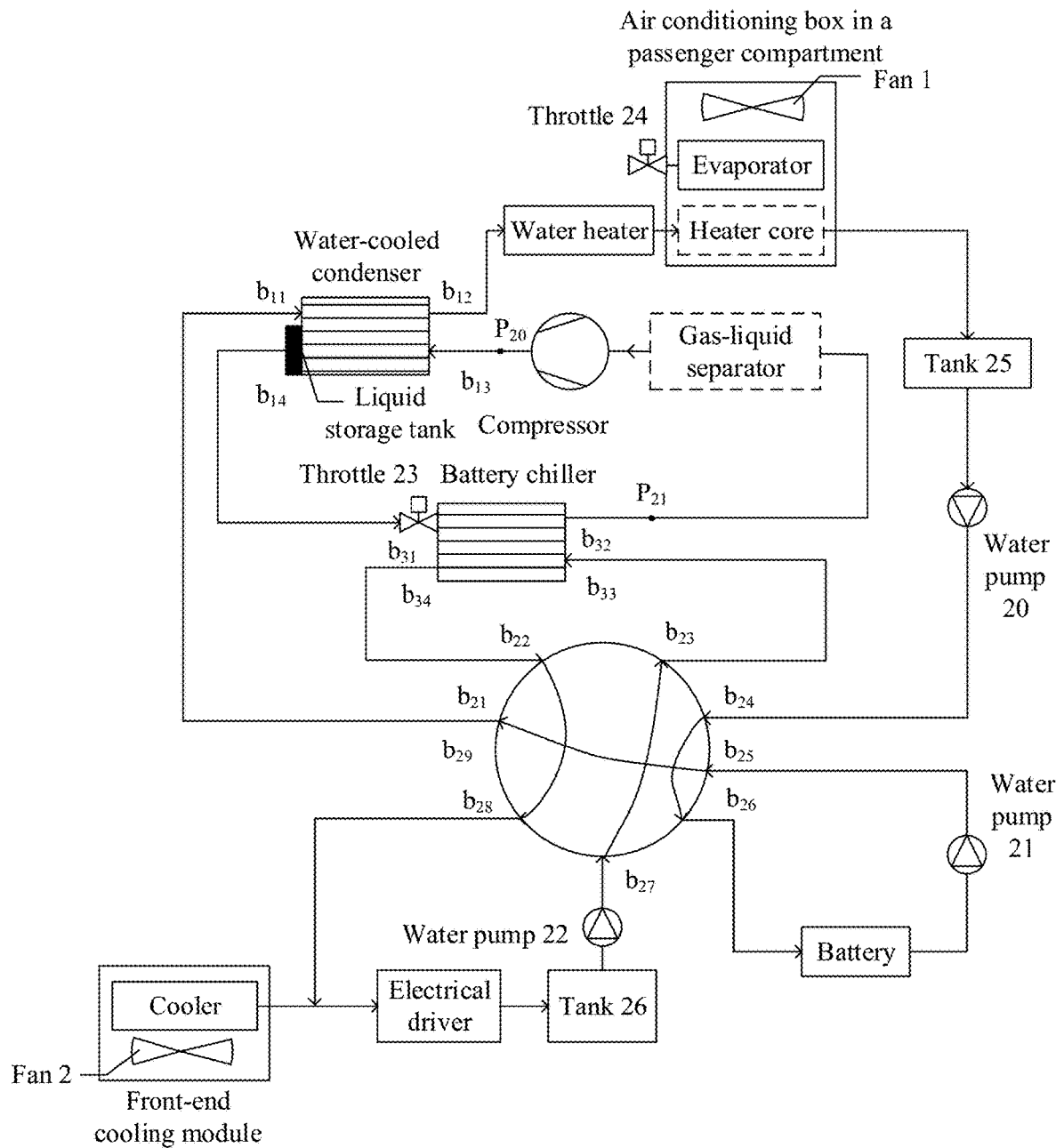
FIG. 9H is a schematic diagram illustrating a connection relationship of a thermal management system in a mode of heating only a battery.

FIG. 9H is a schematic diagram illustrating a connection relationship of a thermal management system in a mode of heating only a battery. As shown in FIG. 9H, in the M19 mode, the controller may connect the first end $b_{21}$ of the nine-way valve and the fifth end $b_{25}$ of the nine-way valve, connect the second end $b_{22}$ of the nine-way valve and the eighth end $b_{28}$ of the nine-way valve, connect the third end $b_{23}$ of the nine-way valve and the seventh end $b_{27}$ of the nine-way valve, connect the fourth end $b_{24}$ of the nine-way valve and the sixth end $b_{26}$ of the nine-way valve, open the throttle 23, close the throttle 24 (so that the evaporator does not work), start the water heater, turn off the heater core, and start the water pump 20, the water pump 21, and the water pump 22. In this case, high-temperature and high-pressure refrigerant gas output by the compressor passes through the second heat exchange pipe for heat exchange with the first heat exchange pipe (the coolant driven by the water pump 21 flows to the first heat exchange pipe through the fifth end $b_{25}$ of the nine-way valve and the first end $b_{21}$ of the nine-way valve) to obtain low-temperature and low-pressure refrigerant liquid. The low-temperature and low-pressure refrigerant liquid passes through the third heat exchange pipe, cools the coolant in the fourth heat exchange pipe (the coolant driven by the water pump 22 flows to the fourth heat exchange pipe through the seventh end $b_{27}$ of the nine-way valve and the third end $b_{23}$ of the nine-way valve) to obtain a low-temperature and low-pressure coolant, and then flows back to the compressor. The high-temperature and high-pressure refrigerant liquid obtained through heat exchange by the first heat exchange pipe flows into the heater core after being heated by the water heater. Because the heater core is not started, the air conditioner in the passenger compartment does not use the heater core to heat ambient air, that is, the passenger compartment is not heated. In this case, the heater core is used as a bypass to transmit the high-temperature coolant, and then the coolant flows to the battery through the water pump 20, the fourth end $b_{24}$ of the nine-way valve, and the sixth end $b_{26}$ of the nine-way valve to heat the battery, and then flows back to the water pump 21. The controller may further adjust a heating effect of the battery by adjusting the power of the water heater. The low-temperature and low-pressure coolant in the fourth heat exchange pipe flows to the electrical driver through the second end $b_{22}$ and the eighth end $b_{28}$ of the nine-way valve to cool the electrical driver, and then flows back to the water pump 22. In this case, the battery is heated by using the coolant heated by the third heat exchange pipe and/or the water heater, and the electrical driver is cooled by using the coolant cooled by the battery chiller.

The foregoing describes only several modes that can be implemented by the thermal management system in embodiment 2 of this application as examples. It should be understood that in embodiment 2 of this application, the thermal management system may further implement other modes in addition to the foregoing several modes, for example, a mode of refrigerating only the motor, a mode of heating only the motor, or a mode of dehumidifying the entire vehicle. In addition, a same mode may be actually further implemented by using various different loops, and the mode is not limited to those described above. Details are not described herein in this application.

Embodiment 3

Figure 10:
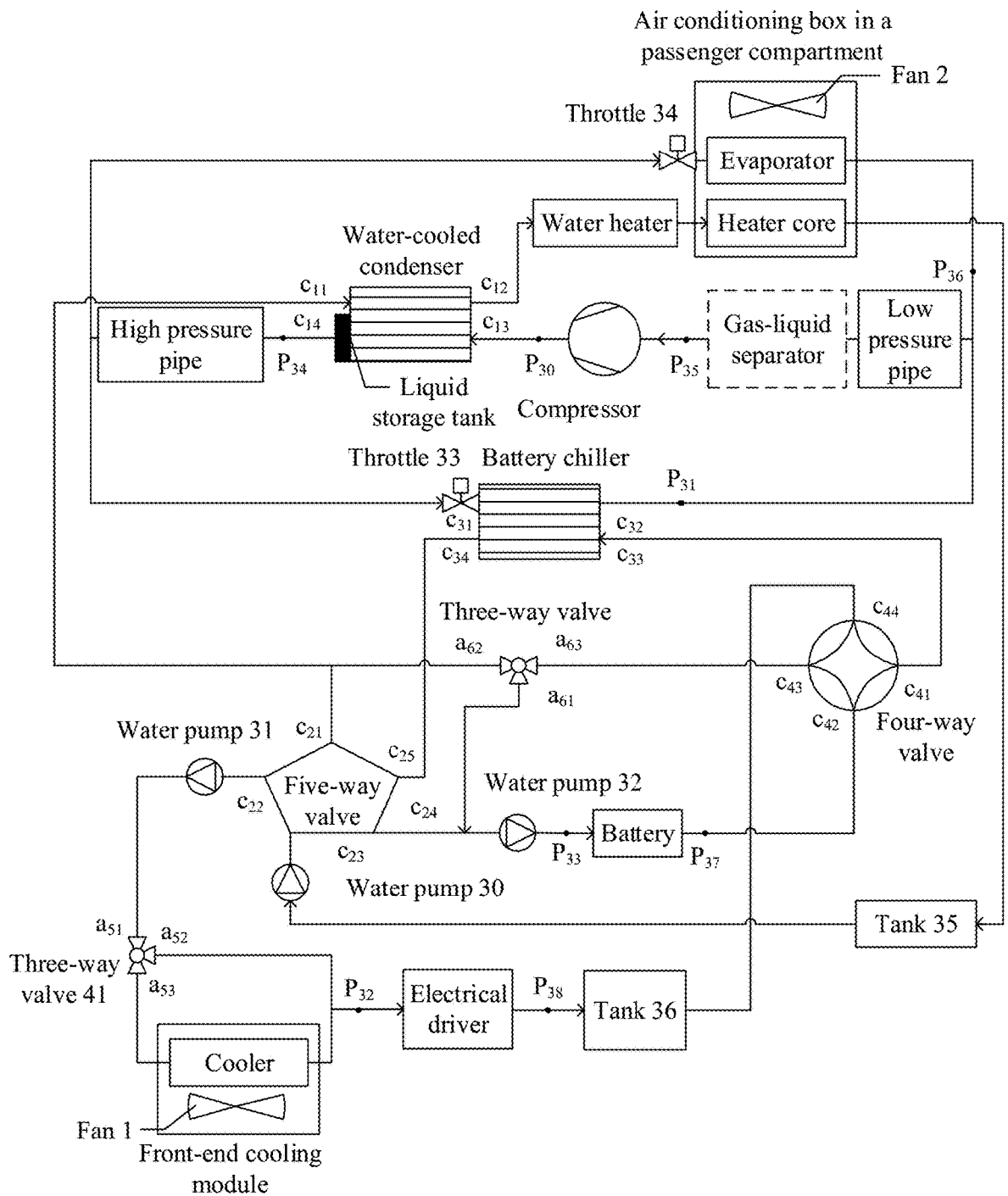
FIG. 10 is a schematic diagram illustrating a structure of a thermal management system according to Embodiment 3 of this application.

FIG. 10 is a schematic diagram illustrating a structure of a thermal management system according to embodiment 3 of this application. As shown in FIG. 10, the thermal management system may include a compressor, a water-cooled condenser, a battery chiller, a five-way valve, a four-way valve, a first three-way valve (41), a second three-way valve (42), a water pump 31, a water pump 32, and a water pump 33. The water-cooled condenser may include a first heat exchange pipe and a second heat exchange pipe. The battery chiller may include a third heat exchange pipe and a fourth heat exchange pipe. An input end ($c_{11}$) of the first heat exchange pipe is connected to a first end ($c_{21}$) of the five-way valve, an output end ($c_{12}$) of the first heat exchange pipe is connected to an input end of a heater core in an air conditioner box in a passenger compartment, an output end of the heater core is connected to an input end of a water pump 30, and an output end of the water pump 30 is connected to a third end ($c_{23}$) of the five-way valve. An input end ($c_{13}$) of the second heat exchange pipe is connected to an output end of the compressor. An output end ($c_{14}$) of the second heat exchange pipe is connected to an input end of a high pressure pipe. An output end of the high pressure pipe is divided into two branches, where one branch is connected to an input end ($c_{31}$) of the third heat exchange pipe and is further connected to an input end of a low pressure pipe through an output end ($c_{32}$) of the third heat exchange pipeline, and the other branch is connected to an input end of an evaporator in the air conditioner box in the passenger compartment and is further connected to the input end of the low pressure pipe through an output end of the evaporator. An output end of the low pressure pipe is connected to an input end of the compressor. An input end ($c_{33}$) of the fourth heat exchange pipe is connected to a first end ($c_{41}$) of the four-way valve, and an output end ($c_{34}$) of the fourth heat exchange pipe is connected to a fifth end ($c_{25}$) of the five-way valve. A second end ($c_{22}$) of the five-way valve is connected to an input end of the water pump 31, an output end of the water pump 31 is connected to a first end ($c_{51}$) of the three-way valve 41, and a second end ($c_{52}$) of the three-way valve 41 is connected to an input end of an electrical driver. A third end ($c_{53}$) of the three-way valve 41 is connected to an input end of a cooler in a front-end cooling module, and an output end of the cooler is also connected to the input end of the electrical driver. An output end of the electrical driver is connected to a fourth end ($c_{44}$) of the four-way valve. A fourth end ($c_{24}$) of the five-way valve is separately connected to an input end of the water pump 32 and a first end ($a_{61}$) of the three-way valve 42, an output end of the water pump 32 is connected to an input end of a battery, and an output end of the battery is connected to a second end ($c_{42}$) of the four-way valve. A second end ($a_{62}$) of the three-way valve 42 is connected to a first end $a_{21}$ of the five-way valve, and a third end ($a_{62}$) of the three-way valve 42 is connected to a third end ($c_{43}$) of the four-way valve. The high pressure pipe and the low pressure pipe are coaxial pipes. When a temperature of a refrigerant in the high pressure pipe is different from a temperature of a refrigerant in the low pressure pipe, the high pressure pipe and the low pressure pipe perform heat exchange operations.

In this embodiment of this application, the cooler is disposed in the front-end cooling module. A first fan (1) is also disposed in the front-end cooling module, and the fan 1 is configured to perform heat exchange processing with the cooler by using an ambient temperature corresponding to ambient air. For example, because a temperature of a coolant in winter is lower than an ambient temperature, the front-end cooling module can heat the coolant based on the ambient temperature; because a temperature of the coolant in summer is higher than an ambient temperature, the front-end cooling module can cool the coolant based on the ambient temperature. For ease of understanding, the following describes only cooling of the front-end cooling module as an example. It should be noted that this does not mean that the front-end cooling module cannot perform heating. Correspondingly, the evaporator and the heater core are disposed in the air conditioner box in the passenger compartment. A second fan (2) may also be disposed in the air conditioner box in the passenger compartment. The fan 2 may directly blow ambient air (neither cooling nor heating) to the passenger compartment. Alternatively, the air may be cooled by the evaporator before the air is blown out, or the air may be heated by the heater core before the air is blown out.

In an optional implementation, still with reference to FIG. 10, the thermal management system may further include a water heater, where an input end of the water heater is connected to the output end $c_{12}$ of the first heat exchange pipe, and an output end of the water heater is connected to the input end of the heater core. The water heater may heat the coolant flowing through the water heater. When the passenger compartment needs to be heated, if a temperature of warm air blown out of the heater core to the passenger compartment does not reach a temperature set by a user, the coolant output by the first heat exchange pipe may be first heated by using the water heater, and then warm air blown out of an air conditioner to the passenger compartment is heated by the heater core, to improve a heating effect of the passenger compartment. If the temperature of the warm air blown out of the heater core to the passenger compartment is appropriate, the water heater may also be turned off directly.

In an optional implementation, still with reference to FIG. 10, the thermal management system may further include at least one throttle, such as a throttle 33 and a throttle 34. Both an input end of the throttle 33 and an input end of the throttle 34 are connected to the output end of the high pressure pipe, an output end of the throttle 33 is connected to the input end $c_{31}$ of the third heat exchange pipe, and an output end of the throttle 34 is connected to the input end of the evaporator. The throttle is configured to control a flux of output liquid. When the throttle is completely closed, the throttle does not output liquid.

In an optional implementation, still with reference to FIG. 10, the thermal management system may further include a liquid storage apparatus. The liquid storage apparatus is configured to store liquid in a refrigerant loop. The liquid storage apparatus may be a liquid storage tank or a gas-liquid separator. When the liquid storage apparatus is a liquid storage tank, the liquid storage tank may be disposed outside the output end of the second heat exchange pipe, an input end of the liquid storage tank is connected to the output end of the second heat exchange pipe, and an output end of the liquid storage tank is connected to the input end of the high pressure pipe. The liquid storage tank is configured to store a part of refrigerant liquid in the refrigerant loop. When the liquid storage apparatus is a gas-liquid separator, an input end of the gas-liquid separator may be connected to the input end of the low pressure pipe, and an output end of the gas-liquid separator may be connected to the input end of the compressor.

In an optional implementation, still with reference to FIG. 10, the thermal management system may further include at least one tank, such as a tank 35 and a tank 36. An input end of the tank 35 may be connected to the output end of the heater core, and an output end of the tank 35 may be connected to the input end of the water pump 30. An input end of the tank 36 may be connected to the output end of the electrical driver, and an output end of the tank 36 may be connected to the fourth end $c_{44}$ of the four-way valve. The tank 35 and the tank 36 can purify a coolant in a coolant loop. When the coolant is purer, a temperature adjustment effect of the coolant loop is better or improved.

In an optional implementation, still with reference to FIG. 10, a temperature-pressure sensor such as a temperature-pressure sensor $P_{30}$, a temperature-pressure sensor $P_{31}$, a temperature-pressure sensor $P_{32}$, a temperature-pressure sensor $P_{33}$, a temperature-pressure sensor $P_{34}$, a temperature-pressure sensor $P_{35}$, a temperature-pressure sensor $P_{36}$, a temperature-pressure sensor $P_{37}$, or a temperature-pressure sensor $P_{38}$ may be further disposed at each key position in the thermal management system. The temperature-pressure sensor $P_{30}$ is disposed at an air outlet of the compressor, the temperature-pressure sensor $P_{35}$ is disposed at an air inlet of the compressor, and the temperature-pressure sensor $P_{30}$ and the temperature-pressure sensor $P_{35}$ are configured to detect an effect of compressing a refrigerant by the compressor. The temperature-pressure sensor $P_{31}$ is disposed at the output end of the third heat exchange pipe, and is configured to detect a temperature and pressure of the battery chiller. The temperature-pressure sensor $P_{32}$ is disposed at a water inlet of the electrical driver, the temperature-pressure sensor $P_{38}$ is disposed at a water outlet of the electrical driver, and the temperature-pressure sensor $P_{32}$ and the temperature-pressure sensor $P_{38}$ are configured to detect a cooling effect of the electrical driver. The temperature-pressure sensor $P_{33}$ is disposed at a water inlet of the battery, the temperature-pressure sensor $P_{37}$ is disposed at a water outlet of the battery, and the temperature-pressure sensor $P_{33}$ and the temperature-pressure sensor $P_{37}$ are configured to detect a cooling effect of the battery, and configured to detect a temperature and pressure at the output end of the electrical driver. The temperature-pressure sensor $P_{34}$ is disposed at a water inlet of the high pressure pipe, the temperature-pressure sensor $P_{36}$ is disposed at a water inlet of the low pressure pipe, and the temperature-pressure sensor $P_{34}$ and the temperature-pressure sensor $P_{36}$ are configured to detect a heat exchange effect and a cooling effect of the high pressure pipe and the low pressure pipe. It should be understood that the foregoing illustrated key positions are merely examples for description and that this application is not limited to these key positions.

In embodiment 3, a three-way valve and a pair of coaxial pipes are added on a basis of Embodiment 1. In compared with embodiment 1, in embodiment 3, by introducing the coaxial pipes, heat exchange can be performed by using the coaxial high pressure pipe and low pressure pipe, to further improve refrigeration efficiency or heating efficiency of the refrigerant loop. Moreover, by introducing the three-way valve 42 in embodiment 3, a battery loop can be isolated when the battery and the passenger compartment are heated simultaneously (relatively isolated, and actually connected by the five-way valve). This helps control the temperature of the coolant at the inlet of the battery to remain within an appropriate range.

Figure 11:
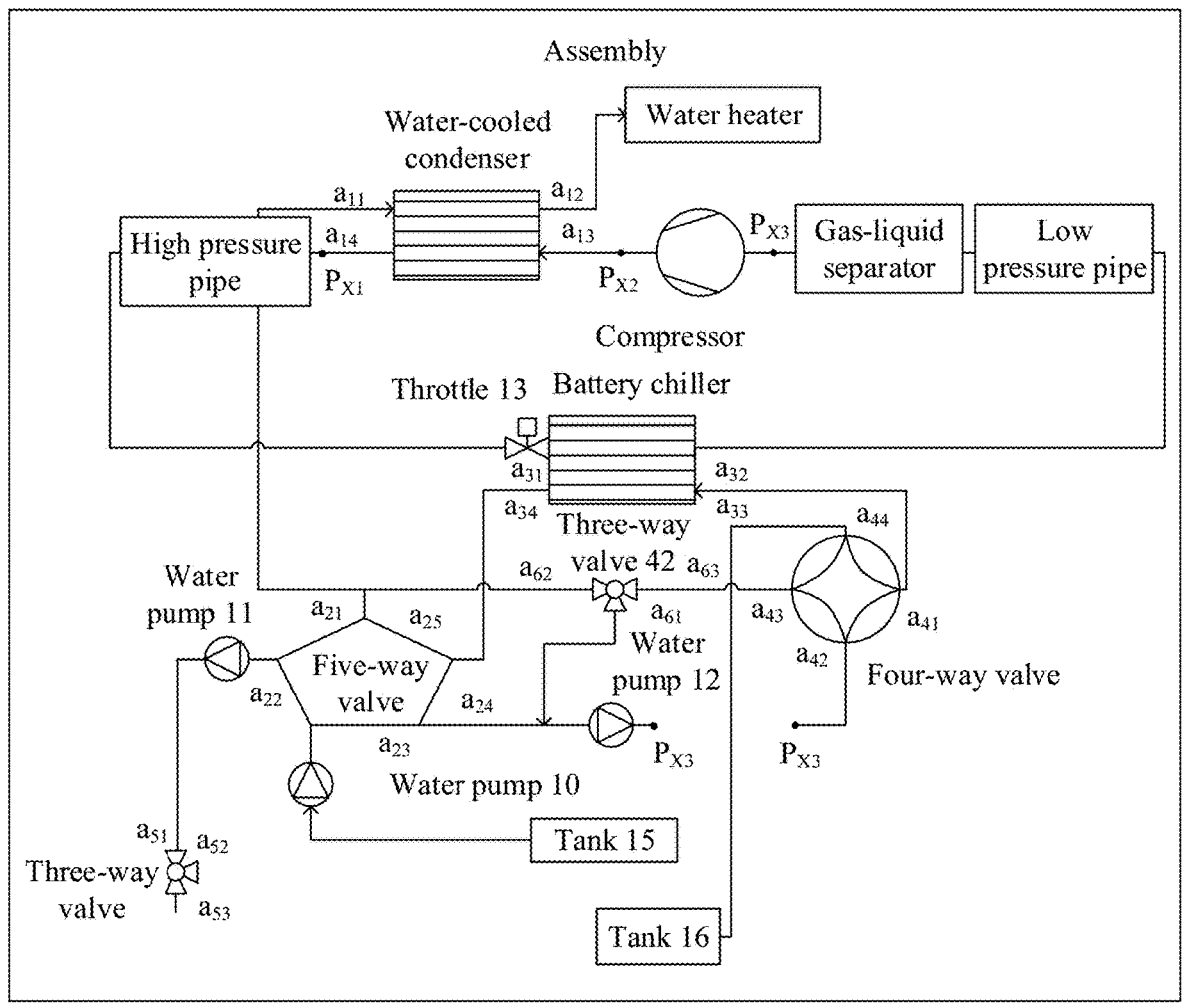
FIG. 11 is a schematic diagram illustrating an assembly according to Embodiment 3 of this application.

In embodiment 3 of this application, components of the thermal management system may be further designed in an integration mode. For various solutions to implementing the integration mode, refer to the foregoing embodiment 1. A difference lies only in that each valve component in embodiment 3 may further include a new three-way valve 42, and that each exchanger component in embodiment 3 may further include a high pressure pipe and a low pressure pipe that are coaxial. FIG. 11 is a schematic diagram illustrating an assembly according to embodiment 3 of this application. In this solution, it is assumed that a gas-liquid separator is used as a liquid storage apparatus. As shown in FIG. 11, in this manner, all exchanger components and all valve components in the thermal management system may be integrated in a same component assembly simultaneously. Each exchanger component may include one or more of the water-cooled condenser, the battery chiller, the water heater, the compressor, and the gas-liquid separator. Each valve component may include one or more of the five-way valve, the four-way valve, the three-way valve 41, the three-way valve 42, the water pump 30, the water pump 31, the water pump 32, the tank 35, and the tank 36. The solution illustrated in FIG. 11 integrates all the exchanger components and all the valve components, so that the structure is more compact and that less space is occupied.

Still based on the modes shown in embodiment 1, the following uses examples to describe some modes that can be implemented by the thermal management system in embodiment 3 of this application. It should be understood that a control end of each valve component, a control end of each water pump, and an output end of each temperature-pressure sensor in the thermal management system may be further connected to a controller. The controller can not only implement different temperature modes by controlling each valve component and each water pump, but also obtain the temperature and pressure at each key position from the output end of each temperature-pressure sensor in the control process, further determine whether the current temperature and pressure meet requirements of the current temperature mode, and if the current temperature and pressure do not meet the requirements, may perform a real-time adjustment, to adjust the temperature and pressure based on the current temperature mode.

M10: Mode of Refrigerating the Passenger Compartment and the Battery Simultaneously.

Figure 12A:
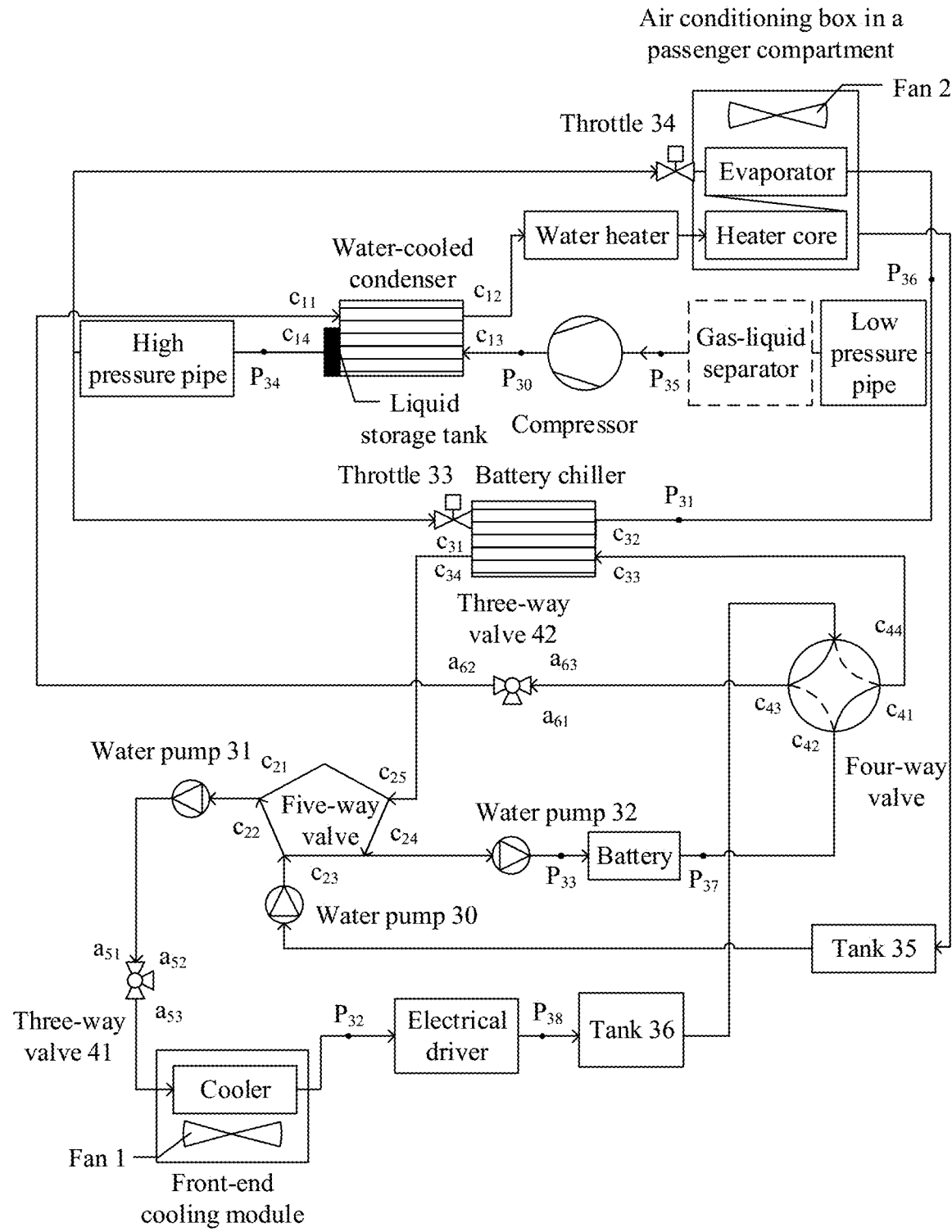
FIG. 12A is a schematic diagram illustrating a connection relationship of a thermal management system in a mode of refrigerating a passenger compartment and a battery simultaneously.

FIG. 12A is a schematic diagram illustrating a connection relationship of a thermal management system in a mode of refrigerating a passenger compartment and a battery simultaneously. As shown in FIG. 12A, in the M10 mode, the controller may connect the second end $c_{62}$ of the three-way valve 42 and the third end $c_{63}$ of the three-way valve, connect the second end $c_{22}$ of the five-way valve and the third end $c_{23}$ of the five-way valve, connect the fourth end $c_{24}$ of the five-way valve and the fifth end $c_{25}$ of the five-way valve, connect the first end $c_{41}$ of the four-way valve and the second end $c_{42}$ of the four-way valve, connect the third end $c_{43}$ of the four-way valve and the fourth end $c_{44}$ of the four-way valve, connect the first end $c_{51}$ of the three-way valve 41 and the third end $c_{53}$ of the three-way valve 41, open the throttle 33 and the throttle 34, turn off the heater core, and start the water pump 30, the water pump 31, and the water pump 32. In this case, high-temperature and high-pressure refrigerant gas output by the compressor passes through the second heat exchange pipe for heat exchange between the second heat exchange pipe and the first heat exchange pipe for the first time (the coolant driven by the water pump 30 flows into the first heat exchange pipe through the five-way valve, the water pump 31, the three-way valve 41, the cooler, the electrical driver, the four-way valve, and the three-way valve 42 in sequence) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. One branch of the lower-temperature and lower-pressure refrigerant liquid is transmitted to the evaporator to cool the passenger compartment. In this case, the air conditioner in the passenger compartment is set to a full refrigeration mode (the full refrigeration mode is one of refrigeration modes, and is a mode of refrigerating the passenger compartment and the battery simultaneously). The other branch of the lower-temperature and lower-pressure refrigerant liquid passes through the third heat exchange pipe, exchanges heat in the third heat exchange pipe with the coolant in the fourth heat exchange pipe (the coolant driven by the water pump 32 flows into the fourth heat exchange pipe through the battery and the four-way valve in sequence), and then flows back to the compressor through the low pressure pipe. The low-temperature and low-pressure coolant obtained through heat exchange by the fourth heat exchange pipe flows back to the water pump 32 through the five-way valve, thereby cooling the battery. The coolant driven by the water pump 30 passes through the front-end cooling module for cooling, first cools the electrical driver, and then enters the first heat exchange pipe for heat exchange to obtain a high-temperature coolant. Although the high-temperature coolant flows through the heater core, because the heater core is not started, the high-temperature coolant flows through the air conditioner box only as a bypass, and does not affect a temperature of an operator cabin.

According to the foregoing manner, before entering the evaporator and the third heat exchange pipe, the high pressure pipe first exchanges heat with the coaxial low pressure pipe. Heat exchange may be implemented between a low-temperature refrigerant in an inner pipe and a high-temperature refrigerant in an outer pipe, where the high pressure pipe is the outer pipe and the low pressure pipe is the inner pipe. Therefore, during heat exchange, the outer high pressure pipe can exchange heat to obtain a low-temperature and low-pressure refrigerant, and the inner low pressure pipe can exchange heat to obtain a high-temperature and high-pressure refrigerant. After the heat exchange, the high pressure pipe has a lower temperature. Therefore, the temperature of the refrigerant flowing into the evaporator and the third heat exchange pipe can be further reduced, and this helps improve a refrigeration effect of the passenger compartment and a refrigeration effect of the battery.

M11: Mode of Refrigerating Only the Passenger Compartment

Figure 12B:
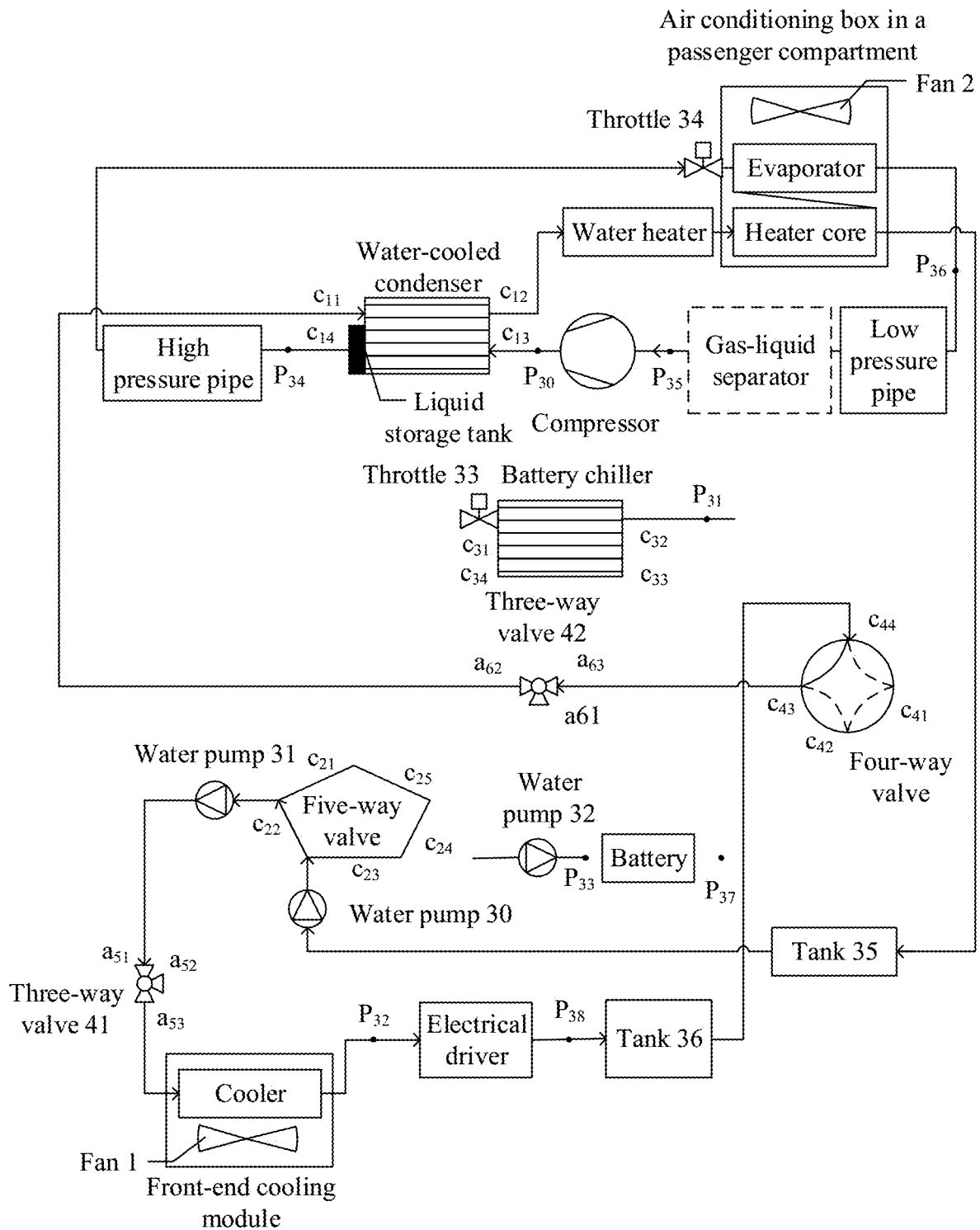
FIG. 12B is a schematic diagram illustrating a connection relationship of a thermal management system in a mode of refrigerating only a passenger compartment.

FIG. 12B is a schematic diagram illustrating a connection relationship of a thermal management system in a mode of refrigerating only a passenger compartment. As shown in FIG. 12B, in the M11 mode, the controller may connect the second end $c_{62}$ of the three-way valve 42 and the third end $c_{63}$ of the three-way valve, connect the second end $c_{22}$ of the five-way valve and the third end $c_{23}$ of the five-way valve, connect the third end $c_{43}$ of the four-way valve and the fourth end $c_{44}$ of the four-way valve, connect the first end $c_{51}$ of the three-way valve 41 and the third end $c_{53}$ of the three-way valve 41, open the throttle 34, close the throttle 33 (so that the battery chiller does not work), turn off the heater core, and start the water pump 30 and the water pump 31. In this case, high-temperature and high-pressure refrigerant gas output by the compressor passes through the second heat exchange pipe for heat exchange between the second heat exchange pipe and the first heat exchange pipe for the first time (the coolant driven by the water pump 30 flows into the first heat exchange pipe through the five-way valve, the water pump 31, the three-way valve 41, the cooler, the electrical driver, the four-way valve, and the three-way valve 42 in sequence) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid is transmitted to the evaporator to cool the passenger compartment, and then flows back to the compressor through the low pressure pipe. In this case, the air conditioner in the passenger compartment is set to a refrigeration mode. The coolant driven by the water pump 30 passes through the front-end cooling module for cooling, first cools the electrical driver, and then enters the first heat exchange pipe for heat exchange to obtain a high-temperature coolant. Although the high-temperature coolant flows through the heater core, because the heater core is not started, the high-temperature coolant flows through the air conditioner box only as a bypass, and does not affect a temperature of an operator cabin.

According to the foregoing manner, before entering the evaporator, the low-temperature and low-pressure refrigerant output by the second heat exchange pipe may further undergo heat exchange between the coaxial high pressure pipe and low pressure pipe to obtain a lower-temperature refrigerant. This can further reduce the temperature of the refrigerant flowing into the evaporator, and help improve a refrigeration effect of the passenger compartment.

M12: Mode of Refrigerating Only the Battery.

Figure 12C:
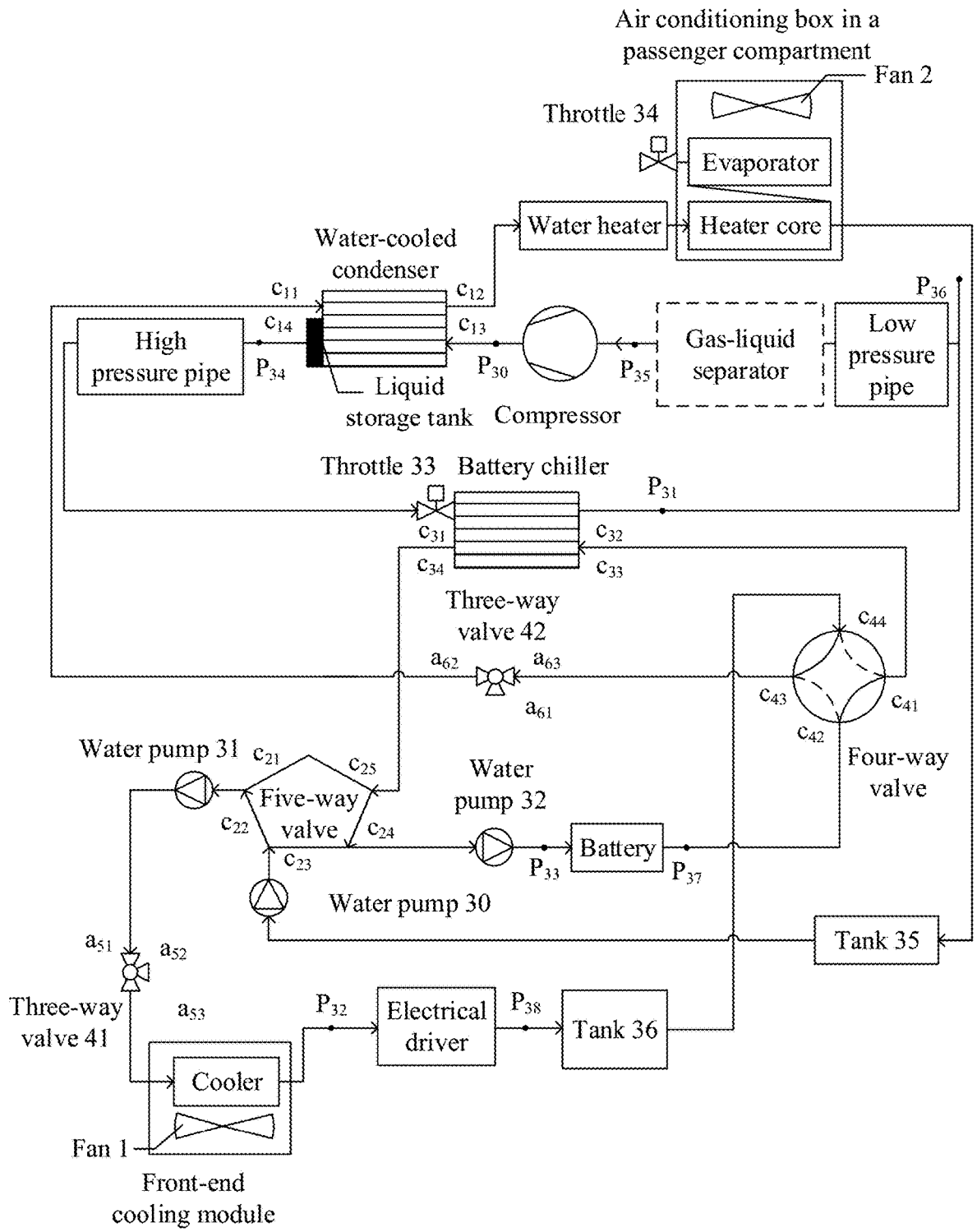
FIG. 12C is a schematic diagram illustrating a connection relationship of a thermal management system in a mode of refrigerating only a battery.

FIG. 12C is a schematic diagram illustrating a connection relationship of a thermal management system in a mode of refrigerating only a battery. As shown in FIG. 12C, in the M12 mode, the controller may connect the second end $c_{62}$ of the three-way valve 42 and the third end $c_{63}$ of the three-way valve, connect the second end $c_{22}$ of the five-way valve and the third end $c_{23}$ of the five-way valve, connect the fourth end $c_{24}$ of the five-way valve and the fifth end $c_{25}$ of the five-way valve, connect the first end $c_{41}$ of the four-way valve and the second end $c_{42}$ of the four-way valve, connect the third end $c_{43}$ of the four-way valve and the fourth end $c_{44}$ of the four-way valve, connect the first end $c_{51}$ of the three-way valve 41 and the third end $c_{53}$ of the three-way valve 41, open the throttle 33, close the throttle 34 (so that the evaporator does not work), turn off the heater core, and start the water pump 30, the water pump 31, and the water pump 32. In this case, high-temperature and high-pressure refrigerant gas output by the compressor passes through the second heat exchange pipe for heat exchange between the second heat exchange pipe and the first heat exchange pipe for the first time (the coolant driven by the water pump 30 flows into the first heat exchange pipe through the five-way valve, the water pump 31, the three-way valve 41, the cooler, the electrical driver, the four-way valve, and the three-way valve 42 in sequence) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid exchanges heat in the third heat exchange pipe with the coolant in the fourth heat exchange pipe (the coolant driven by the water pump 32 flows into the fourth heat exchange pipe through the battery and the four-way valve in sequence) and then flows back to the compressor through the low pressure pipe. The low-temperature and low-pressure coolant obtained through heat exchange by the fourth heat exchange pipe flows back to the water pump 32 through the five-way valve, thereby cooling the battery. The coolant driven by the water pump 30 passes through the front-end cooling module for cooling, first cools the electrical driver, and then enters the first heat exchange pipe for heat exchange to obtain a high-temperature coolant. Although the high-temperature coolant flows through the heater core, because the heater core is not started, the high-temperature coolant flows through the air conditioner box only as a bypass, and does not affect a temperature of an operator cabin.

According to the foregoing manner, before entering the battery chiller, the low-temperature and low-pressure refrigerant output by the second heat exchange pipe may further undergo heat exchange between the coaxial high pressure pipe and low pressure pipe to obtain a lower-temperature refrigerant. This can further reduce the temperature of the refrigerant flowing into the battery chiller, improve a capability of refrigerating the coolant in the fourth heat exchange pipe by the battery chiller, and help improve a refrigeration effect of the battery.

M13: Mode of Refrigerating the Battery but Heating the Passenger Compartment.

Figure 12D:
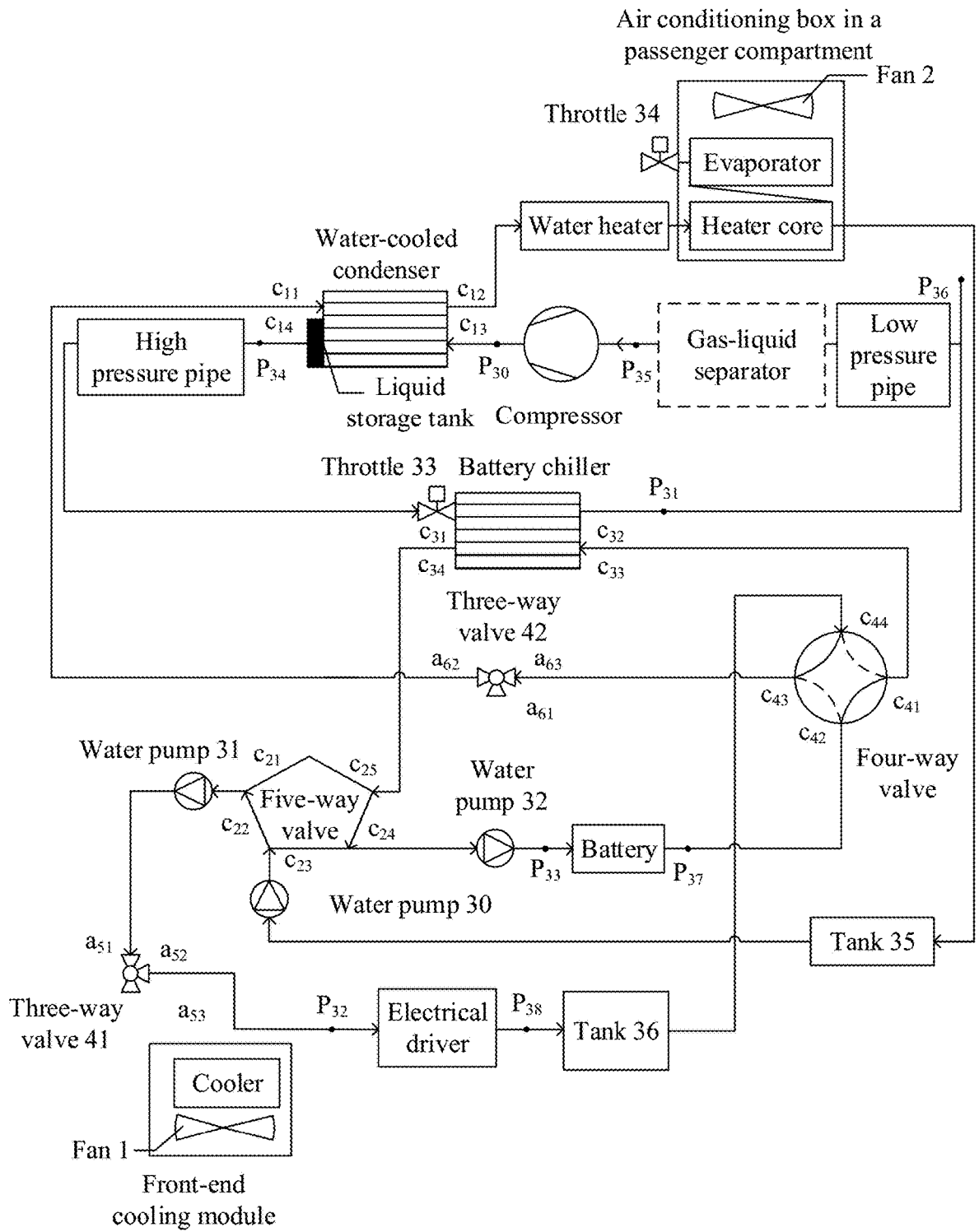
FIG. 12D is a schematic diagram illustrating a connection relationship of a thermal management system in a mode of refrigerating a battery but heating a passenger compartment.

FIG. 12D is a schematic diagram illustrating a connection relationship of a thermal management system in a mode of refrigerating a battery but heating a passenger compartment. As shown in FIG. 12D, in the M13 mode, the controller may connect the second end $c_{62}$ of the three-way valve 42 and the third end $c_{63}$ of the three-way valve, connect the second end $c_{22}$ of the five-way valve and the third end $c_{23}$ of the five-way valve, connect the fourth end $c_{24}$ of the five-way valve and the fifth end $c_{25}$ of the five-way valve, connect the first end $c_{41}$ of the four-way valve and the second end $c_{42}$ of the four-way valve, connect the third end $c_{43}$ of the four-way valve and the fourth end $c_{44}$ of the four-way valve, connect the first end $c_{51}$ of the three-way valve 41 and the second end $c_{52}$ of the three-way valve 41, open the throttle 33, close the throttle 34 (so that the evaporator does not work), turn on the water heater, and start the water pump 30, the water pump 31, and the water pump 32. In this case, high-temperature and high-pressure refrigerant gas output by the compressor exchanges heat in the second heat exchange pipe with the first heat exchange pipe for the first time (the coolant driven by the water pump 30 flows into the first heat exchange pipe through the five-way valve, the water pump 31, the three-way valve 41, the electrical driver, the four-way valve, and the three-way valve 42 in sequence) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid exchanges heat in the third heat exchange pipe with the coolant in the fourth heat exchange pipe (the coolant driven by the water pump 32 flows into the fourth heat exchange pipe through the battery and the four-way valve in sequence) and then flows back to the compressor through the low pressure pipe. The high-temperature coolant obtained through heat exchange by the first heat exchange pipe is first input into the heater core after being heated by the water heater, and the air conditioner in the passenger compartment starts the heating mode. Therefore, the air conditioner in the passenger compartment first heats the ambient air by using the heater core and then blows the ambient air into the passenger compartment to heat the passenger compartment. The controller may further control the heating effect of the passenger compartment by controlling power of the water heater. The low-temperature and low-pressure coolant obtained through heat exchange by the fourth heat exchange pipe flows back to the water pump 32 through the five-way valve, thereby cooling the battery. In this manner, before the low-temperature and low-pressure refrigerant output by the second heat exchange pipe is input into the battery chiller, the low-temperature and low-pressure refrigerant further undergoes heat exchange between the high pressure pipe and the low pressure pipe to obtain a lower-temperature refrigerant. This further reduces the temperature of the refrigerant flowing into the battery chiller, improves a capability of refrigerating the coolant in the fourth heat exchange pipe by the battery chiller, and helps improve a refrigeration effect of the battery.

In this solution, when the electrical driver needs to be cooled, the controller may further connect the first end $a_{51}$ of the three-way valve 41 and the third end $a_{53}$ of the three-way valve 41, so that the coolant driven by the water pump 30 first flows through the front-end cooling module for cooling and then flows into the electrical driver to cool the electrical driver. When the electrical driver does not need to be cooled, the controller may connect the first end $a_{51}$ of the three-way valve 41 and the second end $a_{52}$ of the three-way valve 41, so that the coolant driven by the water pump 30 directly flows into the electrical driver. If it is found that the cooling effect of the electrical driver is not suitable after data of the temperature-pressure sensor $P_{32}$ is obtained, the first end $a_{51}$ of the three-way valve 41 may be separately connected to the third end $a_{53}$ of the three-way valve 41 and the second end $a_{52}$ of the three-way valve 41, and the cooling effect is controlled by adjusting a proportion of coolant fluxes on the two branches.

M15: Mode of Naturally Cooling a Motor.

Figure 12E:
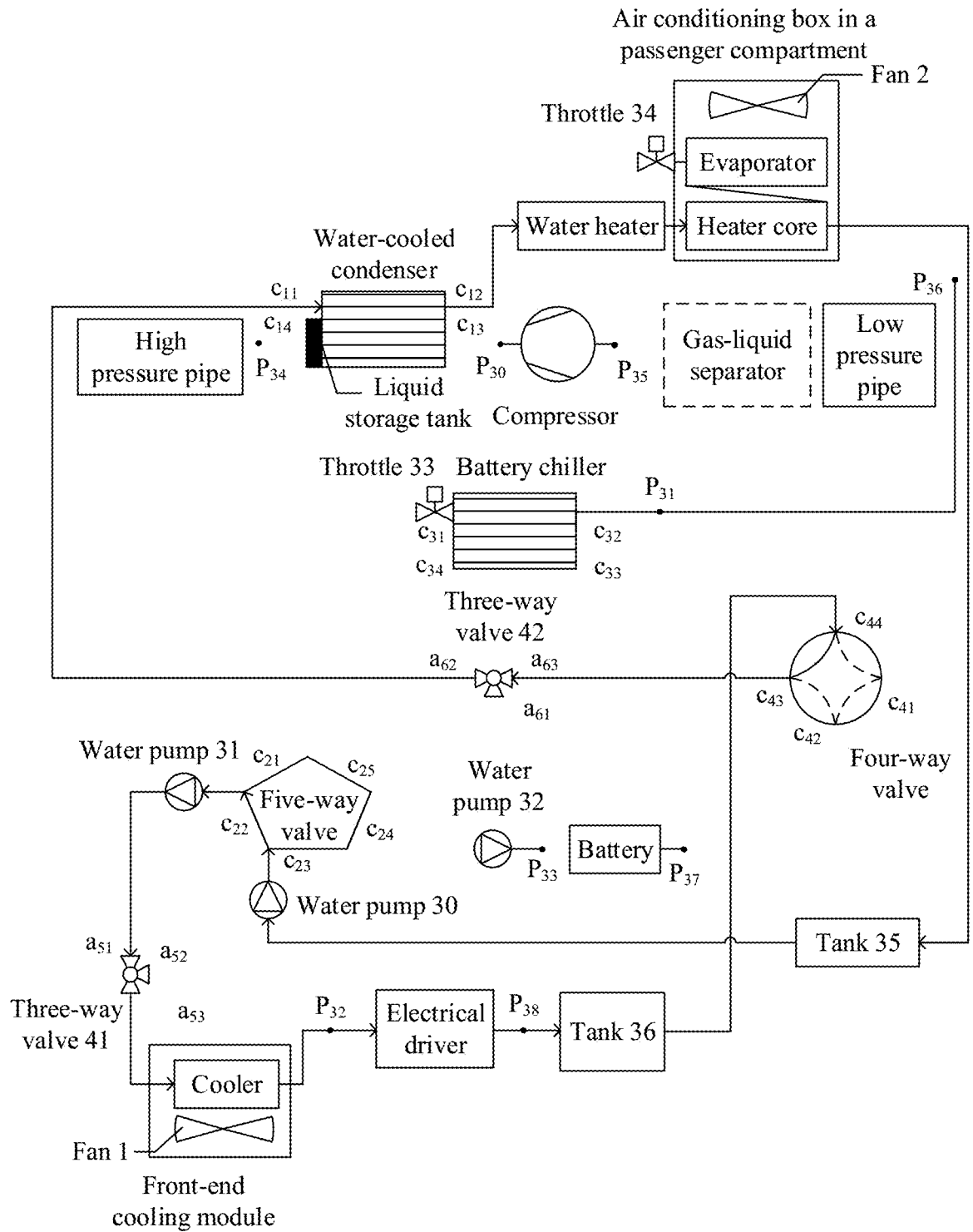
FIG. 12E is a schematic diagram illustrating a connection relationship of a thermal management system in a mode of naturally cooling a motor.

FIG. 12E is a schematic diagram illustrating a connection relationship of a thermal management system in a mode of naturally cooling a motor. As shown in FIG. 12E, in the M14 mode, the controller may connect the second end $c_{62}$ of the three-way valve 42 and the third end $c_{63}$ of the three-way valve, connect the second end $c_{22}$ of the five-way valve and the third end $c_{23}$ of the five-way valve, connect the third end $c_{43}$ of the four-way valve and the fourth end $c_{44}$ of the four-way valve, connect the first end $c_{51}$ of the three-way valve 41 and the third end $c_{53}$ of the three-way valve 41, close the throttle 33 and the throttle 34 (so that the evaporator and the battery chiller do not work), turn off the water heater, and start the water pump 30 and the water pump 31. In this case, the coolant driven by the water pump 30 flows back to the water pump 30 through the five-way valve, the water pump 31, the three-way valve 41, the cooler, the electrical driver, the four-way valve, the three-way valve 42, the first heat exchange pipe, and the heater core in sequence. Therefore, after being cooled by the front-end cooling module, the coolant in the loop naturally cools the electrical driver.

M16: Mode of Heating the Passenger Compartment and the Battery Simultaneously.

Figure 12F:
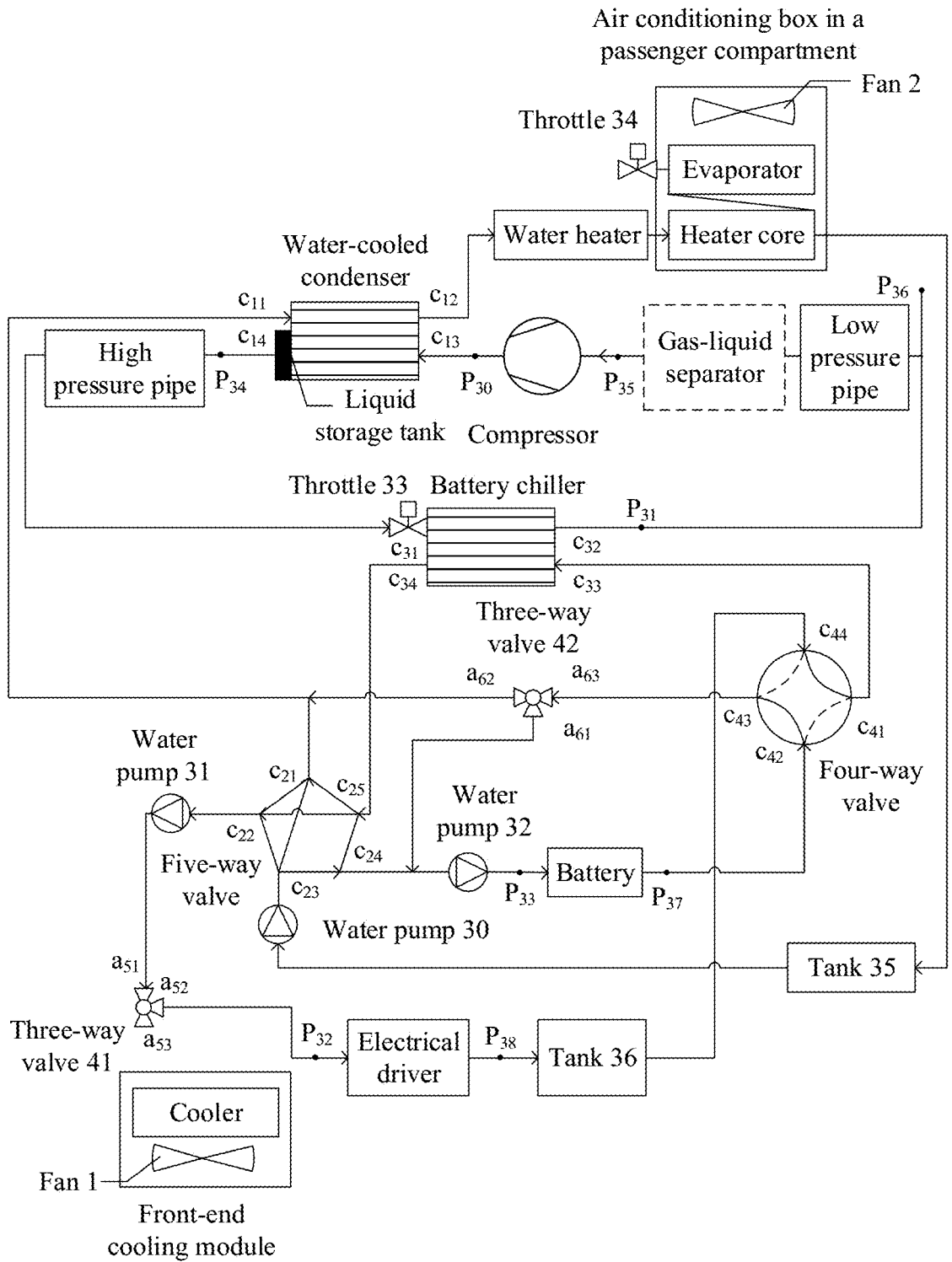
FIG. 12F is a schematic diagram illustrating a connection relationship of a thermal management system in a mode of heating a passenger compartment and a battery simultaneously.

FIG. 12F is a schematic diagram illustrating a connection relationship of a thermal management system in a mode of heating a passenger compartment and a battery simultaneously. As shown in FIG. 12F, in the M16 mode, the controller may connect the third end $c_{62}$ of the three-way valve 42 and the first end $c_{61}$ of the three-way valve, connect the third end $c_{62}$ of the three-way valve 42 and the second end $c_{62}$ of the three-way valve, connect the third end $c_{23}$ of the five-way valve and the first end $c_{21}$ of the five-way valve, connect the third end $c_{23}$ of the five-way valve and the fourth end $c_{24}$ of the five-way valve, connect the second end $c_{22}$ of the five-way valve and the fifth end $c_{25}$ of the five-way valve, connect the first end $c_{41}$ of the four-way valve and the fourth end $c_{44}$ of the four-way valve, connect the second end $c_{42}$ of the four-way valve and the third end $c_{43}$ of the four-way valve, connect the first end $c_{51}$ of the three-way valve 41 and the second end $c_{52}$ of the three-way valve 41, open the throttle 33, close the throttle 34, turn on the water heater, and start the water pump 30, the water pump 31, and the water pump 32. In this case, high-temperature and high-pressure refrigerant gas output by the compressor passes through the second heat exchange pipe for heat exchange between the second heat exchange pipe and the first heat exchange pipe (one part of the coolant driven by the water pump 30 directly flows into the first heat exchange pipe, and the other part passes through the water pump 32, the battery, the four-way valve, and the three-way valve 42, and then flows into the fourth heat exchange pipe) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid exchanges heat in the third heat exchange pipe with the coolant in the fourth heat exchange pipe (the coolant driven by the water pump 31 flows into the fourth heat exchange pipe through the three-way valve 41, the electrical driver, and the four-way valve in sequence) and then flows back to the compressor through the low pressure pipe. The high-temperature coolant obtained through heat exchange by the first heat exchange pipe is first input into the heater core after being heated by the water heater, and then flows back to the water pump 30. The air conditioner in the passenger compartment starts a full heating mode (the full heating mode is one of heating modes, and is a mode of heating the passenger compartment and the battery simultaneously). Therefore, the air conditioner in the passenger compartment first heats the ambient air by using the heater core and then blows the ambient air into the passenger compartment to heat the passenger compartment. The controller may further control the heating effect of the passenger compartment by controlling power of the water heater. Then the water pump 30 drives the coolant to circulate through the battery, thereby further heating the battery. The low-temperature and low-pressure coolant obtained through heat exchange by the fourth heat exchange pipe flows back to the water pump 31, and then flows through the electrical driver to cool the electrical driver in the circulation process. In this manner, before the low-temperature and low-pressure refrigerant output by the second heat exchange pipe is input into the battery chiller, the low-temperature and low-pressure refrigerant further undergoes heat exchange between the high pressure pipe and the low pressure pipe to obtain a lower-temperature refrigerant. This further reduces the temperature of the refrigerant flowing into the battery chiller, improves a capability of refrigerating the coolant in the fourth heat exchange pipe by the battery chiller, and helps improve a refrigeration effect of the electrical driver.

In the foregoing connection relationship, a passenger compartment heating loop and a battery heating loop actually belong to two connected circulation loops respectively. The coolant in the passenger compartment heating loop is driven by the water pump 30, and then flows back to the water pump 30 through the third end $c_{23}$ of the five-way valve, the first end $c_{21}$ of the five-way valve, the first heat exchange pipe, the water heater, and the heater core in sequence, to implement heat circulation in the passenger compartment. The coolant in the battery heating loop is driven by the water pump 32, and then flows back to the water pump 32 through the battery, the second end $c_{42}$ of the four-way valve, the third end $c_{43}$ of the four-way valve, the third end $c_{63}$ of the three-way valve 42, and the first end $c_{61}$ of the three-way valve 42 in sequence, to implement heat circulation for the battery. The two heating loops further converge at the fourth end $c_{24}$ of the five-way valve and the fifth end $c_{25}$ of the five-way valve to complete heat exchange. For example, the battery heating loop can obtain a part of the high-temperature coolant in the passenger compartment heating loop from the fourth end $c_{24}$ of the five-way valve to heat the battery, and can release, at the fifth end $c_{25}$ of the five-way valve, a part of the low-temperature coolant in the battery heating loop to the passenger compartment heating loop to implement circulation of the battery heating loop. In this case, the controller may further control fluxes of the coolants flowing into the battery heating loop and the passenger compartment heating loop respectively at the fourth end $c_{24}$ of the five-way valve, to achieve different heating effects of the battery and the passenger compartment, so that both the temperature of the battery and the temperature of the passenger compartment can be within an appropriate temperature range.

In comparison with embodiment 1, in the solution in embodiment 3, a three-way valve 42 is added to the thermal management system, and the new three-way valve 42 can be used to heat the battery and the passenger compartment respectively in two different subloops when there is a requirement for simultaneously heating the battery and the passenger compartment, instead of heating the battery and the passenger compartment simultaneously in a large loop. In this way, the heating temperature of the battery and the heating temperature of the passenger compartment can be separately controlled by the controller, flexibility of heating is better or improved, and the solution can be applied to more scenarios.

M18: Mode of Heating Only the Passenger Compartment.

Figure 12G:
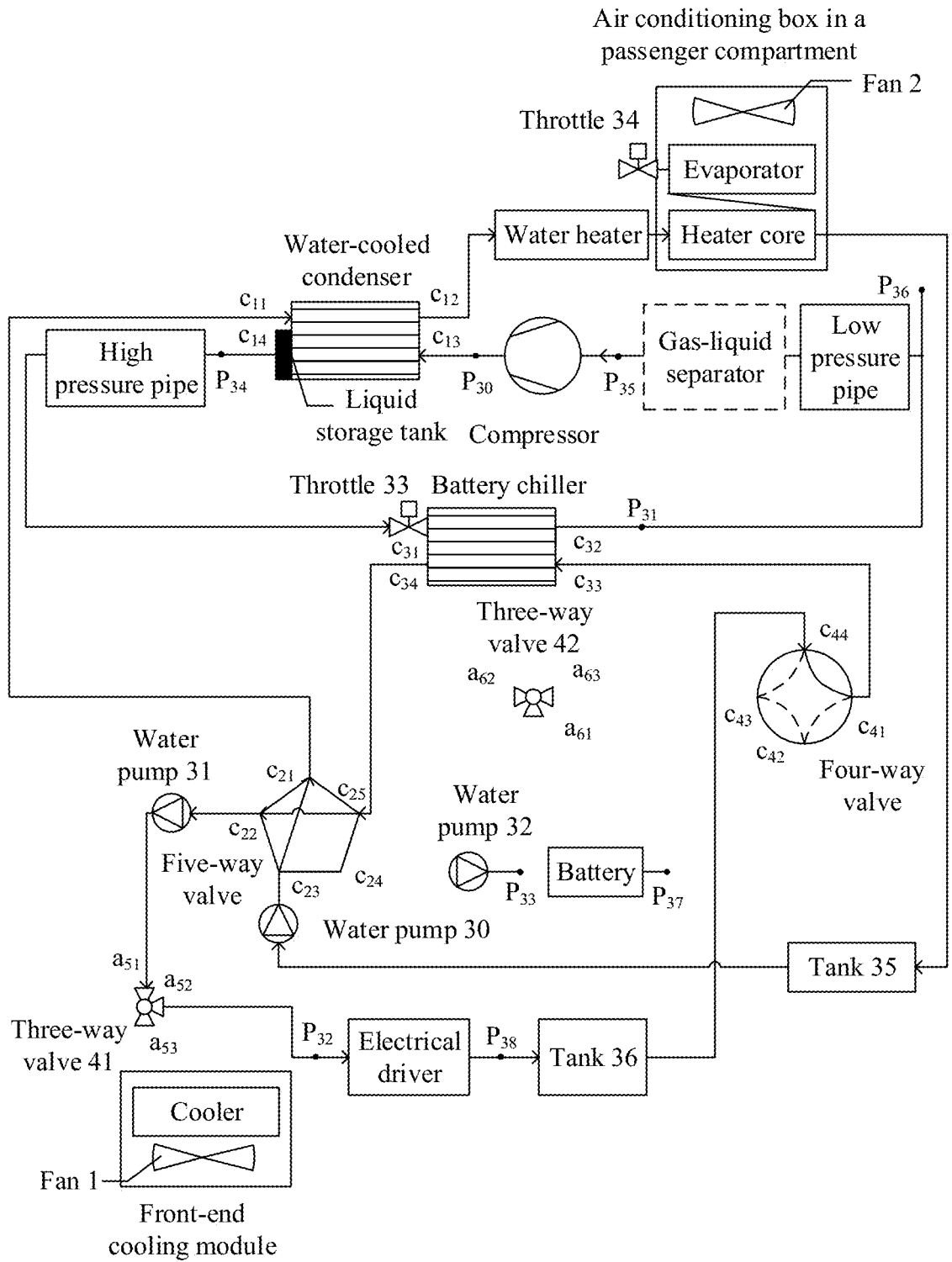
FIG. 12G is a schematic diagram illustrating a connection relationship of a thermal management system in a mode of heating only a passenger compartment.

FIG. 12G is a schematic diagram illustrating a connection relationship of a thermal management system in a mode of heating only a passenger compartment. As shown in FIG. 12G, in the M18 mode, the controller may connect the first end $c_{21}$ of the five-way valve and the third end $c_{23}$ of the five-way valve, connect the second end $c_{22}$ of the five-way valve and the fifth end $c_{25}$ of the five-way valve, connect the first end $c_{41}$ of the four-way valve and the fourth end $c_{44}$ of the four-way valve, connect the first end $c_{51}$ of the three-way valve 41 and the second end $c_{52}$ of the three-way valve 41, open the throttle 33, close the throttle 34 (so that the evaporator does not work), turn on the water heater, and start the water pump 30 and the water pump 31. In this case, high-temperature and high-pressure refrigerant gas output by the compressor passes through the second heat exchange pipe for heat exchange between the second heat exchange pipe and the first heat exchange pipe (the coolant driven by the water pump 30 flows into the first heat exchange pipe) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid exchanges heat in the third heat exchange pipe with the coolant in the fourth heat exchange pipe (the coolant driven by the water pump 31 flows into the fourth heat exchange pipe through the three-way valve 41, the electrical driver, and the four-way valve in sequence) and then flows back to the compressor through the low pressure pipe. The high-temperature coolant obtained through heat exchange by the first heat exchange pipe is first input into the heater core after being heated by the water heater, and then flows back to the water pump 30. The air conditioner in the passenger compartment starts the heating mode. Therefore, the air conditioner in the passenger compartment first heats the ambient air by using the heater core and then blows the ambient air into the passenger compartment to heat the passenger compartment. The controller may further control the heating effect of the passenger compartment by controlling power of the water heater. The low-temperature coolant output by the fourth heat exchange pipe flows back to the water pump 30, and the water pump 30 drives the low-temperature coolant to circulate to cool the electrical driver. In this manner, before the low-temperature and low-pressure refrigerant output by the second heat exchange pipe is input into the battery chiller for heat exchange in the fourth heat exchange pipe, the low-temperature and low-pressure refrigerant further undergoes heat exchange between the coaxial high pressure pipe and low pressure pipe to obtain a lower-temperature refrigerant. This can further reduce the temperature of the refrigerant flowing into the battery chiller, improve a capability of refrigerating the coolant in the fourth heat exchange pipe, and help improve a refrigeration effect of the electrical driver.

M19: Mode of Heating Only the Battery.

Figure 12H:
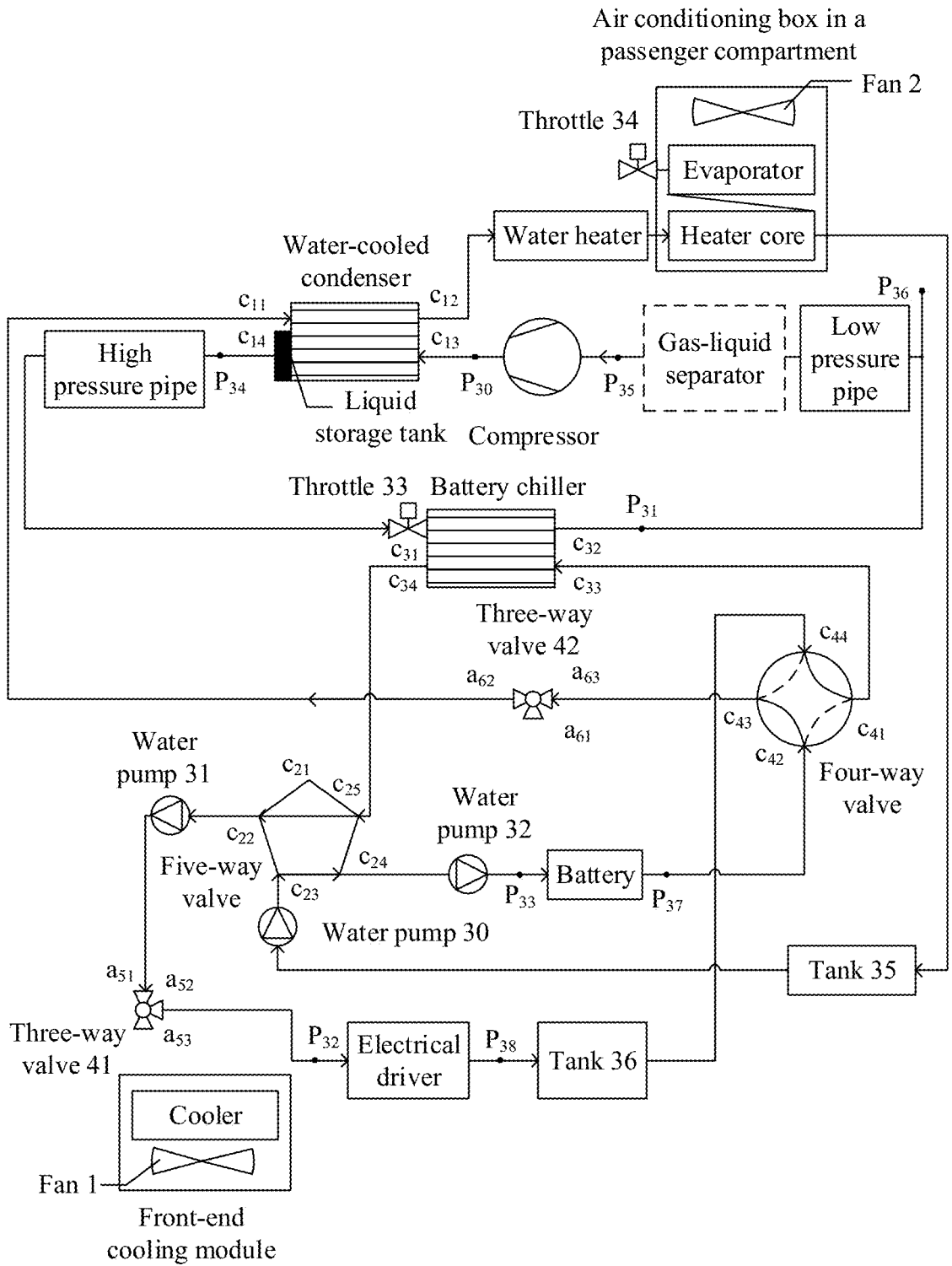
FIG. 12H is a schematic diagram illustrating a connection relationship of a thermal management system in a mode of heating only a battery.

FIG. 12H is a schematic diagram illustrating a connection relationship of a thermal management system in a mode of heating only a battery. As shown in FIG. 12H, in the M19 mode, the controller may connect the second end $c_{62}$ of the three-way valve and the third end $c_{63}$ of the three-way valve 42, connect the second end $c_{22}$ of the five-way valve and the fifth end $c_{25}$ of the five-way valve, connect the third end $c_{23}$ of the five-way valve and the fourth end $c_{24}$ of the five-way valve, connect the first end $c_{41}$ of the four-way valve and the fourth end $c_{44}$ of the four-way valve, connect the second end $c_{42}$ of the four-way valve and the third end $c_{43}$ of the four-way valve, connect the first end $c_{51}$ of the three-way valve 41 and the second end $c_{52}$ of the three-way valve 41, open the throttle 33, close the throttle 34 (so that the evaporator does not work), turn on the water heater, and start the water pump 30, the water pump 31, and the water pump 32. In this case, high-temperature and high-pressure refrigerant gas output by the compressor passes through the second heat exchange pipe for heat exchange between the second heat exchange pipe and the first heat exchange pipe (the coolant driven by the water pump 30 flows into the fourth heat exchange pipe through the five-way valve, the water pump 32, the battery, the four-way valve, and the three-way valve 42 in sequence) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid exchanges heat in the third heat exchange pipe with the coolant in the fourth heat exchange pipe (the coolant driven by the water pump 31 flows into the fourth heat exchange pipe through the three-way valve 41, the electrical driver, and the four-way valve in sequence) and then flows back to the compressor through the low pressure pipe. The high-temperature coolant obtained through heat exchange by the first heat exchange pipe is first input into the heater core after being heated by the water heater, and then flows back to the water pump 30. The air conditioner in the passenger compartment starts a non-heating and non-refrigeration mode. Therefore, the coolant flowing through the heater core is not used to heat the passenger compartment, but flows through the heater core as a bypass and then flows back to the water pump 30. In this way, the water pump 30 can drive the heated coolant to circulate through the battery to heat the battery. The controller may further control the heating effect of the battery by controlling power of the water heater. The low-temperature and low-pressure coolant obtained through heat exchange by the fourth heat exchange pipe flows back to the water pump 31, and then flows through the electrical driver to cool the electrical driver in the circulation process. In this manner, before the low-temperature and low-pressure refrigerant output by the second heat exchange pipe is input into the battery chiller, the low-temperature and low-pressure refrigerant further undergoes heat exchange between the high pressure pipe and the low pressure pipe to obtain a lower-temperature refrigerant. This further reduces the temperature of the refrigerant flowing into the battery chiller, improves a capability of refrigerating the coolant in the fourth heat exchange pipe by the battery chiller, and helps improve a refrigeration effect of the electrical driver.

M21: Mode of Dehumidifying the Passenger Compartment.

Figure 12I:
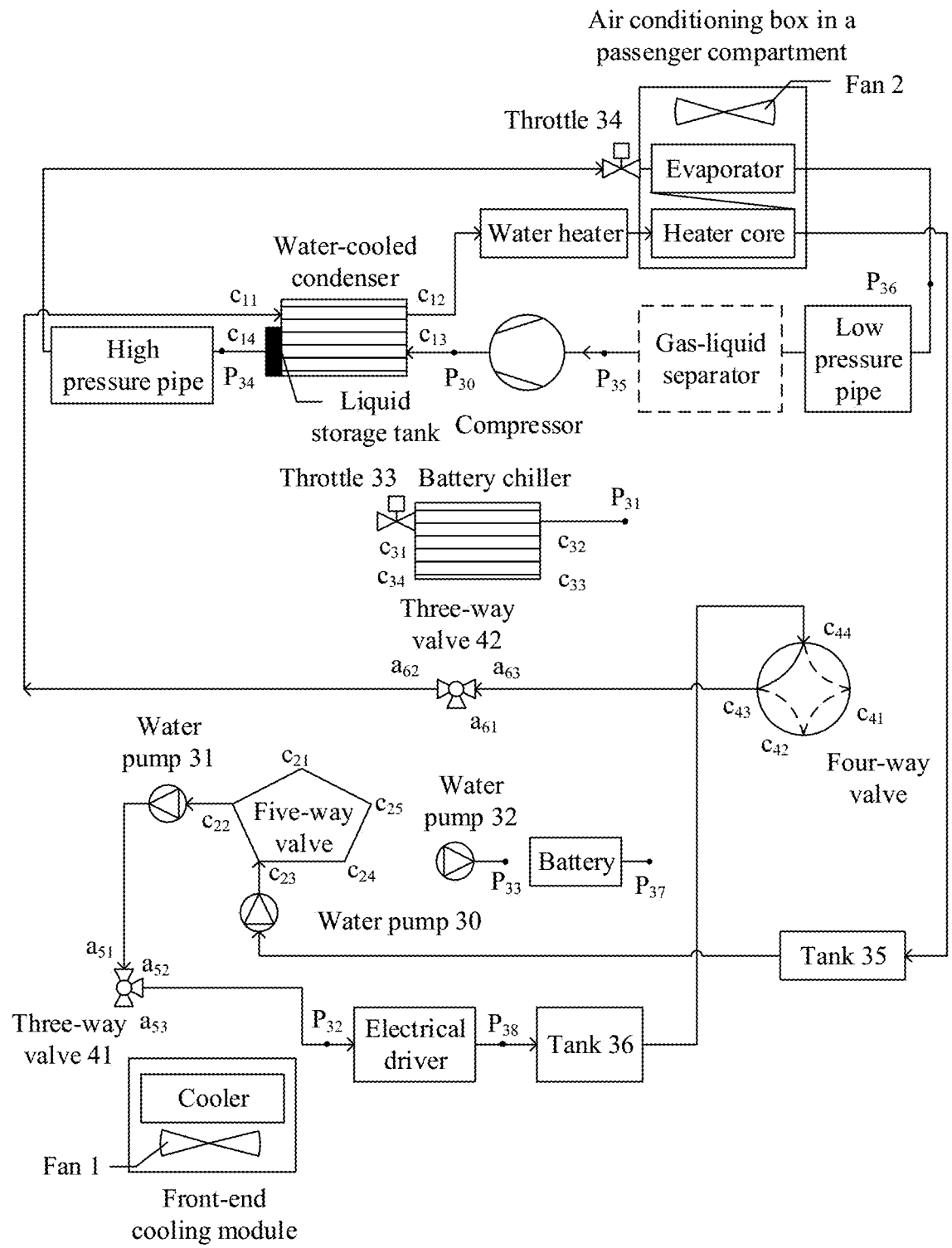
FIG. 12I is a schematic diagram illustrating a connection relationship of a thermal management system in a mode of dehumidifying a passenger compartment.

FIG. 12I is a schematic diagram illustrating a connection relationship of a thermal management system in a mode of dehumidifying a passenger compartment. As shown in FIG. 12I, in the M21 mode, the controller may connect the second end $c_{62}$ of the three-way valve 42 and the third end $c_{63}$ of the three-way valve 42, connect the second end $c_{22}$ of the five-way valve and the third end $c_{23}$ of the five-way valve, connect the third end $c_{43}$ of the four-way valve and the second end $c_{42}$ of the four-way valve, connect the first end $c_{51}$ of the three-way valve 41 and the second end $c_{52}$ of the three-way valve 41, open the throttle 34, close the throttle 33 (so that the battery chiller does not work), turn on the water heater, and start the water pump 30 and the water pump 31. In this case, high-temperature and high-pressure refrigerant gas output by the compressor passes through the second heat exchange pipe for heat exchange between the second heat exchange pipe and the first heat exchange pipe (the coolant driven by the water pump 30 flows into the fourth heat exchange pipe through the five-way valve, the water pump 31, the three-way valve 41, the electrical driver, the four-way valve, and the three-way valve 42 in sequence) to obtain low-temperature and low-pressure refrigerant liquid. The low-temperature and low-pressure refrigerant liquid further enters the high pressure pipe for heat exchange with the coaxial low pressure pipe for the second time to obtain lower-temperature and lower-pressure refrigerant liquid. The lower-temperature and lower-pressure refrigerant liquid flows into the evaporator for cooling, and then flows back to the compressor through the low pressure pipe. The high-temperature coolant obtained through heat exchange by the first heat exchange pipe is first input into the heater core after being heated by the water heater, and then flows back to the water pump 30. The air conditioner in the passenger compartment starts the dehumidification mode. The air conditioner in the passenger compartment first uses the evaporator to cool and dehumidify the ambient air, then heats the dehumidified air by using the heater core, and finally blows the dry warm air into the passenger compartment. In addition, the coolant in the coolant loop also flows through the electrical driver, and a temperature of the electrical driver needs to be controlled below 50° C. Therefore, when the temperature of the coolant in the coolant loop is not higher than 50° C., the temperature is sufficient to cool the electrical driver. Therefore, the controller can directly connect the first end $c_{51}$ of the three-way valve 41 and the second end $c_{52}$ of the three-way valve 41 as illustrated in FIG. 12I. When the temperature is higher than 50° C., the temperature is not sufficient to cool the electrical driver. In this case, the controller may further connect the first end $c_{51}$ of the three-way valve 41 and the third end $c_{52}$ of the three-way valve 41, so that the coolant in the coolant loop is first cooled by the front-end cooling module and then flows through the electrical driver to cool the electrical driver. Certainly, whether to connect two channels of coolants simultaneously or only connect a branch cooled by the front-end cooling module to cool the electrical driver may be set by the user based on an actual requirement.

The foregoing describes only several modes that can be implemented by the thermal management system in embodiment 3 of this application as examples. It should be understood that in embodiment 3, the thermal management system may further implement other modes in addition to the foregoing several modes, for example, a mode of refrigerating only the motor, a mode of heating only the motor, a mode of dehumidifying the entire vehicle, or a mode of heating the battery and dehumidifying the entire vehicle. In addition, a same mode may be actually further implemented by using various different loops, and the mode is not limited to those described above. Details are not described herein in this application.

In this embodiment of this application, the three-way valve 42 added in embodiment 3 may also be combined with the four-way valve to form a new five-way valve, and five ports of the new five-way valve are respectively used to implement port functions of the four-way valve and the three-way valve 42, to further simplify the structure of the thermal management system.

Figure 13:
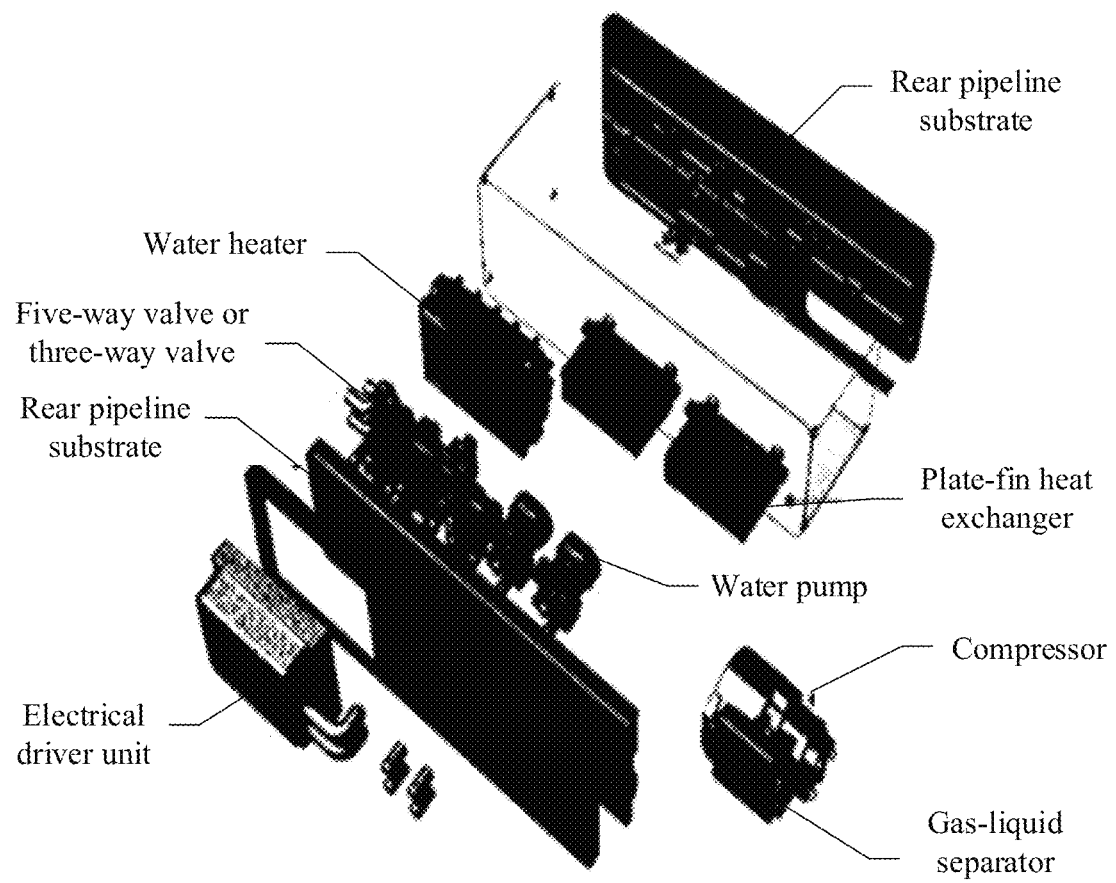
FIG. 13 is an exploded view illustrating an interior of a thermal management system corresponding to this implementation.

In an optional implementation, for any one of the foregoing embodiments, a flow pipe of each coolant may alternatively be disposed in a coolant substrate, and a flow pipe of each refrigerant may be disposed in a refrigerant substrate. The pipe is packaged in the substrate, so that each component can directly lead water or an inlet on the substrate without route interleaving. This helps further simplify routes of various pipes and avoid interference between the routes. FIG. 13 is an exploded view illustrating an interior of a thermal management system corresponding to this implementation. As shown in FIG. 13, in this solution, a three-way valve and a four-way valve 402 are combined into a second five-way valve, a front pipeline substrate is used to replace a refrigerant pipeline, and a rear pipeline substrate is used to replace a coolant pipeline. An exchanger includes a water-cooled condenser and a battery chiller. An electrical driver unit (EDU) includes all electrical driver modules in a general integrated system illustrated in FIG. 11, and may include, for example, a compressor, a motor controller, a water heater (for example, the type may be a positive temperature coefficient (PTC) water heater) controller, a water pump controller, and a water valve controller. The EDU may be connected to other electrical components in the general integrated system by using a drive wire.

Figure 14:
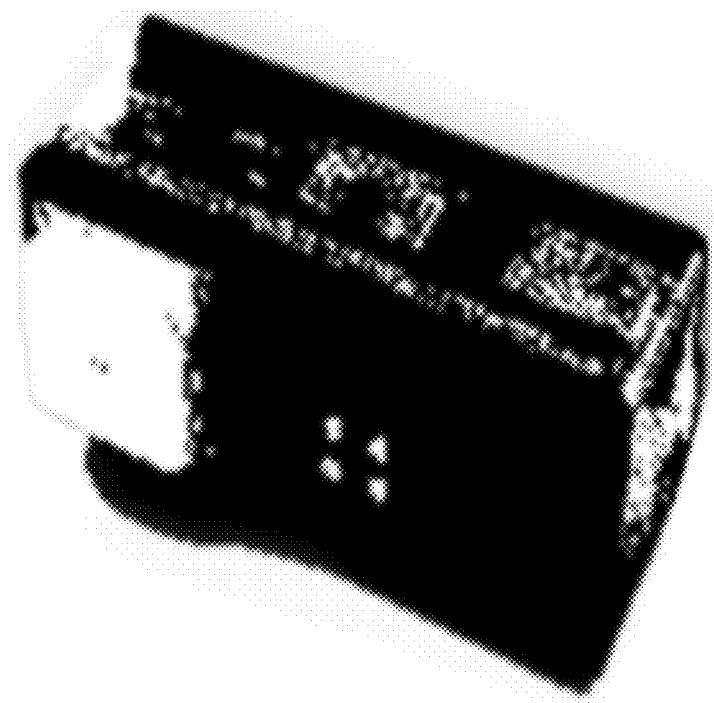
FIG. 14 is a diagram illustrating a structure of an appearance of a thermal management system according to an embodiment of the present disclosure.

FIG. 14 is a diagram illustrating a structure of an appearance of a thermal management system according to an embodiment of the present disclosure. As shown in FIG. 14, it can be learned that the thermal management system presents a modular structure in terms of the appearance, and has advantages such as a relatively compact overall structure, a simple pipeline connection, and a tidy appearance.

Embodiment 4

Figure 15A:
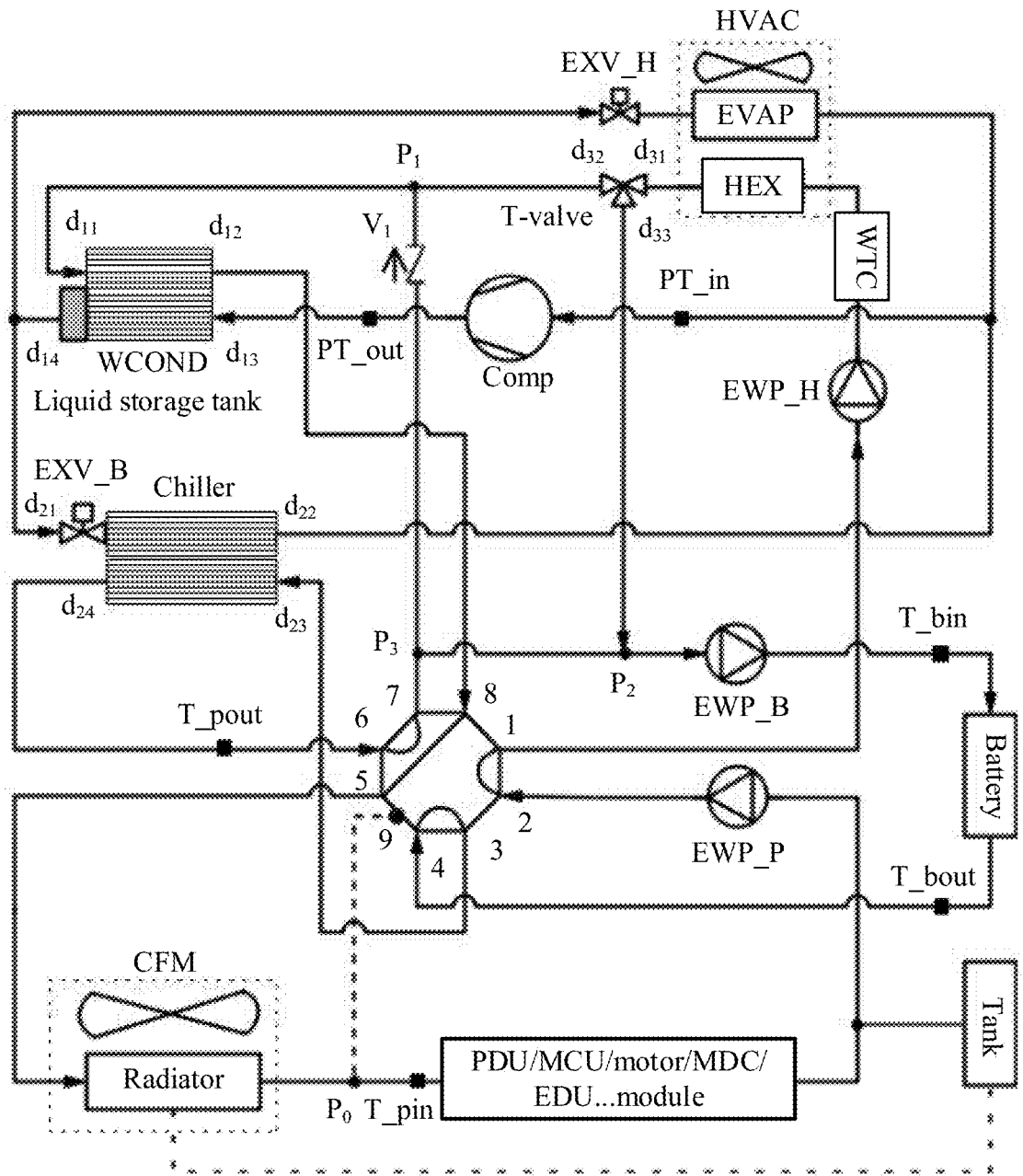
FIG. 15A is a schematic diagram illustrating a connection relationship of a thermal management system in a mode of cooling a passenger compartment and cooling a battery.

FIG. 15A is a schematic diagram illustrating a structure of a thermal management system according to embodiment 4 of this application. As shown in FIG. 15A, the thermal management system may include a compressor Comp, a water-cooled condenser WCOND, a battery chiller Chiller, a nine-way valve, a three-way valve T-valve, a passenger compartment water pump EWP_H, a battery water pump EWP_B, an electrical driver water pump EWP_P, and a one-way valve. The water-cooled condenser may include a first heat exchange pipe and a second heat exchange pipe. The battery chiller may include a third heat exchange pipe and a fourth heat exchange pipe. An input end dii of the first heat exchange pipe is connected to an output end of a heater core of an air conditioner box in a passenger compartment through an end $d_{32}$ of the three-way valve, and an input end of the heater core is connected to an output end of a water heater WTC, and is connected to a port 1 of the nine-way valve through the passenger compartment water pump EWP_H; an output end die of the first heat exchange pipe is connected to a port 8 of the nine-way valve; an input end $d_{13}$ of the second heat exchange pipe is connected to an output end of the compressor Comp; an output end $d_{14}$ of the second heat exchange pipe is divided into two branches, where one branch is connected to an input end $d_{21}$ of the battery chiller Chiller and to the water-cooled condenser WCOND through an output end $d_{22}$ of the battery chiller Chiller and the compressor Comp, and the other branch is connected to an input end of an evaporator EVAP, and to the water-cooled condenser WCOND through an output end of the evaporator and the compressor Comp; an input end $d_{21}$ of the third heat exchange pipe is connected to an output end $d_{14}$ of the water-cooled condenser WCOND, and an output end $d_{22}$ of the third heat exchange pipe is connected to the compressor (Comp); an input end $d_{23}$ of the fourth heat exchange pipe is connected to a port 3 of the nine-way valve; and an output end 24 of the fourth heat exchange pipe is connected to a port 6 of the nine-way valve.

It should be noted that a throttle in the embodiment provided in this application may also have a function of an electronic expansion valve. For example, a throttle EXV_H is connected to the input end of the evaporator, and a refrigerant releases pressure and expands when passing through the throttle EXV_H.

As shown in FIG. 15A, compared with embodiment 2, embodiment 4 has the following main differences:

1. A pipeline connecting an outlet of a battery loop on the nine-way valve to a heater core loop is added, as shown by a segment from a port 7 of the nine-way valve to $P_1$; and a one-way valve is added to the pipeline, as shown by $V_1$, where a coolant can only flow from the nine-way valve to the heater core loop.

2. A pipeline connecting the heater core loop to the battery loop is added, as shown by a segment from the three-way valve T-valve to $P_2$, where the three-way valve added on this pipeline can perform flux control.

3. A water electric heating (water temperature coefficient WTC) position is moved from between the heater core HEX and the water-cooled condenser WCOND to between the heater core HEX and the water pump EWP_H.

4. In an original solution, an electrical driver tank Tank_P and a heating tank Tank_H are combined into one tank Tank. The tank Tank is changed from a position connected in series with a heater core loop to a position connected in parallel with an electrical driver loop. A water refill position is between the electrical driver water pump EWP_P and an electrical driver component, and an exhaust position is a radiator tank Radiator.

The following still uses several modes illustrated in embodiment 1 as examples to describe some modes that can be implemented by the thermal management system in embodiment 4 of this application. embodiment 4 also has a plurality of working modes, including: a mode of refrigerating the passenger compartment and a battery simultaneously, a mode of cooling only the passenger compartment, a mode of cooling only the battery, a mode of cooling the battery naturally, a mode of cooling a motor naturally, a mode of heating the passenger compartment and the battery simultaneously, a mode of heating only the passenger compartment, a mode of heating only the battery, a mode of heating, dehumidifying and battery cooling, and a mode of heating and dehumidifying. Because working logic of a sensor and working logic of an executor in different modes have many similarities, for details not mentioned in this embodiment, refer to other embodiments provided in this application. The following is a detailed description.

It should be noted that the passenger compartment described in this application is also referred to as a passenger cabin.

M10: Mode of Refrigerating the Passenger Compartment and the Battery Simultaneously.

In a possible scenario, passenger compartment cooling, battery cooling, and electrical driver cooling performed in this mode may be applied to a scenario in which the battery and the passenger compartment need to be cooled simultaneously under a high temperature condition in summer.

FIG. 15A is a schematic diagram illustrating a connection relationship of a thermal management system in a mode of refrigerating a passenger compartment and a battery simultaneously. As shown in FIG. 15A, in the M10 mode, high-temperature and high-pressure refrigerant gas output by the compressor passes through the second heat exchange pipe for heat exchange to obtain low-temperature and low-pressure refrigerant liquid. One branch of the low-temperature and low-pressure refrigerant liquid is transmitted to the evaporator to cool the passenger compartment and flows back to the compressor. In this case, an air conditioner in the passenger compartment is set to a full refrigeration mode (the full refrigeration mode is one of refrigeration modes, and is a mode of refrigerating the passenger compartment and the battery simultaneously). The other branch of the low-temperature and low-pressure refrigerant liquid cools, at the battery chiller, the coolant in the fourth heat exchange pipe through the third heat exchange pipe, to obtain a low-temperature coolant. The low-temperature coolant flows to the battery through the nine-way valve, thereby cooling the battery. In this case, the battery is refrigerated by the cooled coolant in the battery chiller, the passenger compartment is refrigerated by the cooled refrigerant in the water-cooled condenser, and the electrical driver is naturally cooled by the cooled coolant in a front-end cooling module. In this mode, because the water heater is not started, the coolant flowing through the heater core flows through the air conditioner box only as a bypass, and does not greatly affect a temperature of an operator cabin.

M11: Mode of Refrigerating Only the Passenger Compartment.

Figure 15B:
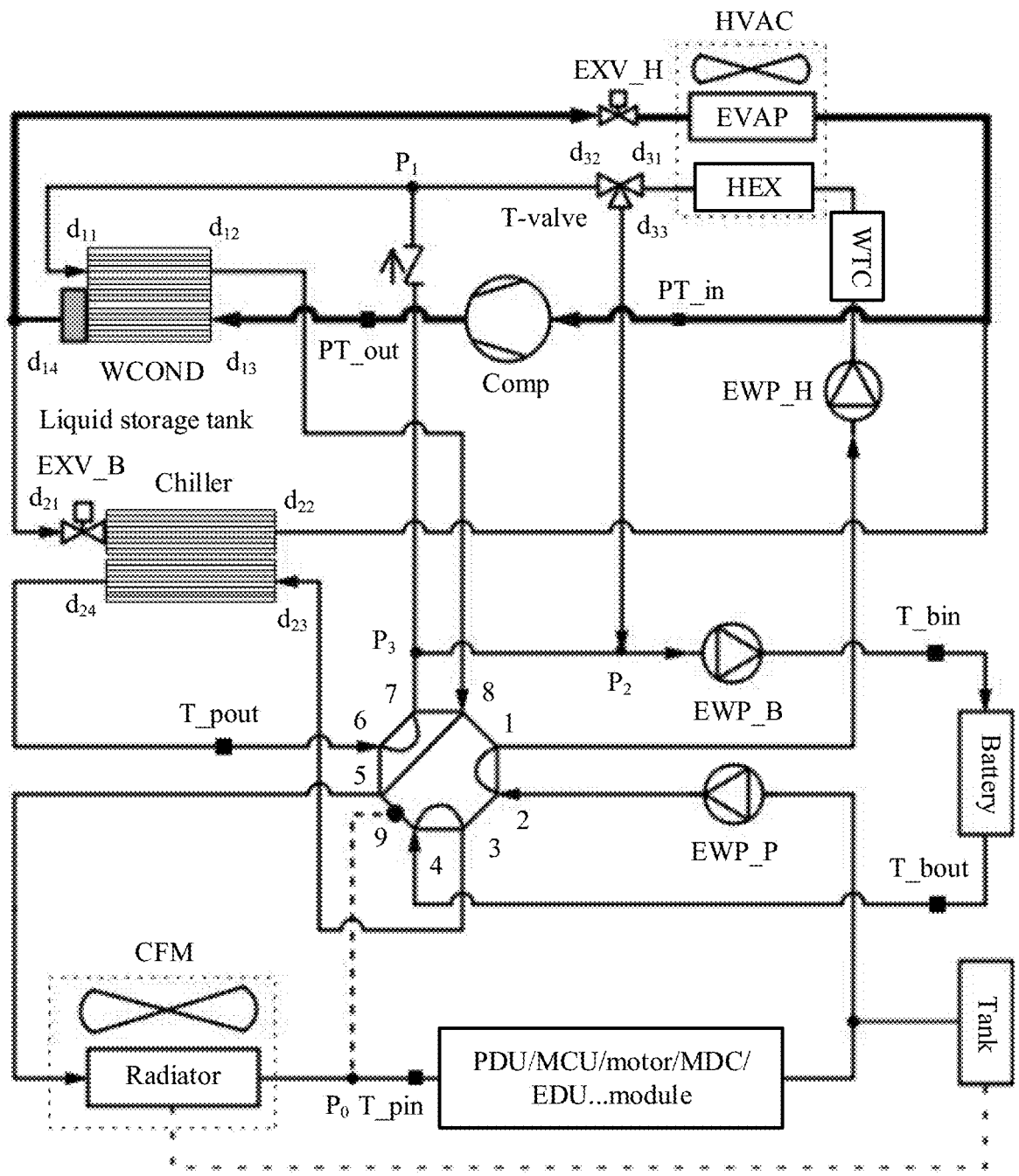
FIG. 15B is a schematic diagram illustrating a connection relationship of a thermal management system in a mode of cooling a passenger compartment and equalizing battery temperatures.

In a possible scenario, only the passenger compartment has a refrigeration requirement. FIG. 15B is a schematic diagram illustrating a connection relationship of a thermal management system in a mode of refrigerating only a passenger compartment. As shown in FIG. 15B, in the M11 mode, a throttle EXV_B is closed, the battery chiller does not work, and the passenger compartment water pump EWP_H and the electrical driver water pump EWP_P are started. High-temperature and high-pressure refrigerant gas output by the compressor passes through the second heat exchange pipe for heat exchange to obtain low-temperature and low-pressure refrigerant liquid. The low-temperature and low-pressure refrigerant liquid is transmitted to the evaporator to cool the passenger compartment and then flows back to the compressor. In this case, the air conditioner in the passenger compartment is set to a refrigeration mode. The coolant driven by the passenger compartment water pump EWP_H passes through a front-end cooling module CFM for natural cooling. In this mode, because the water heater is not started, the coolant flowing through the heater core flows through the air conditioner box only as a bypass, and does not greatly affect a temperature of an operator cabin.

M12: Mode of Refrigerating Only the Battery.

In a possible scenario, the passenger compartment does not need to be refrigerated, and the battery has a refrigeration requirement (for example, forcible refrigeration), for example, fast charging the battery.

Figure 15C:
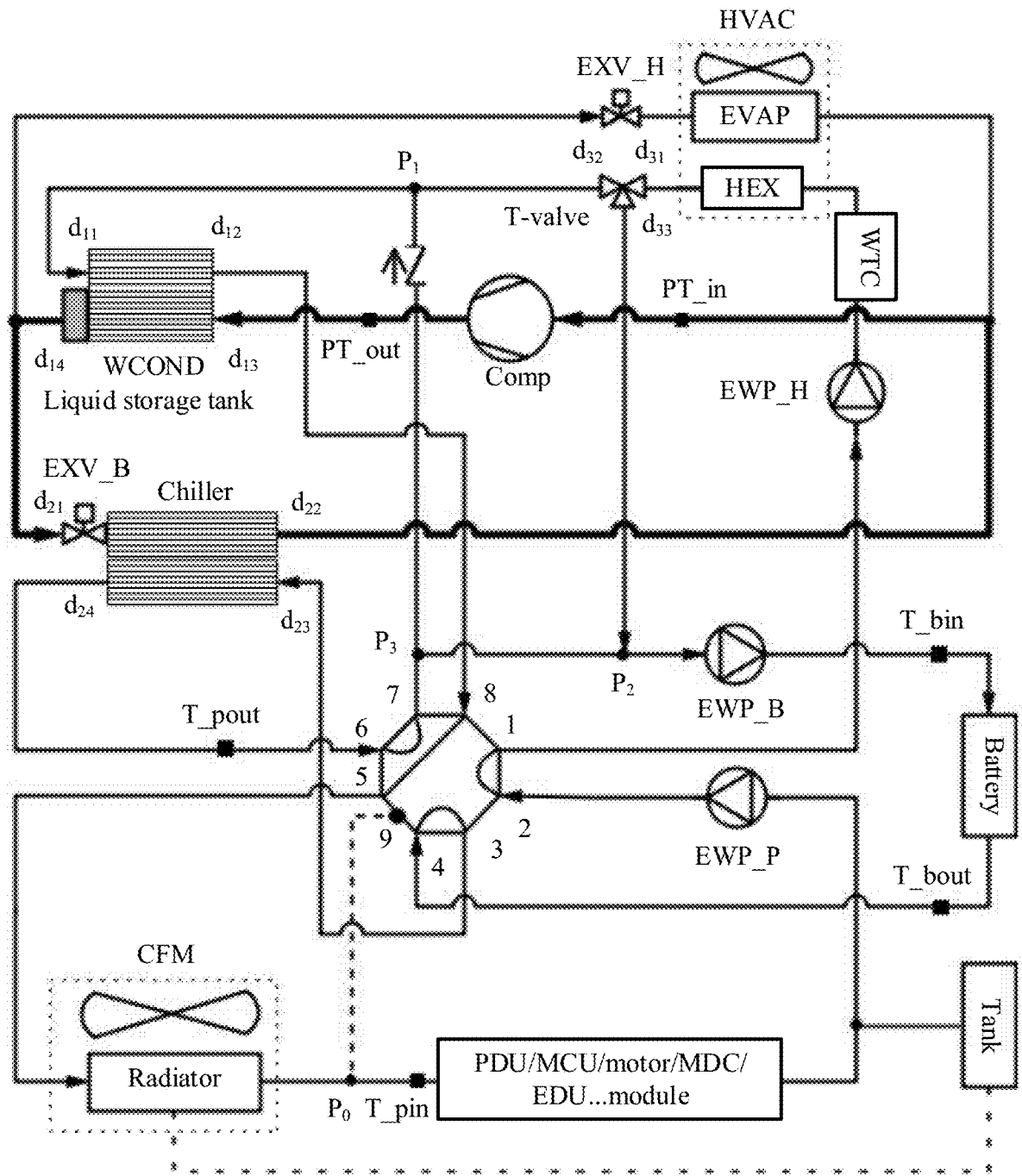
FIG. 15C is a schematic diagram illustrating a connection relationship of a thermal management system in a mode of ventilating a passenger compartment and cooling a battery.

FIG. 15C is a schematic diagram illustrating a connection relationship of a thermal management system in a mode of refrigerating only a battery. As shown in FIG. 15C, in the M12 mode, the throttle EXV_B is opened, and the throttle EXV_H is closed. In this case, the evaporator does not work. High-temperature and high-pressure refrigerant gas output by the compressor passes through the second heat exchange pipe for heat exchange to obtain low-temperature and low-pressure refrigerant liquid. The low-temperature and low-pressure refrigerant liquid passes through the third heat exchange pipe, cools the coolant in the fourth heat exchange pipe to obtain a low-temperature coolant, and then flows back to the compressor. The low-temperature coolant obtained through heat exchange by the fourth heat exchange pipe flows to the battery through the nine-way valve, thereby cooling the battery. In this case, the battery is refrigerated by using the cooled coolant in the battery chiller. In this mode, because the water heater is not started, the coolant flowing through the heater core flows through the air conditioner box only as a bypass, and does not greatly affect a temperature of an operator cabin.

M14: Mode of Naturally Cooling the Battery.

In a possible scenario, the passenger compartment is in a ventilated state and has no heating or refrigeration requirement, the battery has a cooling (natural cooling) requirement, and the electrical driver has a cooling requirement.

Figure 15D:
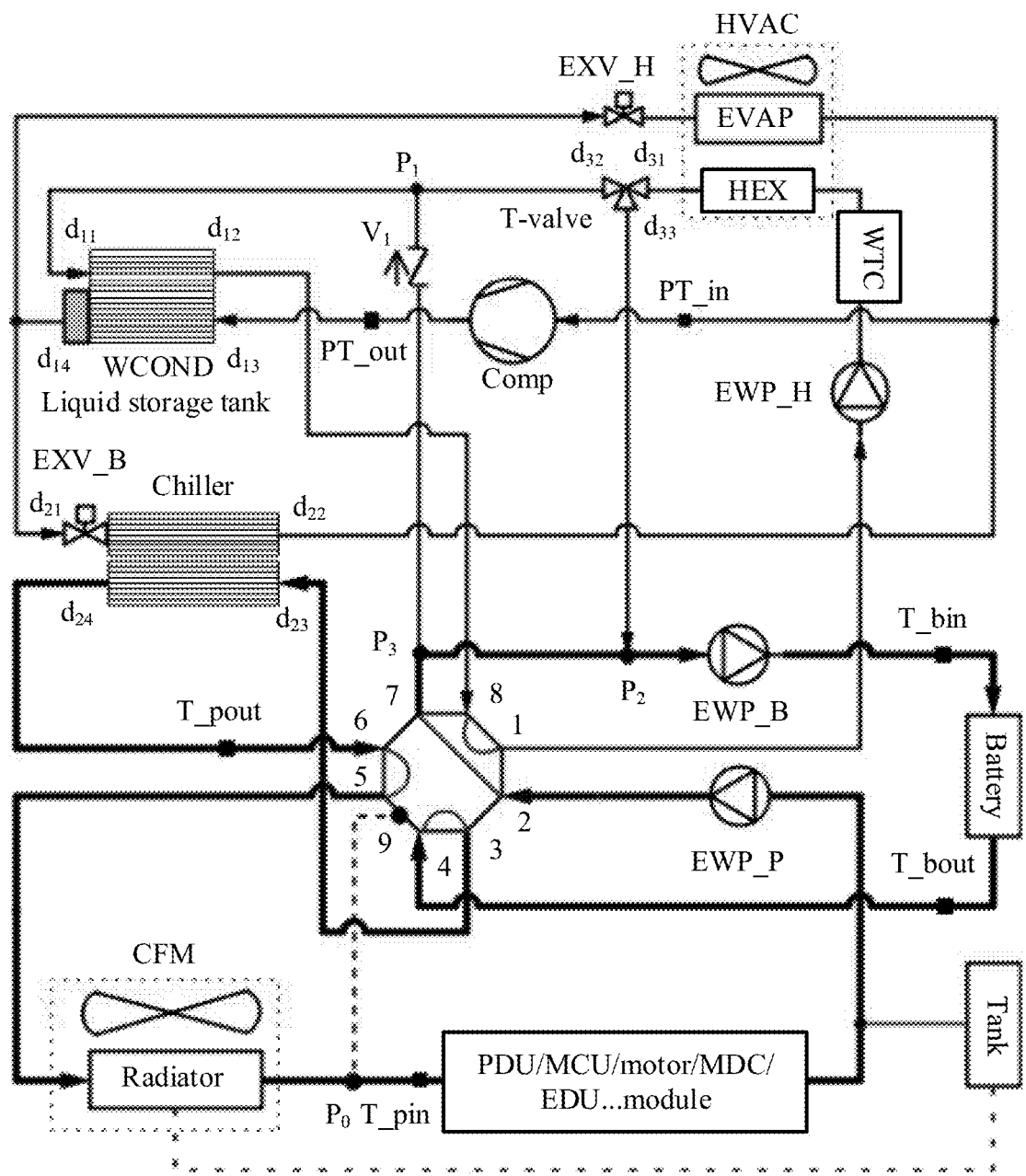
FIG. 15D is a schematic diagram illustrating a connection relationship of a thermal management system in a mode of ventilating a passenger compartment and naturally cooling a battery.

FIG. 15D is a schematic diagram illustrating a connection relationship of a thermal management system in a mode of naturally cooling a battery. As shown in FIG. 15D, in the M14 mode, throttles EXV_B and EXV_H are closed, and the battery chiller and the evaporator do not work. The battery water pump EWP_B and the electrical driver water pump EWP_P are started. The coolant driven by the battery water pump EWP_B passes through the battery, the nine-way valve, the fourth heat exchange pipe (because the battery chiller does not work, the fourth heat exchange pipe is actually used only as a pipe for circulation and does not perform heat exchange), and the nine-way valve and flows to a front-end cooling module for cooling, then flows to the electrical driver to cool components such as the electrical driver, and further flows back to the battery through the electrical driver water pump EWP_P, the nine-way valve, and the battery water pump EWP_B. In this case, both the battery and the electrical driver are naturally cooled by using the coolant cooled by the front-end cooling module.

M15: Mode of Naturally Cooling the Motor.

In a possible scenario, the passenger compartment is in a ventilated state and has no heating or refrigeration requirement, the battery has no heating or cooling requirement, and the electrical driver has a cooling requirement.

Figure 15E:
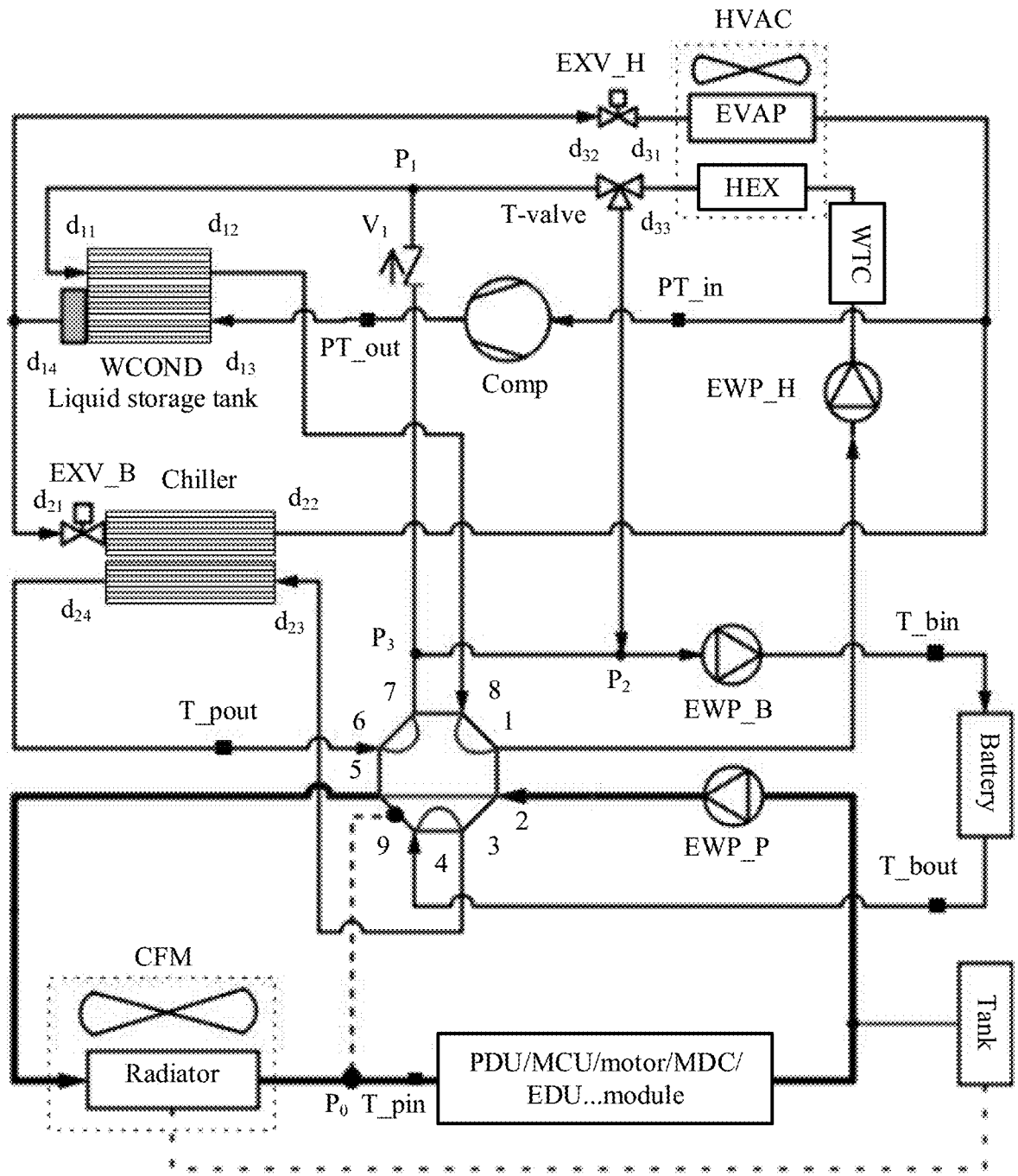
FIG. 15E is a schematic diagram illustrating a connection relationship of a thermal management system in a mode of cooling an electrical driver.

FIG. 15E is a schematic diagram illustrating a connection relationship of a thermal management system in a mode of naturally cooling a motor. As shown in FIG. 15E, in the M15 mode, throttles EXV_B and EXV_H are closed, and the battery chiller and the evaporator do not work. The coolant driven by the electrical driver water pump EWP_P flows into a front-end cooling module through the nine-way valve for cooling, and then flows to the electrical driver to cool components such as the electrical driver. In this case, the electrical driver is naturally cooled by using the coolant cooled by the front-end cooling module.

M16: Mode of Heating the Passenger Compartment and the Battery Simultaneously

In a possible scenario, the passenger compartment has a heating requirement, the battery has a heating (heating by a heat pump) requirement, and the electrical driver has a cooling requirement.

Figure 15F:
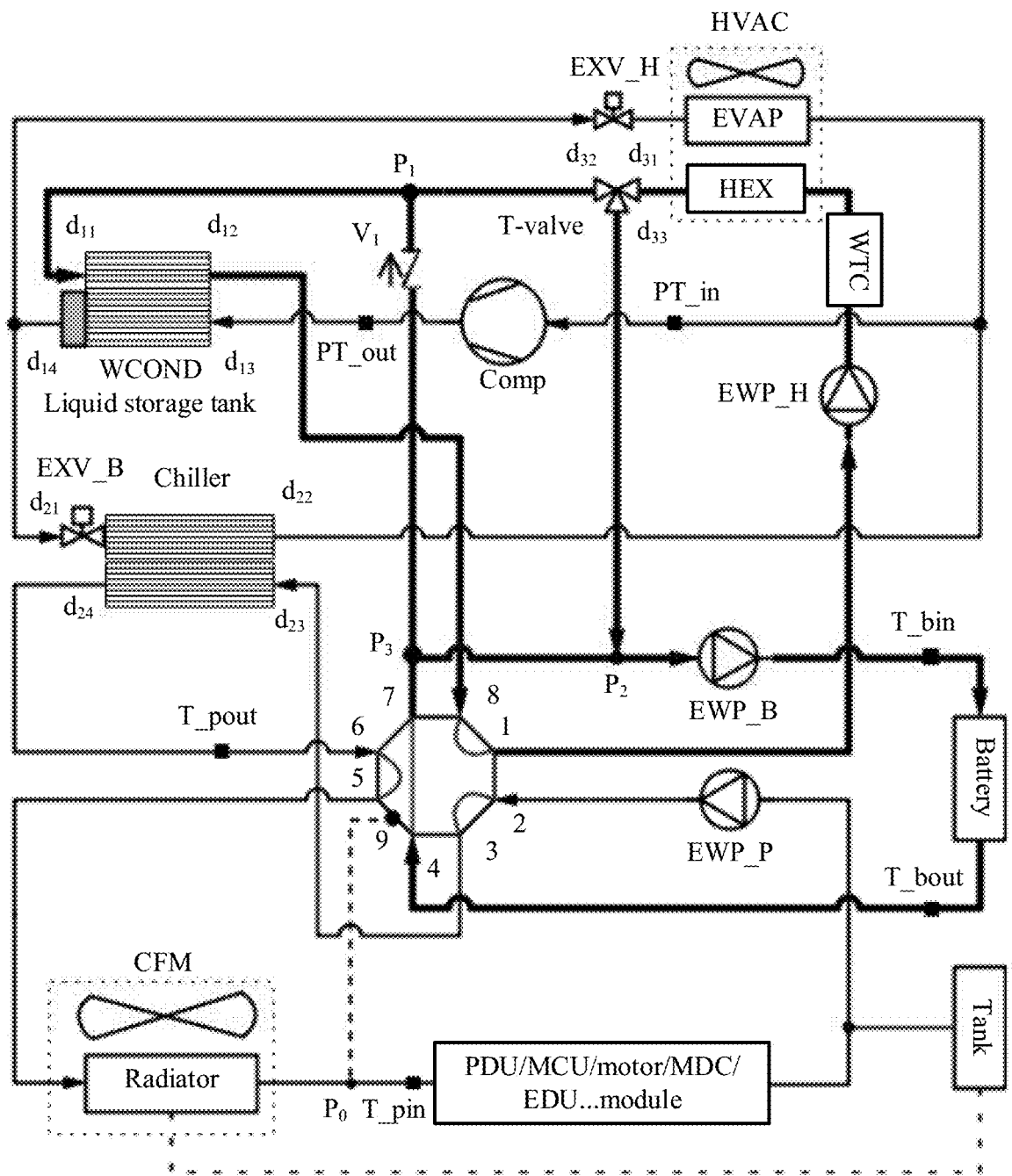
FIG. 15F is a schematic diagram illustrating a connection relationship of a thermal management system in a mode of heating a passenger compartment and a battery simultaneously.

FIG. 15F is a schematic diagram illustrating a connection relationship of a thermal management system in a mode of heating a passenger compartment and a battery simultaneously. As shown in FIG. 15F, in the M16 mode, high-temperature and high-pressure refrigerant gas output by the compressor exchanges heat with the first heat exchange pipe when passing through the second heat exchange pipe, to heat the coolant in the first heat exchange pipe. In addition, the refrigerant exchanges, in the battery chiller, heat with the coolant in the fourth heat exchange pipe through the third heat exchange pipe. The coolant in the fourth heat exchange pipe exchanges heat in a front-end heat exchange module with an external environment through the nine-way valve. The high-temperature refrigerant liquid obtained through heat exchange by the first heat exchange pipe passes through the nine-way valve and the passenger compartment water pump (EWP_H), then is heated by the water heater, and flows into the heater core. The air conditioner in the passenger compartment starts a full heating mode (the full heating mode is one of heating modes, and is a mode of heating the passenger compartment and the battery simultaneously). Therefore, the air conditioner in the passenger compartment first heats ambient air by using the heater core and then blows the ambient air into the passenger compartment to heat the passenger compartment. The low-temperature coolant in the fourth heat exchange pipe flows to the electrical driver through the nine-way valve, and the electrical driver is cooled by using the coolant cooled by the battery chiller and the front-end module.

Differences from embodiment 2 are mainly as follows. In embodiment 4, the pipeline connecting the outlet of the battery loop on the nine-way valve to the heater core loop is added, as shown by the segment from the port 7 of the nine-way valve to $P_1$; a one-way valve is added to the pipeline, as shown by $V_1$; the coolant can only flow from the nine-way valve to the heater core loop; and in embodiment 4, the pipeline connecting the heater core loop to the battery loop is added, as shown by the segment from the three-way valve (T-valve) to $P_2$, where the three-way valve added on this pipeline can perform flux control.

As shown in FIG. 15F, temperature control of the heater core loop in the passenger compartment and the battery loop can be implemented by controlling the water heater WTC and the three-way valve $V_1$.

In the passenger compartment loop part, the coolant is driven by the passenger compartment water pump EWP_H, and after being heated by the water heater WTC, reaches the heater core HEX, and then reaches the condenser through the three-way valve T-valve. The coolant absorbs heat from the condenser for a temperature rise, and then flows back to the water pump EWP_H after passing through the nine-way valve.

In the battery loop part, the coolant is driven by the water pump EWP_B, passes through the battery and the nine-way valve, and then flows back to the water pump EWP_B. Because the coolant can exchange a little heat with the environment through the pipe of the loop, when the temperature of the battery is relatively low, circulation of the coolant in the battery loop can help the battery exchange heat with the environment through small circulation of the loop.

When the passenger compartment and the battery need to be heated simultaneously, the coolant flows to the three-way valve through the water pump EWP_H, the water heater WTC, and the heater core, and is divided into two branches through the output port $d_{32}$ and the output port $d_{33}$ of the three-way valve. Based on a status of the three-way valve, a proportion of coolants flowing to the condenser and flowing to the battery loop respectively through the two branches is determined. For example, the coolant flows into the three-way valve through the input port $d_{31}$. When the three-way valve is configured to output 100 percent (%) through the output port $d_{32}$, after the coolant flowing out of the heater core passes through the three-way valve, 100% of the coolant flows to the condenser. For another example, when the three-way valve is configured to output 100% through the output port $d_{33}$, after the coolant flowing out of the heater core passes through the three-way valve, 100% of the coolant flows to the battery loop. For another example, when the three-way valve is configured to output 30% through the output port $d_{32}$ and 70% through the output port $d_{33}$, after the coolant flowing out of the heater core passes through the three-way valve, 30% of the coolant flows to the condenser, and 70% of the coolant flows to the battery loop. The coolant from the passenger compartment loop enters the battery loop, passes through the water pump EWP_B, the battery, and the nine-way valve in sequence, then flows to the condenser through the new pipeline and the one-way valve $V_1$, and flows back to the passenger compartment water pump EWP_H after passing through the nine-way valve.

Therefore, in the solution in embodiment 4 of this application, the temperature of the passenger compartment loop or the battery loop may be separately controlled by using the new pipeline. Alternatively, the passenger compartment or the battery may be heated preferentially based on heating requirement priorities of the passenger compartment and the battery. The solution provided in embodiment 4 of this application has advantages such as a short heating loop, a high heating speed, and more accurate heating temperature control of the passenger compartment and the battery.

First, in the solution provided in embodiment 4 of this application, the passenger compartment loop and the battery loop may be separate circulation loops. Compared with the solutions in which the passenger compartment loop is connected in series with the battery loop in some embodiments provided in this application, the heating loop in embodiment 4 is shorter and there is less flow resistance. Especially when the passenger compartment and the battery need to be heated simultaneously, the solution provided in embodiment 4 has an advantage of faster heating.

In addition, a person skilled in the art may understand that coolant temperatures required for heating the passenger compartment and the battery are different. Generally, the coolant temperature required for heating the passenger compartment is higher than the coolant temperature required for heating the battery. For example, in a possible case, the temperature of the coolant in the heater core in the mode of heating the passenger compartment ranges from 50 degree Celsius (° C.) to 60° C., while the temperature of the coolant required for heating the battery ranges from 30° C. to 45° C. Therefore, in the solution provided in embodiment 4 of this application, the battery loop can independently control the heating temperature by using the three-way valve, to prevent the temperature of the coolant from being excessively high and exceeding the temperature range required by the battery, thereby avoiding battery damage caused by the high temperature.

In a possible application scenario, in the solution provided in embodiment 4 of this application, the passenger compartment and the battery may be preheated after the vehicle is remotely woken up in winter. In this case, the advantages of the short loop and fast heating help the passenger compartment and the battery reach a preset temperature more quickly in cold winter.

In a possible application scenario, in the solution provided in embodiment 4 of this application, the battery may be heated when the vehicle runs in winter. When the vehicle runs in winter, the temperature of the battery may fall below an appropriate temperature range. In addition, passengers also have requirements for heating the passenger compartment during running of the vehicle. Therefore, when the vehicle runs, the battery can be heated in a process of heating the passenger compartment according to the solution provided in embodiment 4 of this application. In addition, battery damage caused by an excessively high temperature of the coolant can be avoided.

In a possible application scenario, in the solution provided in embodiment 4 of this application, the battery may be preheated before the battery is charged. For example, preheating the battery after a charging service is reserved for the vehicle helps improve charging efficiency. Therefore, when the vehicle runs, especially during winter, in the solution provided in embodiment 4 of this application, the battery can be heated more accurately in the process of heating the passenger compartment.

It should be noted that adjustments of positions of components in this embodiment of this application without creative efforts do not depart from the essence of the disclosure of this application. For example, in the passenger compartment loop, positions of the WTC and the water pump can be interchanged. For another example, in the battery loop, positions of the water pump and the battery may be interchanged.

M18: Mode of Heating Only the Passenger Compartment

In a possible scenario, the passenger compartment has a heating requirement, the battery requires temperature equalization, and the electrical driver has a cooling requirement.

Figure 15G:
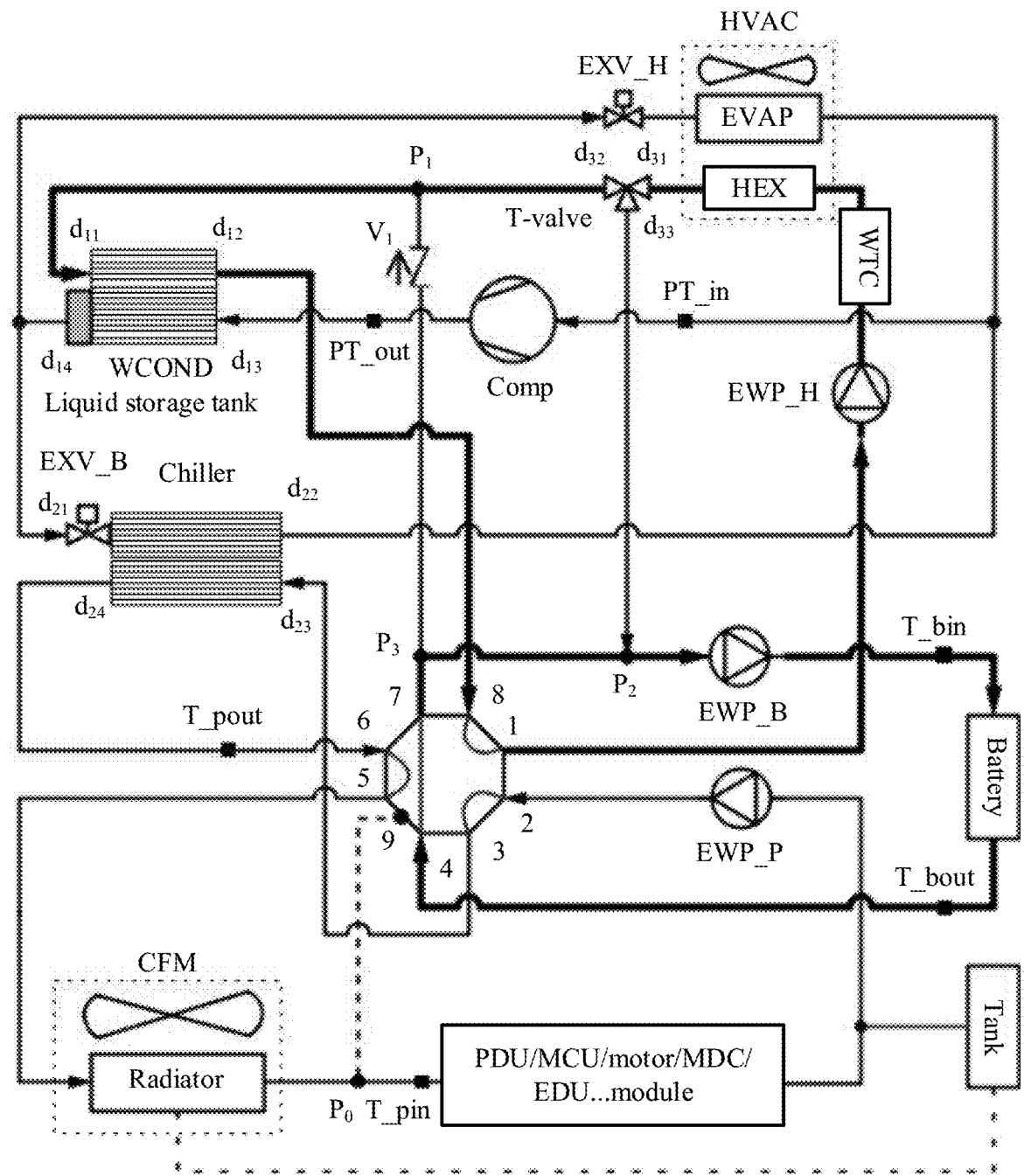
FIG. 15G is a schematic diagram illustrating a connection relationship of a thermal management system in a mode of heating a passenger compartment and equalizing battery temperatures.

FIG. 15G is a schematic diagram illustrating a connection relationship of a thermal management system in a mode of heating only a passenger compartment. As shown in FIG. 15G, in the M18 mode, the throttle EXV_B is opened, the throttle EXV_H is closed, and the evaporator does not work. High-temperature and high-pressure refrigerant gas output by the compressor passes through the second heat exchange pipe for heat exchange with the first heat exchange pipe to obtain low-temperature and low-pressure refrigerant liquid. The low-temperature and low-pressure refrigerant liquid passes through the third heat exchange pipe, cools the coolant in the fourth heat exchange pipe, and then flows back to the compressor. The high-temperature coolant obtained through heat exchange by the first heat exchange pipe passes through the nine-way valve and the passenger compartment water pump (EWP_H), then is heated by the water heater, and flows into the heater core. The air conditioner in the passenger compartment starts the heating mode. Therefore, the air conditioner in the passenger compartment first heats ambient air by using the heater core and then blows the ambient air into the passenger compartment to heat the passenger compartment. The controller may further adjust a heating effect of the passenger compartment by adjusting power of the water heater WTC. The high-temperature coolant flowing out of the heater core flows back to the water-cooled condenser. The low-temperature coolant in the fourth heat exchange pipe flows to the electrical driver through the nine-way valve and a front-end cooling module to cool the electrical driver, and then flows back to the electrical driver water pump EWP_P. In this case, the passenger compartment is heated by using the coolant heated by the third heat exchange pipe and/or the water heater, and the electrical driver is cooled by using the coolant cooled by the battery chiller. In this mode, the coolant of the battery loop is driven by the battery water pump EWP_B, passes through the battery and the nine-way valve, then flows back to the battery water pump EWP_B, and exchanges a little heat with the environment through the pipeline.

In the M18 mode, the solution provided in embodiment 4 of this application may be applied to the following scenario: For example, a user sits in the passenger compartment of the electric vehicle in winter, but an external ambient temperature is still within a range tolerable by the battery. The thermal management system is adjusted to the M18 mode in the manner described above, so that only the passenger compartment can be heated.

M19: Mode of Heating Only the Battery

In a possible scenario, the passenger compartment is in a ventilated state and has no heating or refrigeration requirement, the battery has a heating requirement, and the electrical driver has a cooling requirement.

Figure 15H:
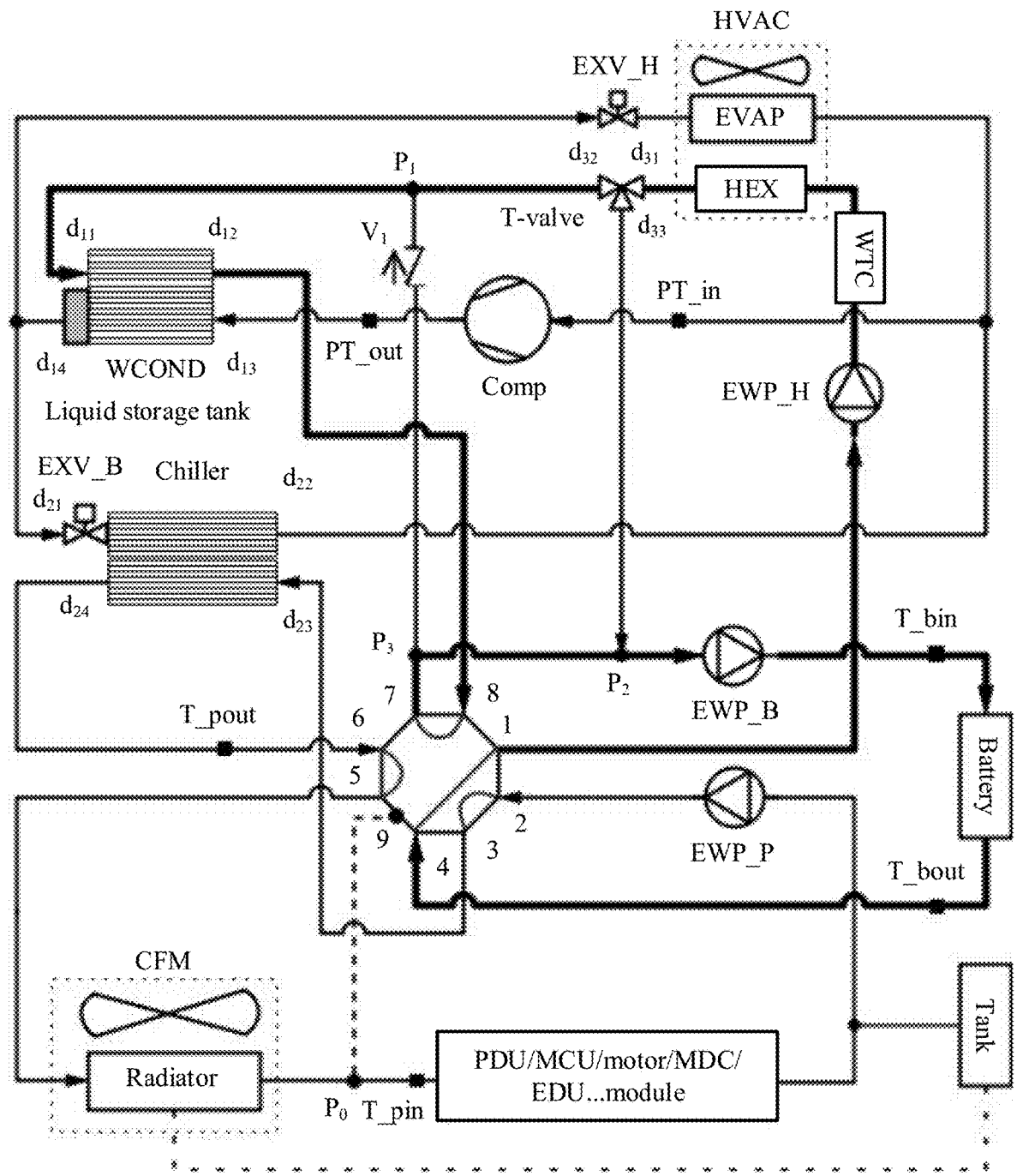
FIG. 15H is a schematic diagram illustrating a connection relationship of a thermal management system in a mode of ventilating a passenger compartment and heating a battery.

FIG. 15H is a schematic diagram illustrating a connection relationship of a thermal management system in a mode of heating only a battery. As shown in FIG. 15H, in the M19 mode, the throttle EXV_B is opened, the throttle EXV_H is closed, and the evaporator does not work. The coolant is driven by the passenger compartment water pump EWP_H to enter the water heater WTC, and after being heated by the water heater WTC, flows into heater core. Then, the coolant passes through the first heat exchange pipe, and heat is exchanged between the coolant in the first heat exchange pipe and the high-temperature and high-pressure refrigerant gas that is output from the compressor into the second heat exchange pipe. The high-temperature coolant obtained through heat exchange by the first heat exchange pipe passes through the nine-way valve and the battery water pump EWP_B, reaches the battery, and flows back to the passenger compartment water pump EWP_H again through the nine-way valve. When the coolant is at the heater core, because the air conditioner in the passenger compartment is not started, the air conditioner in the passenger compartment does not use the heater core to heat ambient air, that is, the passenger compartment is not heated. The controller may further adjust a heating effect of the battery by adjusting power of the water heater. The low-temperature coolant obtained through heat exchange by the fourth heat exchange pipe flows to the electrical driver through the nine-way valve, to cool the electrical driver. In this case, the battery is heated by using the coolant through heat exchange in the first heat exchange pipe and/or the coolant heated by the water heater, and the electrical driver is cooled by using the coolant cooled by the battery chiller.

Figure 15I:
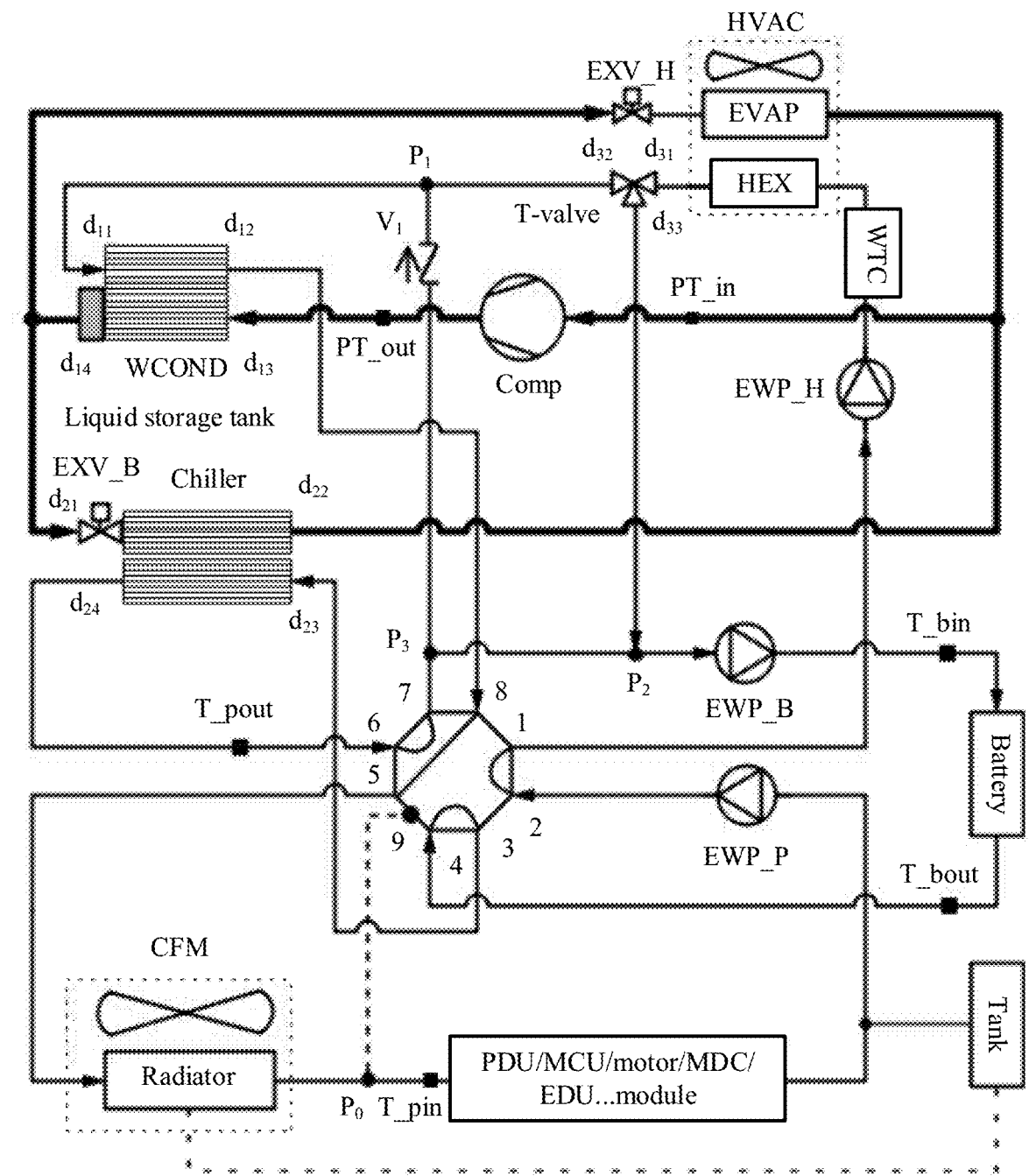
FIG. 15I is a schematic diagram illustrating a connection relationship of a thermal management system in a mode of heating and dehumidifying a passenger compartment and cooling a battery.

As shown in FIG. 15I, in a possible scenario, the passenger compartment has heating and dehumidification requirements, the battery has a cooling requirement, and the electrical driver has a cooling requirement. This mode is applicable to scenarios such as spring and autumn, long-term driving in winter, and charging or idling in winter. The air conditioner starts the dehumidification mode, that is, first using the evaporator to perform cooling and dehumidification, and then using the coolant heated by the water heater to perform heating. The battery is cooled by using the coolant cooled by the battery chiller. The electrical driver system is cooled by using the coolant cooled by the passenger compartment loop and the front-end module.

Figure 15J:
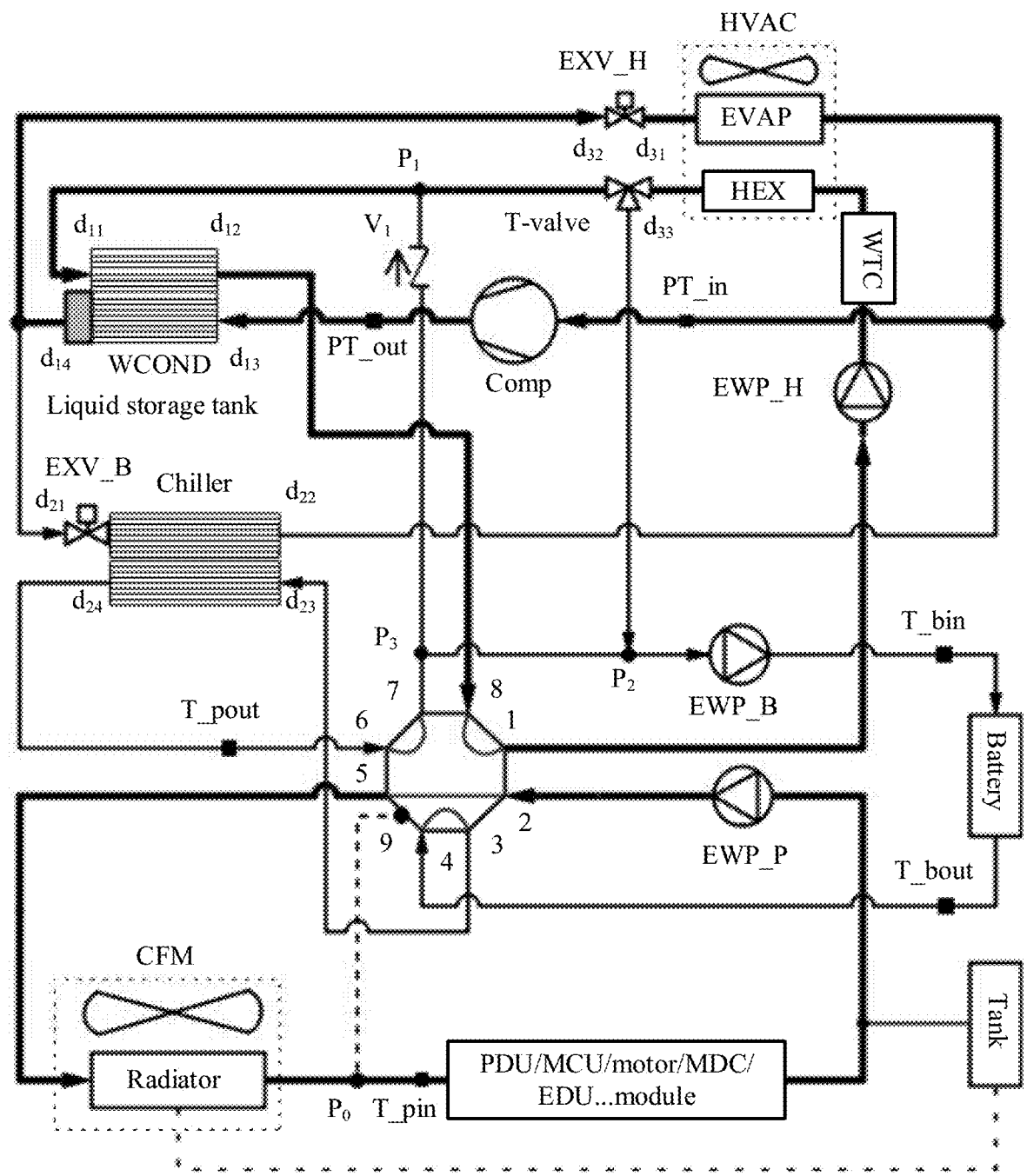
FIG. 15J is a schematic diagram illustrating a connection relationship of a thermal management system in a mode of heating and dehumidifying a passenger compartment.

As shown in FIG. 15J, in a possible scenario, the passenger compartment is warmed and dehumidified, the battery has no heating or cooling requirement, and the electrical driver has a cooling requirement. The throttle EXV_B is closed, the throttle EXV_H is opened, and the battery chiller Chiller does not work. The air conditioner starts the dehumidification mode, that is, first using the evaporator to perform cooling and dehumidification, and then using the coolant heated by the water heater to perform heating. The battery loop is in a temperature equalization mode or does not work. The electrical driver loop is cooled by the front-end cooling module.

The foregoing describes only several modes that can be implemented by the thermal management system in embodiment 4 of this application as examples. It should be understood that, a same mode may be actually further implemented by using various different loops, and the mode is not limited to those described above. Details are not described herein in this application.

Figure 16:
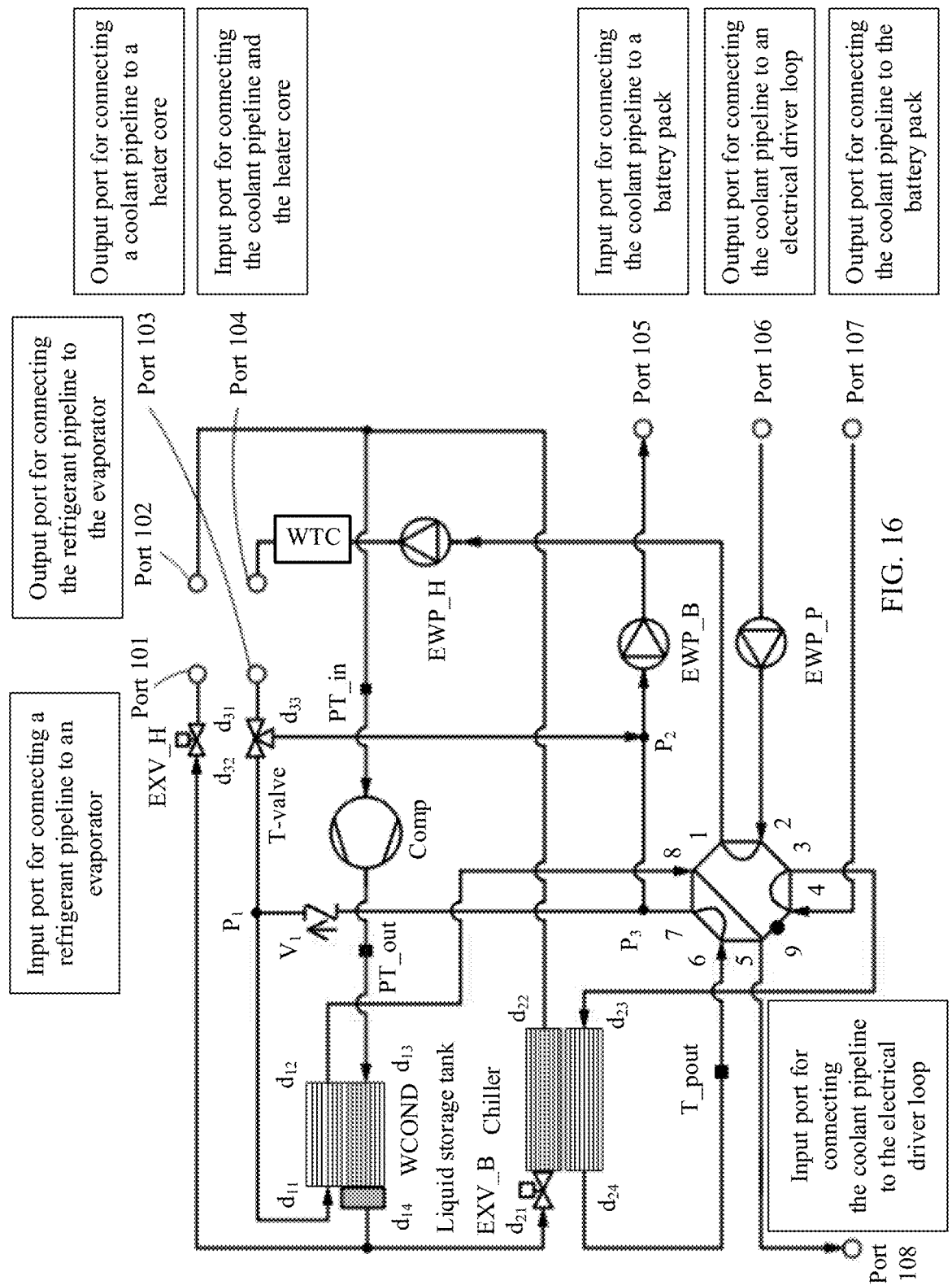
FIG. 16 is a schematic diagram illustrating an integration mode of a thermal management system.

There is a plurality of integration modes for components in embodiment 4. FIG. 16 shows an integration mode 1 of components in the solution of embodiment 4. The integration mode 1 uses a general integration onebox mode, and includes an electrical driver unit (EDU), a central thermal unit (CTU), an indirect heat unit (IHUIHU), and an optional compressor module. The EDU is a controller, and may be connected to a vehicle domain controller (VDCVDC). The CTU includes a liquid cooling condenser, a battery chiller, an electronic expansion valve, a battery water pump, a motor water pump, a nine-way valve, a liquid storage tank, a waterway one-way valve, a refrigerant substrate, and a coolant substrate. The IHU includes a warm air three-way valve, a PTC, and a warm air water pump.

Figure 17:
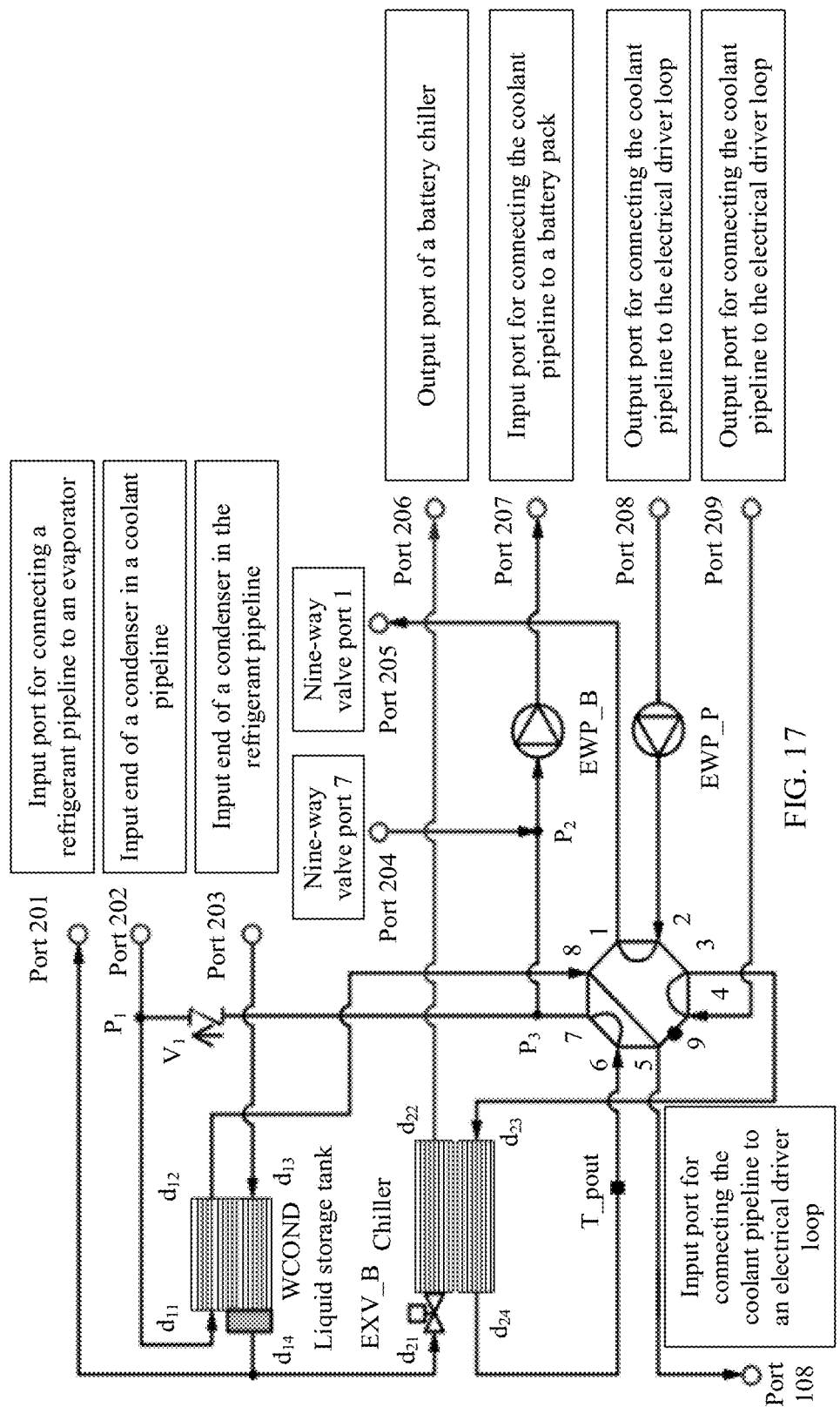
FIG. 17 is a schematic diagram illustrating a central integrated module of a thermal management system.

FIG. 17 shows an integration mode 2 of components in the solution of embodiment 4, that is, a CTU. The CTU includes a liquid cooling condenser, a battery chiller, an electronic expansion valve, a battery water pump, a motor water pump, a nine-way valve, a liquid storage tank, a waterway one-way valve, a refrigerant substrate, and a coolant substrate.

Figure 18:
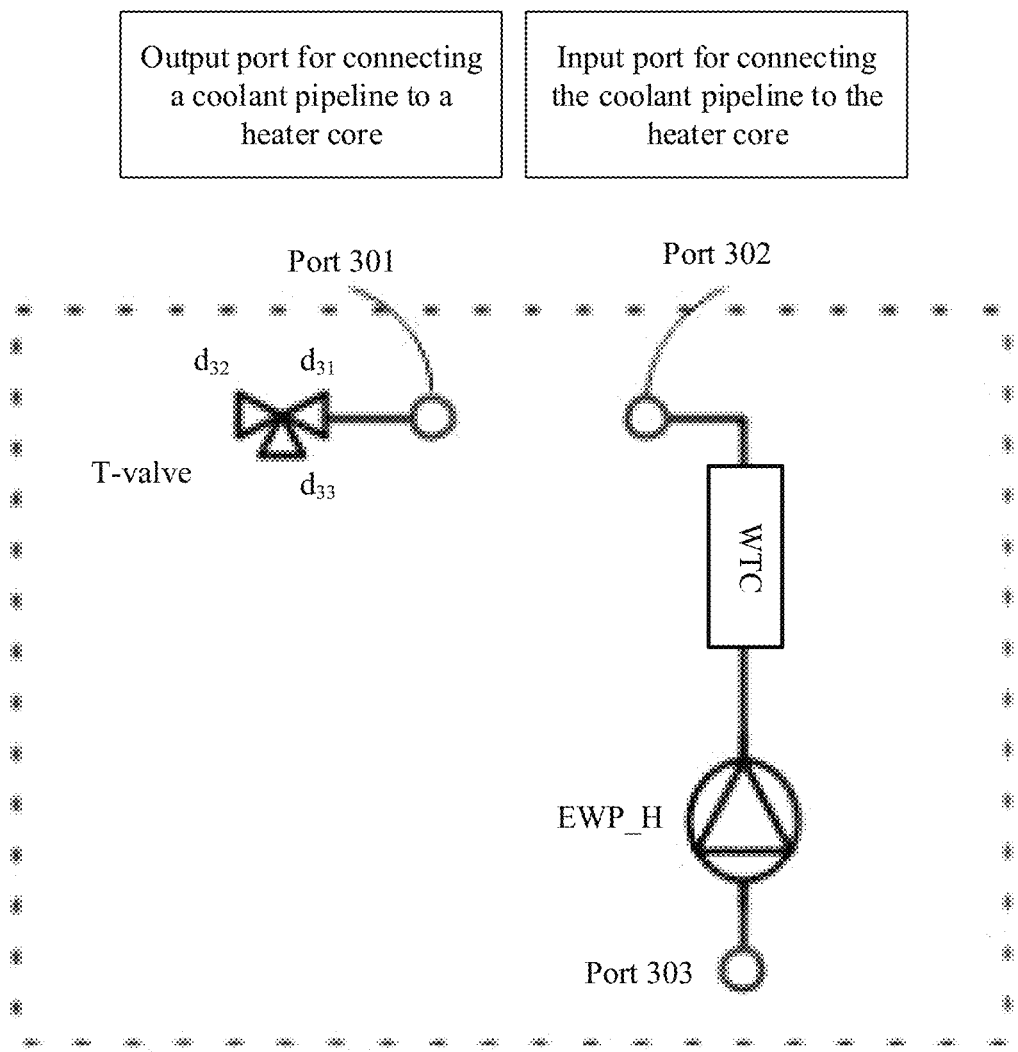
FIG. 18 is a schematic diagram illustrating an indirect heat exchanger of a thermal management system.

FIG. 18 shows an integration mode 3 of components in the solution of embodiment 4, that is, an IHU. The IHU includes a warm air three-way valve, a PTC, and a warm air water pump.

In addition, the integration mode may alternatively be integration of the CTU and the IHU, not shown in this application.

Embodiment 5

Figure 19:
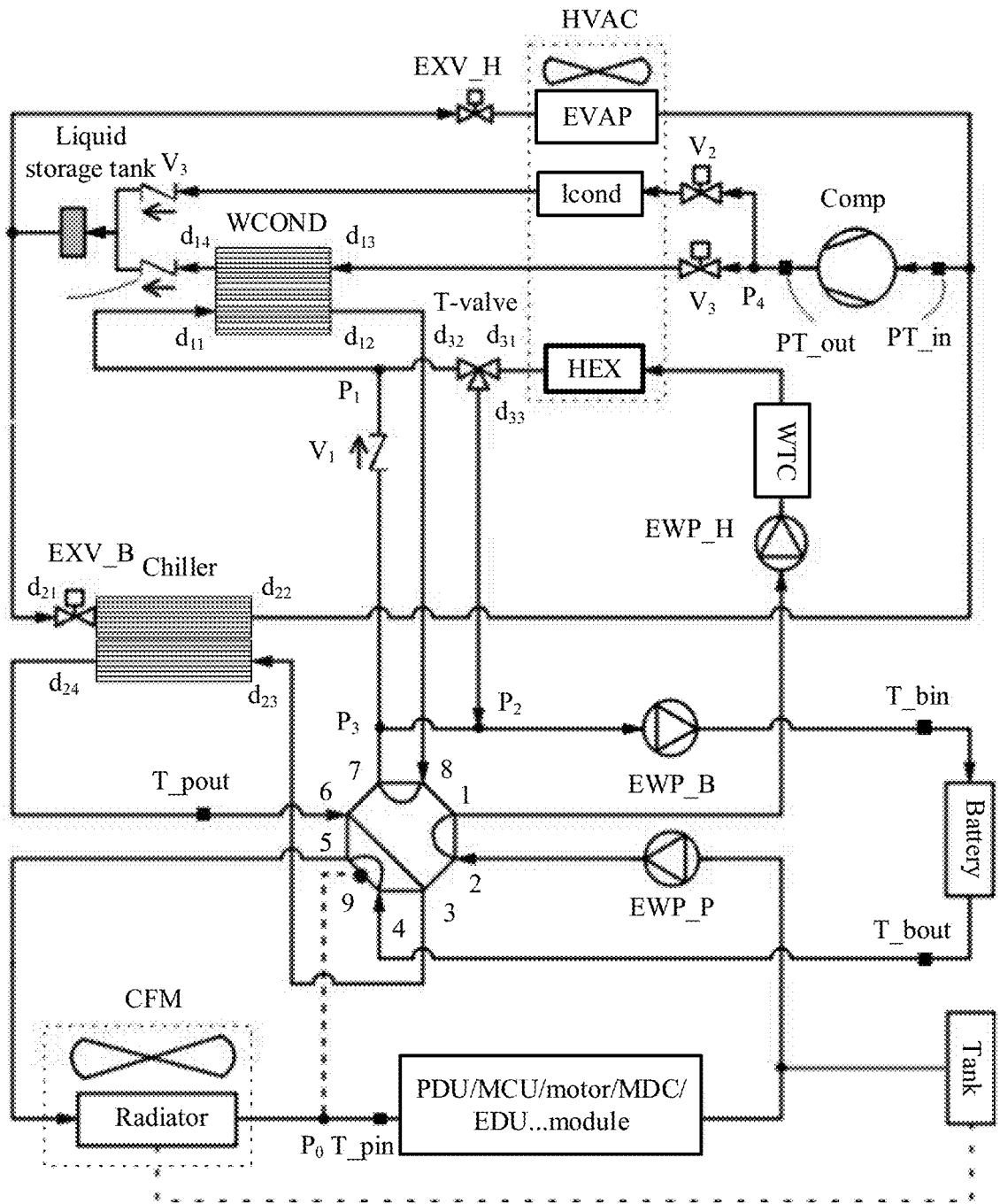
FIG. 19 is another schematic diagram illustrating a connection relationship of a thermal management system according to an embodiment of this application.

FIG. 19 shows embodiment 5 provided in this application. As shown in FIG. 19, the solution provided in Embodiment 5 of this application is modified based on embodiment 4 as follows: 1. A parallel pipeline is added between an outlet of a compressor and a liquid storage tank, as shown by a parallel pipeline between $P_4$ and the liquid storage tank. In addition, a solenoid valve $V_2$ with an adjustable opening, an indoor condenser Icond, and a one-way valve $V_3$ are arranged in sequence on the pipeline of this segment. Moreover, a starting point of the parallel pipeline is at the outlet of the compressor, and an ending point is between a water-cooled condenser WCOND and the liquid storage tank. 2. A one-way valve $V_4$ is added after the water-cooled condenser WCOND. 3. A solenoid valve $V_3$ with an adjustable opening is added before the water-cooled condenser WCOND. Therefore, when a passenger compartment has a heating requirement, $V_3$ may be closed and $V_2$ may be opened. High-temperature and high-pressure refrigerant gas output by the compressor may directly enter the indoor condenser (inner condenser), marked as Icond in the figure. A heating, ventilation and air conditioning system (HVAC) works to heat air in the passenger compartment. Different from the passenger compartment heating solutions in some embodiments provided in this application, Embodiment 5 may directly use a high-temperature and high-pressure refrigerant output by the compressor Comp to release heat in the Icond to implement a passenger compartment heating function. There is no need to exchange heat of the refrigerant with a coolant in the water-cooled condenser and then release heat of the coolant in a heater core HEX to heat the passenger compartment. In comparison, the solution provided in embodiment 5 has advantages such as a short heating loop, a small heat exchange loss, and a high heating speed when the passenger compartment is heated.

Only the differences in embodiment 5 are stressed herein. A person skilled in the art may understand that embodiment 5 also has a plurality of working modes, including: a mode of refrigerating the passenger compartment and a battery simultaneously, a mode of cooling only the passenger compartment, a mode of cooling only the battery, a mode of cooling the battery naturally, a mode of cooling a motor naturally, a mode of heating the passenger compartment and the battery simultaneously, a mode of heating only the passenger compartment, a mode of heating only the battery, a mode of heating, dehumidifying and battery cooling, a mode of heating and dehumidifying, and the like. Because working logic of a sensor and working logic of an executor in different modes have many similarities, for details not mentioned in this embodiment, refer to other embodiments provided in this application. Details are not described herein again.

In addition, it should be noted that in embodiment 4 or embodiment 5 provided in this application, the coolant may be controlled to flow directly to each component of the electrical driver system through the port 9 of the nine-way valve (bypassing the front-end cooling module). The pipelines are shown by dashed lines between the port 9 and the point $P_0$ in FIG. 15A to FIG. 15J and FIG. 19.

It should be understood that the thermal management system in this application may be further applicable to any other vehicle driven by the electrical driver, and is not limited to the electric vehicle. This is not limited in this application.

Obviously, a person skilled in the art can make various modifications and variations to this application without departing from the spirit and scope of this application. This application is intended to cover these modifications and variations of this application provided that these modifications and variations fall within the scope of protection defined by the following claims of this application and their equivalent technologies.

What is claimed is:

1. A thermal management system comprising:
  an air conditioning box configured to be in a passenger compartment and comprising:
    an evaporator comprising an evaporator input end and an evaporator output end; and
    a heater core configured to be on a first pipeline route;
  a compressor comprising:
    a compressor input end connected to the evaporator output end; and
    a compressor output end,
  a water-cooled condenser comprising:
    a first heat exchange pipe configured to be on the first pipeline route; and
    a second heat exchange pipe comprising:
      a second heat exchange pipe input end connected to the compressor output end; and
      a second heat exchange pipe output end connected to the evaporator input end;
  a battery chiller comprising:
    a third heat exchange pipe comprising a third heat exchange pipe input end and a third heat exchange pipe output end and configured to be on a second pipeline route, wherein the third heat exchange pipe input end is connected to the second heat exchange pipe output end, and
    wherein the third heat exchange pipe output end is connected to the compressor input end; and
    a fourth heat exchange pipe;
  a valve body assembly comprising:
    a valve body assembly first end;
    a valve body assembly second end;
    a valve body assembly third end configured to be on the second pipeline route and connected to the valve body assembly second end;
    a valve body assembly fourth end configured to be on the first pipeline route and connected to the valve body assembly first end;
    a valve body assembly fifth end;
    a valve body assembly sixth end configured to be on a third pipeline route and connected to the valve body assembly fifth end;
    a valve body assembly seventh end configured to be on a fourth pipeline route;
    a valve body assembly eighth end configured to be on the fourth pipeline route and connected to the valve body assembly seventh end; and
    a valve body assembly ninth end configured to be on the fourth pipeline route and connected to the valve body assembly seventh end;
  a first water pump configured to be on the first pipeline route;
  a second water pump configured to be on the fourth pipeline route;
  a third water pump configured to be on the third pipeline route;
  an electrical driver configured to be on the fourth pipeline route;
  a front-end cooling module configured to be on the fourth pipeline route; and
  a cooler disposed in the front-end cooling module.

2. The thermal management system of claim 1, further comprising at least one of:
- a first integrated unit that is integrated with at least one of the valve body assembly, the first water pump, the second water pump, or the third water pump;
- a second integrated unit that is integrated with at least one of the compressor, the water-cooled condenser, or the battery chiller; or
- a third integrated unit that is integrated with at least one of the compressor, the water-cooled condenser, the battery chiller, the valve body assembly, the first water pump, the second water pump, or the third water pump.

3. The thermal management system of claim 1, wherein the valve body assembly is a nine-way valve,
- wherein the thermal management system further comprises a battery configured to be on the third pipeline route,
- wherein the battery comprises a battery input end and a battery output end,
- wherein the electrical driver comprises an electrical driver input end and an electrical driver output end,
- wherein the cooler comprises a cooler input end and a cooler output end,
- wherein the first heat exchange pipe comprises a first heat exchange pipe input end and a first heat exchange pipe output end,
- wherein the fourth heat exchange pipe comprises a fourth heat exchange pipe input end and a fourth heat exchange pipe output end,
- wherein the heater core comprises a heater core input end and a heater core output end,
- wherein the first water pump comprises a first water pump input end and a first water pump output end,
- wherein the second water pump comprises a second water pump input end and a second water pump output end,
- wherein the third water pump comprises a third water pump input end and a third water pump output end,
- wherein on the first pipeline route, the valve body assembly first end is connected to the first heat exchange pipe input end, the first heat exchange pipe output end is connected to the heater core input end, the heater core output end is connected to the first water pump input end, and the first water pump output end is connected to the valve body assembly fourth end,
- wherein on the second pipeline route, the valve body assembly second end is connected to the fourth heat exchange pipe output end, and the fourth heat exchange pipe input end is connected to the valve body assembly third end,
- wherein on the third pipeline route, the valve body assembly fifth end is connected to the third water pump output end, the third water pump input end is connected to the batter output end, and the battery input end is connected to the valve body assembly sixth end, and
- wherein on the fourth pipeline route, the valve body assembly seventh end is connected to the second water pump output end, the second water pump input end is connected to the electrical driver output end, the electrical driver input end is separately connected to the cooler output end and the valve body assembly eighth end, and the cooler input end is connected to the valve body assembly ninth end.

4. The thermal management system of claim 3, further comprising:
- a high pressure pipe comprising:
  - a high pressure pipe input end connected to the second heat exchange pipe output end; and
  - a high pressure pipe output end separately connected to the third heat exchange pipe input end and the evaporator input end; and
- a low pressure pipe coaxially disposed with the high pressure pipe, wherein the high pressure pipe and the low pressure pipe are configured to exchange heat, and wherein the low pressure pipe comprises:
  - a low pressure pipe input end separately connected to the heater core output end and the third heat exchange pipe output end; and
  - a low pressure pipe output end connected to the compressor input end.

5. The thermal management system of claim 3, wherein the thermal management system further comprises:
- a first tank comprising:
  - a first tank input end connected to the heater core output end; and
  - a first tank output end connected to the first water pump input end; and
- a second tank comprising:
  - a second tank input end connected to the electrical driver output end; and
  - a second tank output end connected to the valve body assembly seventh end.

6. The thermal management system of claim 1, wherein the valve body assembly comprises:
- a five-way valve comprising a five-way valve first end, a five-way valve second end, a five-way valve third end, a five-way valve fourth end, and a five-way valve fifth end;
- a four-way valve comprising a four-way valve first end, a four-way valve second end, a four-way valve third end, and a four-way valve fourth end; and
- a first three-way valve comprising a first three-way valve first end, a first three-way valve second end, and a first three-way valve third end,
- wherein the five-way valve first end is connected to the four-way valve third end,
- wherein the first heat exchange pipe comprises a first heat exchange pipe input end and a first heat exchange pipe output end,
- wherein the fourth heat exchange pipe comprises a fourth heat exchange pipe input end and a fourth heat exchange pipe output end,
- wherein the battery comprises a battery input end and a battery output end,
- wherein the heater core comprises a heater core input end and a heater core output end,
- wherein the first water pump comprises a first water pump input end and a first water pump output end,
- wherein the second water pump comprises a second water pump input end and a second water pump output end,
- wherein the third water pump comprises a third water pump input end and a third water pump output end,
- wherein the cooler comprises a cooler input end and a cooler output end,
- wherein the electrical driver comprises an electrical driver input end and an electrical driver output end,
- wherein on the first pipeline route, the five-way valve first end is connected to the first heat exchange pipe input end, the first heat exchange pipe output end is connected to the heater core input end, the heater core output end is connected to the first water pump input end, and the first water pump output end is connected to a third end of the five-way valve,
- wherein on the second pipeline route, the five-way valve fifth end is connected to the fourth heat exchange pipe output end and the fourth heat exchange pipe input end is connected to the four-way valve first end, wherein on the third pipeline route, the four-way valve second end is connected to the battery output end, the battery input end is connected to the third water pump output end, and the third water pump input end is connected to the five-way valve fourth end, and wherein on the fourth pipeline route, the first three-way valve first end is connected to the second water pump output end, the second water pump input end is connected to the five-way valve second end, the first three-way valve third end is connected to the cooler input end, both the cooler output end and first three-way valve second end are connected to the electrical driver input end, and the electrical driver output end is connected to the four-way valve fourth end.

7. The thermal management system of claim 6, wherein the thermal management system further comprises a second three-way valve, wherein the second three-way valve comprises:
- a second three-way valve first end connected to the third water pump input end;
- a second three-way valve second end connected to the five-way valve first end; and
- a second three-way valve third end connected to the four-way valve third end.

8. The thermal management system of claim 1, further comprising:
- a water heater comprising:
  - a water heater input end; and
  - a water heater output end,
- wherein the first heat exchange pipe comprises:
  - a first heat exchange pipe output end connected to the water heater input end,
  - wherein the heater core comprises a heater core input end connected to the water heater output end.

9. The thermal management system of claim 1, wherein the thermal management system further comprises:
- a first throttle comprising a first throttle input end and a first throttle output end; and
- a second throttle comprising a second throttle input end, and a second throttle output end,
- wherein the first throttle input end and the second throttle input end are connected to the second heat exchange pipe output end,
- wherein the first throttle output end is connected to the third heat exchange pipe input end, and
- wherein the second throttle output end is connected to the evaporator input end.

10. The thermal management system of claim 1, wherein the thermal management system further comprises a liquid storage tank configured to be outside the second heat exchange pipe output end,
- wherein the liquid storage tank comprises:
  - a liquid storage tank input end connected to the second heat exchange pipe output end; and
  - a liquid storage tank output end connected to the valve body assembly first end.

11. The thermal management system of claim 1, further comprising a gas-liquid separator comprising:
- a gas-liquid separator input end separately connected to the evaporator output end and the third heat exchange pipe output end; and
- a gas-liquid separator output end connected to the compressor input end.

12. An electric vehicle, comprising:
a thermal management system comprising:
- an evaporator comprising an evaporator input end and an evaporator output end;
- a heater core configured to be on a first pipeline route;
- a compressor comprising:
  - a compressor input end connected to the evaporator output end; and
  - a compressor output end,
- a water-cooled condenser comprising:
  - a first heat exchange pipe configured to be on the first pipeline route; and
- a second heat exchange pipe comprising:
  - a second heat exchange pipe input end connected to the compressor output end; and
  - a second heat exchange pipe output end connected to the evaporator input end;
- a battery chiller comprising:
  - a third heat exchange pipe comprising a third heat exchange pipe input end and a third heat exchange pipe output end and configured to be on a second pipeline route, wherein the third heat exchange pipe input end is connected to the second heat exchange pipe output end, and wherein the third heat exchange pipe output end is connected to the compressor input end; and
  - a fourth heat exchange pipe;
- a valve body assembly comprising:
  - a valve body assembly first end;
  - a valve body assembly second end;
  - a valve body assembly third end configured to be on the second pipeline route and connected to the valve body assembly second end;
  - a valve body assembly fourth end configured to be on the first pipeline route and connected to the valve body assembly first end;
  - a valve body assembly fifth end;
  - a valve body assembly sixth end configured to be on a third pipeline route and connected to the valve body assembly fifth end;
  - a valve body assembly seventh end configured to be on a fourth pipeline route;
  - a valve body assembly eighth end configured to be on the fourth pipeline route and connected to the valve body assembly seventh end; and
  - a valve body assembly ninth end configured to be on the fourth pipeline route and connected to the valve body assembly seventh end;
- a first water pump configured to be on the first pipeline route;
- a second water pump configured to be on the fourth pipeline route; and
- a third water pump configured to be on the third pipeline route;
an air conditioner configured to be in a passenger compartment;
a battery;
an electrical driver;
a front-end cooling module;
a cooler disposed in the front-end cooling module; and
a controller connected to each valve of the valves, wherein the controller is configured to selectively open and close each valve of the valves to implement:
- a mode of cooling the passenger compartment and the battery simultaneously;
- a mode of cooling only the passenger compartment;
- a mode of cooling only the battery;
- a mode of cooling the battery and heating the passenger compartment;

a mode of naturally cooling the battery;
a mode of heating the passenger compartment and the battery simultaneously;
a mode of heating the battery and dehumidifying the passenger compartment;
a mode of heating only the passenger compartment;
a mode of heating only the battery; and
a mode of dehumidifying an interior space of the electric vehicle.

13. The electric vehicle of claim 12, further comprising at least one of:
a first integrated unit that is integrated with at least one of the valve body assembly, the first water pump, the second water pump, or the third water pump;
a second integrated unit that is integrated with at least one of the compressor, the water-cooled condenser, or the battery chiller; or
a third integrated unit that is integrated with at least one of the compressor, the water-cooled condenser, the battery chiller, the valve body assembly, the first water pump, the second water pump, or the third water pump.

14. The electric vehicle of claim 12, wherein the valve body assembly is a nine-way valve,
wherein the battery comprises a battery input end and a battery output end,
wherein the electrical driver comprises an electrical driver input end and an electrical driver output end,
wherein the cooler comprises a cooler input end and a cooler output end,
wherein the first heat exchange pipe comprises a first heat exchange pipe input end and a first heat exchange pipe output end,
wherein the fourth heat exchange pipe comprises a fourth heat exchange pipe input end and a fourth heat exchange pipe output end,
wherein the heater core comprises a heater core input end and a heater core output end,
wherein the first water pump comprises a first water pump input end and a first water pump output end,
wherein the second water pump comprises a second water pump input end and a second water pump output end,
wherein the third water pump comprises a third water pump input end and a third water pump output end,
wherein on the first pipeline route, the valve body assembly first end is connected to the first heat exchange pipe input end, the first heat exchange pipe output end is connected to the heater core input end, the heater core output end is connected to the first water pump input end, and the first water pump output end is connected to the valve body assembly fourth end,
wherein on the second pipeline route, the valve body assembly second end is connected to the fourth heat exchange pipe output end, and the fourth heat exchange pipe input end is connected to the valve body assembly third end,
wherein on the third pipeline route, the valve body assembly fifth end is connected to the third water pump output end, the third water pump input end is connected to the batter output end, and the battery input end is connected to the valve body assembly sixth end, and
wherein on the fourth pipeline route, the valve body assembly seventh end is connected to the second water pump output end, the second water pump input end is connected to the electrical driver output end, the electrical driver input end is separately connected to the cooler output end and the valve body assembly eighth end, and the cooler input end is connected to the valve body assembly ninth end.

15. The electric vehicle of claim 14, further comprising:
a high pressure pipe comprising:
a high pressure pipe input end connected to the second heat exchange pipe output end; and
a high pressure pipe output end separately connected to the third heat exchange pipe input end and the evaporator input end; and
a low pressure pipe coaxially disposed with the high pressure pipe, wherein the high pressure pipe and the low pressure pipe are configured to exchange heat, and wherein the low pressure pipe comprises:
a low pressure pipe input end separately connected to the heater core output end and the third heat exchange pipe output end; and
a low pressure pipe output end connected to the compressor input end.

16. The electric vehicle of claim 12, wherein the valve body assembly comprises:
a five-way valve comprising a five-way valve first end, a five-way valve second end, a five-way valve third end, a five-way valve fourth end, and a five-way valve fifth end;
a four-way valve comprising a four-way valve first end, a four-way valve second end, a four-way valve third end, and a four-way valve fourth end; and
a first three-way valve comprising a first three-way valve first end, a first three-way valve second end, and a first three-way valve third end,
wherein the five-way valve first end is connected to the four-way valve third end,
wherein the first heat exchange pipe comprises a first heat exchange pipe input end and a first heat exchange pipe output end,
wherein the fourth heat exchange pipe comprises a fourth heat exchange pipe input end and a fourth heat exchange pipe output end,
wherein the battery comprises a battery input end and a battery output end,
wherein the heater core comprises a heater core input end and a heater core output end,
wherein the first water pump comprises a first water pump input end and a first water pump output end,
wherein the second water pump comprises a second water pump input end and a second water pump output end,
wherein the third water pump comprises a third water pump input end and a third water pump output end,
wherein the cooler comprises a cooler input end and a cooler output end,
wherein the electrical driver comprises an electrical driver input end and an electrical driver output end,
wherein on the first pipeline route, the five-way valve first end is connected to the first heat exchange pipe input end, the first heat exchange pipe output end is connected to the heater core input end, the heater core output end is connected to the first water pump input end, and the first water pump output end is connected to a third end of the five-way valve,
wherein on the second pipeline route, the five-way valve fifth end is connected to the fourth heat exchange pipe output end and the fourth heat exchange pipe input end is connected to the four-way valve first end,
wherein on the third pipeline route, the four-way valve second end is connected to the battery output end, the battery input end is connected to the third water pump output end, and the third water pump input end is connected to the five-way valve fourth end, and wherein on the fourth pipeline route, the first three-way valve first end is connected to the second water pump output end, the second water pump input end is connected to the five-way valve second end, the first three-way valve third end is connected to the cooler input end, both the cooler output end and first three-way valve second end are connected to the electrical driver input end, and the electrical driver output end is connected to the four-way valve fourth end.

17. The electric vehicle of claim 16, wherein the thermal management system further comprises a second three-way valve, wherein the second three-way valve comprises a second three-way valve first end, a second three-way valve second end, and a second three-way valve third end, wherein the second three-way valve first end is connected to the third water pump input end, wherein the second three-way valve second end is connected to the five-way valve first end, and wherein the second three-way valve third end is connected to the four-way valve third end.

18. The electric vehicle of claim 12, wherein the thermal management system further comprises a water heater comprising a water heater input end and a water heater output end, wherein the first heat exchange pipe comprises a first heat exchange pipe output end, wherein the heater core comprises a heater core input end, wherein the water heater input end is connected to the first heat exchange pipe output end, and wherein the water heater output end is connected to the heater core input end.

19. The electric vehicle of claim 12, wherein the thermal management system further comprises:

a first throttle comprising a first throttle input end and a first throttle output end; and a second throttle comprising a second throttle input end, and a second throttle output end, wherein the first throttle input end and the second throttle input end are connected to the second heat exchange pipe output end, wherein the first throttle output end is connected to the third heat exchange pipe input end, and wherein the second throttle output end is connected to the evaporator input end.

20. The electric vehicle of claim 12, wherein the thermal management system further comprises a liquid storage tank configured to be outside the second heat exchange pipe output end, and wherein the liquid storage tank comprises:

a liquid storage tank input end connected to the second heat exchange pipe output end; and a liquid storage tank output end connected to the valve body assembly first end.

* * * * *

UNITED STATES PATENT AND TRADEMARK OFFICE
CERTIFICATE OF CORRECTION

| | |
|---|---|
| PATENT NO. | : 12,479,263 B2 |
| APPLICATION NO. | : 18/188069 |
| DATED | : November 25, 2025 |
| INVENTOR(S) | : Haomang Hu et al. |

Page 1 of 1

It is certified that error appears in the above-identified patent and that said Letters Patent is hereby corrected as shown below:

In the Claims

Claim 3, Column 63, Line 53: "the batter output end, and" should read "the battery output end, and"

Claim 14, Column 67, Line 61: "the batter output end, and" should read "the battery output end, and"

Signed and Sealed this
Thirtieth Day of December, 2025

John A. Squires
*Director of the United States Patent and Trademark Office*